(12) United States Patent
Kumar et al.

(10) Patent No.: US 12,476,013 B2
(45) Date of Patent: Nov. 18, 2025

(54) COMPUTER ARCHITECTURE FOR GENERATING AN INTEGRATED DATA REPOSITORY

(71) Applicant: GUARDANT HEALTH, INC., Redwood City, CA (US)

(72) Inventors: Naveen Kumar, Redwood City, CA (US); Jingwen Zhang, Killeen, TX (US); Nisha Subramanian, Redwood City, CA (US); Gautam Nayak, Fremont, CA (US); Kathryn Lang, Palo Alto, CA (US); Rajesh Kucharlapati, Milipitas, CA (US); Shunxin Lu, Dublin, CA (US)

(73) Assignee: Guardant Health, Inc., Palo Alto, CA (US)

( * ) Notice: Subject to any disclaimer, the term of this patent is extended or adjusted under 35 U.S.C. 154(b) by 390 days.

(21) Appl. No.: 17/832,498

(22) Filed: Jun. 3, 2022

(65) Prior Publication Data
US 2023/0107984 A1    Apr. 6, 2023

Related U.S. Application Data

(60) Provisional application No. 63/250,912, filed on Sep. 30, 2021, provisional application No. 63/238,851,
(Continued)

(51) Int. Cl.
*G16H 50/70* (2018.01)
*G16H 10/60* (2018.01)
*H04L 9/06* (2006.01)

(52) U.S. Cl.
CPC .............. *G16H 50/70* (2018.01); *G16H 10/60* (2018.01); *H04L 9/0643* (2013.01)

(58) Field of Classification Search
CPC ....... G16H 50/70; G16H 10/60; H04L 9/0643
See application file for complete search history.

(56) References Cited

U.S. PATENT DOCUMENTS 8,666,926 B1    3/2014  Nease et al.
9,824,236 B2 *  11/2017  Lynch ................... G06F 16/285
(Continued)

FOREIGN PATENT DOCUMENTS

WO    2005008558 A2    1/2005
WO    2021097309 A1    5/2021

OTHER PUBLICATIONS

International Search Report & Written Opinion for International Application No. PCT/US2022/038941, dated Jan. 23, 2023.
(Continued)

*Primary Examiner* — Mamon Obeid
*Assistant Examiner* — Malak M Nasser
(74) *Attorney, Agent, or Firm* — Brian Hahn

(57) ABSTRACT

An integrated data repository may be generated that includes genomics information and health insurance claims data information for a common group of individuals. A data processing pipeline may be implemented with respect to information stored by the integrated data repository. The data processing pipeline may include a number of sets of data processing instructions that are executable to analyze specified information stored by the integrated data repository and generate different datasets. The datasets may be analyzed to determine an impact of characteristics of individuals and/or an amount of impact of treatments provided to individuals in which a biological condition is present.

24 Claims, 20 Drawing Sheets

Related U.S. Application Data filed on Aug. 31, 2021, provisional application No. 63/227,860, filed on Jul. 30, 2021, provisional application No. 63/196,609, filed on Jun. 3, 2021.

(56) References Cited

U.S. PATENT DOCUMENTS

| | | |
|---|---|---|
| 2006/0190295 A1 | 8/2006 | Merkin |
| 2010/0131299 A1 | 5/2010 | Hasan et al. |
| 2013/0030842 A1 | 1/2013 | Lutgen et al. |
| 2014/0324472 A1 | 10/2014 | Delaney et al. |
| 2015/0095055 A1 | 4/2015 | Bagull |
| 2016/0357910 A1 | 12/2016 | Ghouri et al. |
| 2017/0116373 A1 | 4/2017 | Ginsburg et al. |
| 2017/0235894 A1 | 8/2017 | Cox et al. |
| 2018/0046764 A1 | 2/2018 | Katwala et al. |
| 2019/0108915 A1 | 4/2019 | Spurlock, III |
| 2019/0279753 A1 | 9/2019 | Rourke et al. |
| 2020/0251213 A1* | 8/2020 | Tran ................... G06N 20/00 |
| 2020/0303060 A1 | 9/2020 | Haemel et al. |
| 2021/0057071 A1 | 2/2021 | Barber et al. |
| 2022/0328198 A1 | 10/2022 | Wasan et al. |
| 2024/0289586 A1 | 8/2024 | Balakrishnan et al. |

OTHER PUBLICATIONS

International Search Report & Written Opinion for International Application No. PCT/US2022/045341, dated Jan. 31, 2023.
International search report and written opinion for International Patent Application No. PCT/US2022/032250, dated Sep. 8, 2022.
International Search Report and Written Opinion for International Patent Application No. PCT/US2022/042262, dated Jan. 19, 2023.
Pardoll, D.M. "The blockade of immune checkpoints in cancer immunotherapy" Nature Rev Cancer (2012) 12:252-264.
Final Office Action for U.S. Appl. No. 17/823,915 dated Sep. 25, 2025.
Office Action for U.S. Appl. No. 17/877,767, dated Aug. 27, 2025.

* cited by examiner

# COMPUTER ARCHITECTURE FOR GENERATING AN INTEGRATED DATA REPOSITORY

PRIORITY CLAIM AND INCORPORATION BY REFERENCE

This application claims priority to U.S. Provisional Patent Application Ser. No. 63/196,609 filed Jun. 3, 2021, and entitled "Computer Architecture for Generating an Integrated Data Repository", to U.S. Provisional Patent Application Ser. No. 63/227,860 filed Jul. 30, 2021, and entitled "Computer Architecture for Identifying Lines of Therapy", to U.S. Provisional Patent Application Ser. No. 63/238,851 filed Aug. 31, 2021, and entitled "Data Repository System, and Method for Cohort Selection, and to U.S. Provisional Patent Application Ser. No. 63/250,912 filed Sep. 30, 2021, and entitled "Computer Architecture for Generating a Reference Data Table, the entire contents of which are each incorporated by reference herein in their entirety.

TECHNICAL FIELD

Implementations of the present disclosure relate generally to the field of computer architecture, and more particularly to a computer architecture for generating a data repository that integrates multiple sources of healthcare data including healthcare insurance claims data and genomics data.

BACKGROUND

As individuals visit healthcare providers to treat one or more biological conditions, various types of documentation may be generated. For example, medical records may be produced by healthcare providers that include clinical observations recorded by a healthcare provider, laboratory test results, diagnostic test information, imaging information, dental health information, one or more combinations thereof, and the like. Additionally, billing records may be generated that indicate payment information with respect to at least one of products or services provided to individuals by healthcare providers. Further, health insurance claims information may be generated that indicates information obtained by health insurance companies related to the treatment of individuals with respect to one or more biological conditions.

DETAILED DESCRIPTION

Figure 1:
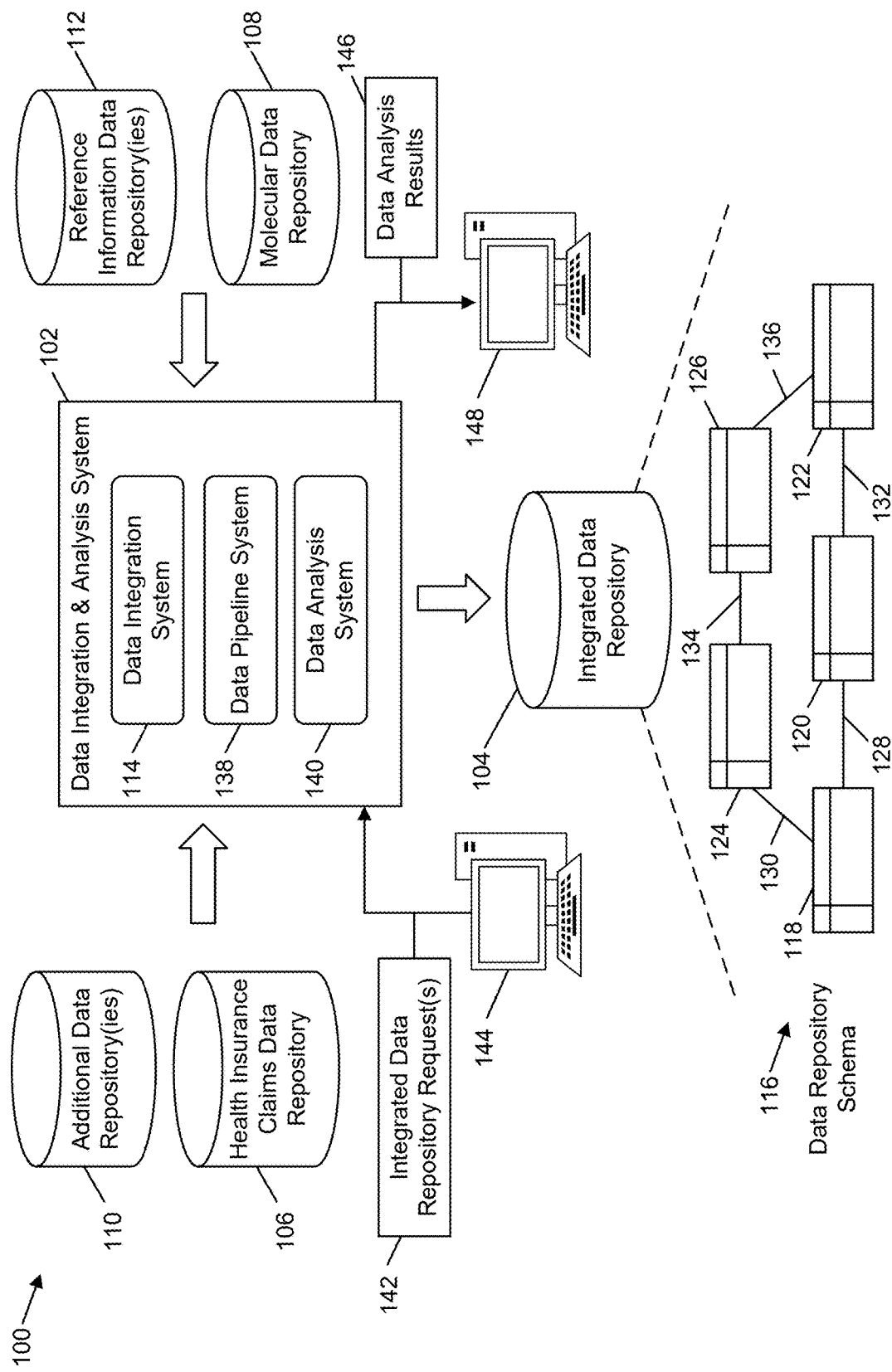
FIG. 1 illustrates an example architecture to generate an integrated data repository that includes multiple types of healthcare data, according to one or more implementations.

The following description and the drawings sufficiently illustrate specific implementations to enable those skilled in the art to practice them. Other implementations may incorporate structural, logical, electrical, process, and other changes. Portions and features of some implementations may be included in, or substituted for, those of other implementations. Implementations set forth in the claims encompass all available equivalents of those claims.

More data is needed to understand the behavior of tumors and performance of treatments and guidelines outside the highly selective confines of randomized controlled trials, often designed and conducted by entities with a commercial interest in their success. Real-world evidence (RWE), specifically the use of databases featuring integrated clinical and molecular data, plays an increasingly important role in precision oncology research. However, most of these databases feature genomic information from tumor limited to a single time point, generally at diagnosis, due in part to the practical challenges of genomic profiling of serial tumor specimens in real-world clinical practice. Genomic data for tumors is often limited to those naïve to systemic treatment, despite evidence that treatments can significantly alter the tumor genomic landscape and lead to drug resistance. Combining data from a liquid biopsy assay with rich clinical information can overcome these challenges and help improve understanding of tumor evolution and the emergence of biomarkers that confer resistance to guide the development of novel therapeutics addressing areas of unmet need The analysis of healthcare data using existing systems and techniques is typically performed with respect to medical records generated by healthcare providers. As used herein, a healthcare provider may refer to an entity, individual, or group of individuals involved in provided care to individuals in relation to at least one of the treatment or prevention of one or more biological conditions. In addition, as used herein, a biological condition can refer to an abnormality of function and/or structure in an individual to such a degree as to produce or threaten to produce a detectable feature of the abnormality. A biological condition can be characterized by external and/or internal characteristics, signs, and/or symptoms that indicate a deviation from a biological norm in one or more populations. A biological condition can be characterized by external and/or internal characteristics, signs, and/or symptoms that indicate a deviation from a biological norm in one or more populations. In various examples, a biological condition can include one or more molecular phenotypes. For example, a biological condition may correspond to genetic or epigenetic lesions. In one or more additional examples, a biological condition can include at least one of one or more diseases, one or more disorders, one or more injuries, one or more syndromes, one or more disabilities, one or more infections, one or more isolated symptoms, or other atypical variations of biological structure and/or function of individuals. Additionally, a treatment, as used herein, can refer to a substance, procedure, routine, device, and/or other intervention that can administered or performed with the intent of treating one or more effects of a biological condition in an individual. In one or more examples, a treatment may include a substance that is metabolized by the individual. The substance may include a composition of matter, such as a pharmaceutical composition. The substance may be delivered to the individual via a number of methods, such as ingestion, injection, absorption, or inhalation. A treatment may also include physical interventions, such as one or more surgeries. In at least some examples, the treatment can include a therapeutically meaningful intervention.

The healthcare data typically analyzed by existing systems includes unstructured data. Unstructured data can include data that is not organized according to a pre-defined or standardized format. For example, unstructured data may include notes made by a healthcare provider that is comprised of free text. That is, the manner in which the notes are captured does not include pre-defined inputs that are selectable by the healthcare provider, such as via a drop-down menu or via a list. Rather, the notes include text entered by a healthcare provider that may include sentences, sentence fragments, words, letters, symbols, abbreviations, one or more combinations thereof, and so forth. In some cases, unstructured data may be partially structured. For example, a provider could select an insurance billing code from a predefined list of insurance billing codes, and add unstructured notes to data associated with that billing code.

Existing systems typically devote a large amount of computing resources to analyzing unstructured data in order to extract information that may be relevant to analyses being performed by the existing systems. In some cases, existing systems may analyze unstructured data and transform the unstructured data to a structured format in order to facilitate the analysis of the previously unstructured data. The analysis of unstructured data by existing systems can be inefficient as well as inaccurate. In scenarios where the unstructured data is obtained from healthcare data, the importance of accurately analyzing the information is high because the analysis may be related to at least one of the treatment or diagnosis of a number of individuals with respect to one or more biological conditions. Thus, inaccurate analyses of healthcare data may result in suboptimal treatment of individuals.

The implementations of techniques, architectures, frameworks, systems, processes, and computer-readable instructions described herein are directed to analyzing health insurance claims data to derive information about at least one of the health or treatment of individuals. In contrast to existing systems, health insurance claims data is structured according to one or more formats and stored by a number of data tables. The data tables may include codes or other alphanumeric information indicating treatments received by individuals, dates of treatments, dosage information, diagnoses of individuals with respect to one or more biological conditions, information related to visits to healthcare providers, dates of visits to healthcare providers, billing information, and the like. The implementations described herein may be used to accurately analyze health insurance claims data for hundreds, up to thousands, up to tens of thousands of individuals or more in which one or more biological conditions are present. In various examples, tens of thousands, hundreds of thousands, up to millions of rows and/or columns of health insurance claims data may be analyzed to determine health-related information for individuals in which one or more biological conditions are present.

In various examples, the implementations described herein can integrate molecular data with health insurance claims data. The molecular data may include information derived from tissue samples extracted from a number of individuals. The molecular data may also include information derived from blood samples extracted from a number of individuals. In one or more illustrative examples, the molecular data may include genomics data. Further, in one or more examples, the health insurance claims data may be integrated with germline genetic information for a number of individuals.

An integrated data repository may be created that combines the health insurance claims data for individuals with the molecular data of the individuals. In one or more examples, an identifier may be generated for an individual that is associated with both the health insurance claims data of the individual and the molecular data of the individual. Both the molecular data and the health insurance claims data stored by the integrated data repository may be accessible using a single identifier of the individual. In one or more illustrative examples, the identifier for an individual may include an encrypted security key. In various examples, the integrated data repository may include a number of data tables corresponding to different aspects of the data stored within the data repository. For example, a first data table may be generated that includes summary data of individuals included in the integrated data repository, such as personal information, and a second data table may be generated that includes data corresponding to visits to healthcare providers. Additionally, a third data table may be generated indicating medical procedures provided to individuals and a fourth data table may be generated indicating information related to prescriptions obtained by individuals. Further, a fifth data table may be generated that includes multiomics profiling of individuals. Multiomics profiles may include at least one of genomic profiles, transcriptomic profiles, epigenetic profiles, or proteomic profiles.

The data tables included in the integrated data repository may be linked via logical links. In this way, a query to retrieve information from one data table may cause information from one or more additional data tables to be retrieved. Information stored by the linked data tables may be accessed to generate a number of different datasets that may be used to analyze the information stored by the integrated data repository. For example, the information stored by the integrated data repository may be analyzed by one or more algorithms to generate datasets that are organized according to one or more schemas. The datasets may indicate treatment received by an individual over a period of time with respect to a biological condition. The datasets may also indicate cohorts of individuals included in the integrated data repository having a number of common characteristics. In various examples, the datasets may consolidate and arrange information from a number of different data sources, including the integrated data repository. The datasets may be analyzed with respect to a number of queries to indicate information that may be of interest to at least one of healthcare providers, patients, or providers of treatments of biological conditions. For example, one or more datasets may be analyzed to more accurately determine a survival rate of individuals in which a biological condition is present and having a specified genomic profile in response to receiving a specified treatment.

The implementations described herein may provide a platform to integrate health insurance claims data and molecular data for individuals that is not found in existing systems that typically rely on electronic medical records that include an amount of unstructured data. By generating and analyzing structured health insurance claims data that has been integrated with molecular data, the implementations described herein may provide more accurate characterizations of the integrated data in relation to existing systems that rely on relatively inaccurate, unstructured electronic medical records data. Additionally, implementations described herein generate analytics ready datasets that enable the analysis of health information about individuals in a confidential and anonymized manner.

FIG. 1 illustrates an example architecture 100 to generate an integrated data repository that includes multiple types of healthcare data, according to one or more implementations. The architecture 100 may include a data integration and analysis system 102. The data integration and analysis system 102 may obtain data from a number of data sources and integrate the data from the data sources into an integrated data repository 104. For example, the data integration and analysis system 102 may obtain data from a health insurance claims data repository 106. In various examples, the data integration and analysis system 102 and the health insurance claims data repository 106 may be created and maintained by different entities. In one or more additional examples, the data integration and analysis system 102 and the health insurance claims data repository 106 may be created and maintained by a same entity.

The data integration and analysis system 102 may be implemented by one or more computing devices. The one or more computing devices may include one or more server computing devices, one or more desktop computing devices, one or more laptop computing devices, one or more tablet computing devices, one or more mobile computing devices, or combinations thereof. In certain implementations, at least a portion of the one or more computing devices may be implemented in a distributed computing environment. For example, at least a portion of the one or more computing devices may be implemented in a cloud computing architecture. In scenarios where the computing systems used to implement the data integration and analysis system 102 are configured in a distributed computing architecture, processing operations may be performed concurrently by multiple virtual machines. In various examples, the data integration and analysis system 102 may implement multithreading techniques. The implementation of a distributed computing architecture and multithreading techniques cause the data integration and analysis system 102 to utilize fewer computing resources in relation to computing architectures that do not implement these techniques.

The health insurance claims data repository 106 may store information obtained from one or more health insurance companies that corresponds to insurance claims made by subscribers of the one or more health insurance companies. The health insurance claims data repository 106 may be arranged (e.g., sorted) by patient identifier. The patient identifier may be based on the patient's first name, last name, date of birth, social security number, address, employer, and the like. The data stored by the health insurance claims data repository 106 may include structured data that is arranged in one or more data tables. The one or more data tables storing the structured data may include a number of rows and a number of columns that indicate information about health insurance claims made by subscribers of one or more health insurance companies in relation to procedures and/or treatments received by the subscribers from healthcare providers. At least a portion of the rows and columns of the data tables stored by the health insurance claims data repository 106 may include health insurance codes that may indicate diagnoses of biological conditions, and treatments and/or procedures obtained by subscribers of the one or more health insurance companies. In various examples, the health insurance codes may also indicate diagnostic procedures obtained by individuals that are related to one or more biological conditions that may be present in the individuals. In one or more examples, a diagnostic procedure may provide information used in the detection of the presence of a biological condition. A diagnostic procedure may also provide information used to determine a progression of a biological condition. In one or more illustrative examples, a diagnostic procedure may include one or more imaging procedures, one or more assays, one or more laboratory procedures, one or more combinations thereof, and the like.

The data integration and analysis system 102 may also obtain information from a molecular data repository 108. The molecular data repository 108 may store data of a number of individuals related to genomic information, genetic information, metabolomic information, transcriptomic information, fragmentomic information, immune receptor information, methylation information, epigenomic information, and/or proteomic information. In one or more examples, the data integration and analysis system 102 and the molecular data repository 108 may be created and maintained by different entities. In one or more additional examples, the data integration and analysis system 102 and the molecular data repository 108 may be created and maintained by a same entity.

The genomic information may indicate one or more mutations corresponding to genes of the individuals. A mutation to a gene of individuals may correspond to differences between a sequence of nucleic acids of the individuals and one or more reference genomes. The reference genome may include a known reference genome, such as hg19. In various examples, a mutation of a gene of an individual may correspond to a difference in a germline gene of an individual in relation to the reference genome. In one or more additional examples, the reference genome may include a germline genome of an individual. In one or more further examples, a mutation to a gene of an individual may include a somatic mutation. Mutations to genes of individuals may be related to insertions, deletions, single nucleotide variants, loss of heterozygosity, duplication, amplification, translocation, fusion genes, or one or more combinations thereof.

In one or more illustrative examples, genomic information stored by the molecular data repository 108 may include genomic profiles of tumor cells present within individuals. In these situations, the genomic information may be derived from an analysis of genetic material, such as deoxyribonucleic acid (DNA) and/or ribonucleic acid (RNA) from a sample, including, but not limited to, a tissue sample or tumor biopsy, circulating tumor cells (CTCs), exosomes or efferosomes, or from circulating nucleic acids (e.g., cell-free DNA) found in blood samples of individuals that is present due to the degradation of tumor cells present in the individuals. In one or more examples, the genomic information of tumor cells of individuals may correspond to one or more target regions. One or more mutations present with respect to the one or more target regions may indicate the presence of tumor cells in individuals. The genomic information stored by the molecular data repository 108 may be generated in relation to an assay or other diagnostic test that may determine one or more mutations with respect to one or more target regions of the reference genome.

"Cell-free DNA," "cfDNA molecules," or simply "cfDNA" include DNA molecules that occur in a subject in extracellular form (e.g., in blood, serum, plasma, or other bodily fluids such as lymph, cerebrospinal fluid, urine, or sputum) and includes DNA not contained within or otherwise bound to a cell at the point of isolation from the subject. While the DNA originally existed in a cell or cells of a large complex biological organism (e.g., a mammal) or other cells, such as bacteria, colonizing the organism, the DNA has undergone release from the cell(s) into a fluid found in the organism. cfDNA includes, but is not limited to, cell-free genomic DNA of the subject (e.g., a human subject's genomic DNA) and cell-free DNA of microbes, such as bacteria, inhabiting the subject (whether pathogenic bacteria or bacteria normally found in commonly colonized locations such as the gut or skin of healthy controls), but does not include the cell-free DNA of microbes that have merely contaminated a sample of bodily fluid. Typically, cfDNA may be obtained by obtaining a sample of the fluid without the need to perform an in vitro cell lysis step and also includes removal of cells present in the fluid (e.g., centrifugation of blood to remove cells).

In one or more additional examples, the data integration and analysis system 102 may obtain information from one or more additional data repositories 110. The one or more additional data repositories 110 may store data related to electronic medical records of individuals for which data is present in at least one of the health insurance claims data repository 106 or the molecular data repository 108. Further, the one or more additional data repositories 110 may store data related to pathology reports of individuals for which data is present in at least one of the health insurance claims data repository 106 or the molecular data repository 108. In various examples, the one or more additional data repositories 110 may store data related to biological conditions and/or treatments for biological conditions. In one or more examples, the data integration and analysis system 102 and at least a portion of the one or more additional data repositories 110 may be created and maintained by different entities. In one or more further examples, the data integration and analysis system 102 and at least a portion of the one or more additional data repositories 110 may be created and maintained by a same entity.

In one or more further implementations, the data integration and analysis system 102 may obtain information from one or more reference information data repositories 112. The one or more reference information data repositories 112 may store information that includes definitions, standards, protocols, vocabularies, one or more combinations thereof, and the like. In various examples, the information stored by the one or more reference information data repositories may correspond to biological conditions and/or treatments for biological conditions. In one or more illustrative examples, the one or more reference information data repositories 112 may include RxNorm. (RxNorm provides normalized names for clinical drugs and links its names to many of the drug vocabularies used in pharmacy management and drug interaction software.) In one or more examples, the data integration and analysis system 102 and at least a portion of the one or more reference information data repositories 112 may be created and maintained by different entities. In one or more further examples, the data integration and analysis system 102 and at least a portion of the one or more reference information data repositories 112 may be created and maintained by a same entity.

The data integration and analysis system 102 may obtain data from at least one of the health insurance claims data repository 106, the molecular data repository 108, the one or more additional data repositories 110, or the reference information data repositories 112 via one or more communication networks accessible to the data integration and analysis system 102 and accessible to at least one of the health insurance claims data repository 106, the molecular data repository 108, the one or more additional data repositories 110, or the reference information data repositories 112. The data integration and analysis system 102 may also obtain data from at least one of the health insurance claims data repository 106, the molecular data repository 108, the one or more additional data repositories 110, or the reference information data repositories 112 via one or more secure communication channels. In addition, the data integration and analysis system 102 may obtain data from at least one of the health insurance claims data repository 106, the molecular data repository 108, the one or more additional data repositories 110, or the reference information data repositories 112 via one or more calls of an application programming interface (API).

The data integration and analysis system 102 may include a data integration system 114. The data integration system 114 may obtain data from the health insurance claims data repository 106 and the molecular data repository 108 to generate the integrated data repository 104. The data integration system 114 may also obtain data from the one or more additional data repositories 110 to generate the integrated data repository 104. In various examples, the data integration system 114 may implement one or more natural language processing techniques to integrate data from the one or more additional data repositories 110 into the integrated data repository 104.

In one or more examples, the data integration system 114 may generate one or more tokens to identify individuals that have data stored in the health insurance claims data repository 106 and that have data stored in the molecular data repository 108. In various examples, the data integration system 114 may generate one or more tokens by implementing one or more hash functions. The data integration system 114 may implement the one or more hash functions to generate the one or more tokens based on information stored by at least one of the health insurance claims data repository 106 or the molecular data repository 108. For example, the information used by the data integration system 114 to generate individual tokens by implementing a hash function may include at least one of an identifier of respective individuals, date of birth of the respective individuals, a postal code of the respective individuals, date of birth of the respective individuals, or a gender of the respective individuals. In one or more illustrative examples, the identifiers of the respective individuals may include a combination of at least a portion of a first name of the respective individuals and at least a portion of the last name of the respective individuals. Tokens generated using data from different data repositories may correspond to the same or similar information or the same or similar type stored by the different data repositories. To illustrate, tokens may be generated using a portion of names of individuals, date of birth, at least a portion of a postal code, and gender obtained from the health insurance claims data repository 106 and the molecular data repository 108.

The data integration system 114 may integrate data from a number of different data sources by analyzing tokens generated by implementing one or more hash functions using data obtained from the number of different data sources. For example, the data integration system 114 may obtain one or more first tokens generated from data stored by the health insurance claims data repository 106 and one or more second tokens generated from data stored by the molecular data repository 108. The data integration system 114 may analyze the one or more first tokens with respect to the one or more second tokens to determine individual first tokens that correspond to individual second tokens. In one or more illustrative examples, the data integration system 114 may identify individual first tokens that match individual second tokens. A first token may match a second token when the data of the first token has at least a threshold amount of similarity with respect to the data of the second token. In one or more examples, a first token may match a second token when the data of the first token is the same as the data of the second token. To illustrate, a first token may match a second token when an alphanumeric string of the first token is the same as an alphanumeric string of the second token.

By determining a first token generated using data stored by the health insurance claims data repository 106 that corresponds to a second token generated using data stored by the molecular data repository 108, the data integration system 114 may identify an individual having data that is stored in both the health insurance claims data repository 106 and in the molecular data repository 108. In this way, the data integration system 114 may obtain data from the health insurance claims data repository 106 from a number of individuals and data from the molecular data repository 108 from the same number of individuals and store the health insurance claims data and the molecular data for the number of individuals in the integrated data repository 104.

The data integration system 114 may also integrate data stored by the one or more additional data repositories 110 with data from the health insurance claims data repository 106 and the molecular data repository 108 to generate the integrated data repository 104. To illustrate, the data integration system 114 may obtain one or more third tokens generated from data stored by an additional data repository 110, such as a data repository storing data corresponding to pathology reports. The data integration system 114 may analyze the one or more third tokens with respect to the first tokens generated using information stored by the health insurance claims data repository 106 and the second tokens generated using information stored by the molecular data repository 108 to determine respective third tokens that correspond to individuals first tokens and individual second tokens. In one or more illustrative examples, the data integration system 114 may identify third tokens generated using one or more hash functions and a common set of information obtained from the health insurance claims data repository 106, the molecular data repository 108, and the additional data repository 110.

By determining a third token generated using data stored by an additional data repository 110 that corresponds to a first token generated using data stored by the health insurance claims data repository 106 and a second token generated using data stored by the molecular data repository 108, the data integration system 114 may identify an individual having data that is stored in the health insurance claims data repository 106, the molecular data repository 108, and in an additional data repository 110. In this way, the data integration system 114 may obtain data from the health insurance claims data repository 106 from a number of individuals and data from the molecular data repository 108 and an additional data repository 110 from the same number of individuals and store the health insurance claims data, the molecular data, and the additional data for the number of individuals in the integrated data repository 104.

The data stored by the integrated data repository 104 for the number of individuals may be accessible using respective identifiers of individuals. The data integration system 114 may implement a number of techniques as part of a de-identification process with respect to storing and retrieving information of individuals in the integrated data repository 104. The identifiers of individuals may correspond to keys that are generated using at least one hash function. The identifiers of the individuals may also be generated by implementing one or more salting processes with respect to the keys generated using the at least one hash function, the tokens generated using one or more hash functions and a common set of information obtained from the health insurance claims data repository 106, the molecular data repository 108, and/or the additional data repository 110. In one or more illustrative examples, the identifiers generated by the data integration system 114 to access information for respective individuals that is stored by the integrated data repository 104 may be unique for each individual. In one or more examples, the identifiers of the individuals may be generated using at least a portion of the information used to generate the tokens related to the individuals. In one or more additional examples, the identifiers of the individuals may be generated using different information from the information used to generate the tokens related to the individuals.

The data integration system 114 may also generate the integrated data repository 104 from a number of different combinations of data repositories in a similar manner. For example, the data integration system 114 may obtain tokens generated from information stored by the health insurance claims data repository 106 and additional tokens generated from information stored by one or more additional data stores 110. The data integration system 114 may determine individual tokens generated from information stored by the health insurance claims data repository 106 that correspond to individual additional tokens generated from information stored by the one or more additional data repositories 110. By determining tokens generated using data stored by the health insurance claims data repository 106 that correspond to additional tokens generated using data stored by an additional data repository 110, the data integration system 114 may identify individuals having data that is stored in both the health insurance claims data repository 106 and in the additional data repository 110. In this way, the data integration system 114 may obtain data from the health insurance claims data repository 106 from a number of individuals and data from the additional data repository 110 from the same number of individuals and store the health insurance claims data and the additional data for the number of individuals in the integrated data repository 104. The health insurance claims data and the additional data stored by the integrated data repository 104 for the number of individuals may be accessible using respective identifiers of individuals.

In one or more further examples, the data integration system 114 may obtain tokens generated from information stored by the molecular data repository 108 and tokens generated from information stored by one or more additional data stores 110. The data integration system 114 may determine individual tokens generated from information stored by the molecular data repository 108 that correspond to individual additional tokens generated from information stored by the one or more additional data repositories 110. By determining tokens generated using data stored by the molecular data repository 108 that correspond to additional tokens generated using data stored by an additional data repository 110, the data integration system 114 may identify individuals having data that is stored in both the molecular data repository 108 and in the additional data repository 110. In this way, the data integration system 114 may obtain data from the molecular data repository 108 from a number of individuals and data from the additional data repository 110 from the same number of individuals and store the molecular data and the additional data for the number of individuals in the integrated data repository 104. The molecular data and the additional data stored by the integrated data repository 104 for the number of individuals may be accessible using respective identifiers of individuals.

The data stored by the integrated data repository 104 may be stored according to one or more regulatory frameworks that protect the privacy and ensure the security of medical records, health information, and insurance information of individuals. For example, data may be stored by the integrated data repository 104 in accordance with one or more governmental regulatory frameworks directed to protecting personal information, such as the Health Insurance Portability and Accountability Act (HIPAA) and/or the General Data Protection Regulation (GDPR). The integrated data repository 104 also stores data in an anonymized and de-identified manner to ensure protection of the privacy of individuals that have data stored by the integrated data repository 104. To further ensure the privacy of individuals that have data stored by the integrated data repository 104, the data integration system 114 may re-generate the integrated data repository 104 periodically. For example, the data integration system 114 may create the integrated data repository 104 once per quarter. In one or more additional examples, the data integration system 114 may generated the integrated data repository 104 on a monthly basis, on a weekly basis, or once every two weeks. By re-generating the integrated data repository 104 on a periodic basis and not simply refreshing the integrated data repository 104 when new data is available, the integrated data repository 104 enhances privacy protection with respect to data stored by the integrated data repository 104. That is, in situations where data repositories are refreshed simply with new data, it may be possible to more easily track individuals associated with data that has been newly added to a data repository because the number of new individuals added at a given time is typically smaller than an existing number of individuals that already have data stored by the data repository.

In various examples, data stored by the integrated data repository 104 may be accessed via a database management system. In addition, the integrated data repository 104 may store data according to one or more database models. In one or more examples, the integrated data repository 104 may store data according to one or more relational database technologies. For example, the integrated data repository 104 may store data according to a relational database model. In one or more additional examples, the integrated data repository 104 may store data according to an object-oriented database model. In one or more further examples, the integrated data repository 104 may store data according to an extensible markup language (XML) database model. In still additional examples, the integrated data repository 104 may store data according to a structured query language (SQL) database model. In still further examples, the integrated data repository may store data according to an image database model.

The data integration system 114 may generate the integrated data repository 104 by generating a number of data tables and creating links between the data tables. The links may indicate logical couplings between the data tables. The data integration system 114 may generate the data tables by extracting specified sets of data from the information obtained from the data repositories 106, 108, 110, 112 and storing the data in rows and columns of respective data tables. In various examples, the logical couplings between data tables may include at least one of a one-to-one link where a row of information in one data table corresponds to a row of information in another data table, a one-to-many link where a row of information in one data table corresponds to multiple rows of information in another data table, or a many-to-many link where multiple rows of information of one data table correspond to multiple rows of information in another data table.

The number of data tables may be arranged according to a data repository schema 116. In the illustrative example of FIG. 1, the data repository schema 114 includes a first data table 118, a second data table 120, a third data table 122, a fourth data table 124, and a fifth data table 124. Although the illustrative example of FIG. 1 includes five data tables, in additional implementations, the data repository schema 116 may include more data tables or fewer data tables. The data repository schema 116 may also include links between the data tables 118, 120, 122, 124, 128. The links between the data tables 118, 120, 122, 124, 126 may indicate that information retrieved from one of the data tables 118, 120, 122, 124, 126 results in additional information stored by one or more additional data tables 118, 120, 122, 124, 126 to be retrieved. Additionally, not all the data tables 118, 120, 122, 124, 126 may be linked to each of the other data tables 118, 120, 120, 122, 124, 126. In the illustrative example of FIG. 1, the first data table 118 is logically coupled to the second data table 118 by a first link 128 and the first data table 118 is logically coupled to the fourth data table 124 by a second link 130. In addition, the second data table 120 is logically coupled to the third data table 122 via a third link 132 and the fourth data table 124 is logically coupled to the fifth data table 126 via a fourth link 134. Further, the third data table 122 is logically coupled to the fifth data table 126 via a fifth link 136.

In various examples, as data tables are added to and/or removed from the data repository schema 116, additional links between data tables may be added to or removed from the data repository schema 116. In one or more illustrative examples, the integrated data repository 104 may store data tables according to the data repository schema 116 for at least a portion of the individuals for which the data integration system 114 obtained information from a combination of at least two of the health insurance claims data repository 106, the molecular data repository 108, the one or more additional data repositories 110, and the one or more reference information data repositories 112. As a result, the integrated data repository 104 may store respective instances of the data tables 118, 120, 122, 124, 126 according to the data repository schema 116 for thousands, tens of thousands, up to hundreds of thousands or more individuals.

The data integration and analysis system 102 may also include a data pipeline system 138. The data pipeline system 138 may include a number of algorithms, software code, scripts, macros, or other bundles of computer-executable instructions that process information stored by the integrated data repository 104 to generate additional datasets. The additional datasets may include information obtained from one or more of the data tables 118, 120, 122, 124, 126. The additional datasets may also include information that is derived from data obtained from one or more of the data tables 118, 120, 122, 124, 126. The components of the data pipeline system 138 implemented to generate a first additional dataset may be different from the components of the data pipeline system 138 used to generate a second additional dataset.

In one or more examples, the data pipeline system 138 may generate a dataset that indicates pharmacy treatments received by a number of individuals. In one or more illustrative examples, the data pipeline system 138 may analyze information stored in at least one of the data tables 118, 120, 122, 124, 126 to determine health insurance codes corresponding to pharmaceutical treatments received by a number of individuals. The data pipeline system 138 may analyze the health insurance codes corresponding to pharmaceutical treatments with respect to a library of data that indicates specified pharmaceutical treatments that correspond to one or more health insurance codes to determine names of pharmaceutical treatments that have been received by the individuals. In one or more additional examples, the data pipeline system 138 may analyze information stored by the integrated data repository 104 to determine medical procedures received by a number of individuals. To illustrate, the data pipeline system 138 may analyze information stored by one of the data tables 118, 120, 122, 124, 126 to determine treatments received by individuals via at least one of injection or intravenously. In one or more further examples, the data pipeline system 138 may analyze information stored by the integrated data repository 104 to determine episodes of care for individuals, lines of therapy received by individuals, progression of a biological condition, or time to next treatment. In various examples, the datasets generated by the data pipeline system 138 may be different for different biological conditions. For example, the data pipeline system 138 may generate a first number of datasets with respect to a first type of cancer, such as lung cancer, and a second number of datasets with respect to a second type of cancer, such as colorectal cancer.

The data pipeline system 138 may also determine one or more confidence levels to assign to information associated with individuals having data stored by the integrated data repository 104. The respective confidence levels may correspond to different measures of accuracy for information associated with individuals having data stored by the integrated data repository 104. The information associated with the respective confidence levels may correspond to one or more characteristics of individuals derived from data stored by the integrated data repository 104. Values of confidence levels for the one or more characteristics may be generated by the data pipeline system 138 in conjunction with generating one or more datasets from the integrated data repository 104. In one or more examples, a first confidence level may correspond to a first range of measures of accuracy, a second confidence level may correspond to a second range of measures of accuracy, and a third confidence level may correspond to a third range of measures of accuracy. In one or more additional examples, the second range of measures of accuracy may include values that are less values of the first range of measures of accuracy and the third range of measures of accuracy may include values that are less than values of the second range of measures of accuracy. In one or more illustrative examples, information corresponding to the first confidence level may be referred to as Gold standard information, information corresponding to the second confidence level may be referred to as Silver standard information, and information corresponding to the third confidence level may be referred to as Bronze standard information.

The data pipeline system 138 may determine values for the confidence levels of characteristics of individuals based on a number of factors. For example, a respective set of information may be used to determine characteristics of individuals. The data pipeline system 138 may determine the confidence levels of characteristics of individuals based on an amount of completeness of the respective set of information used to determine a characteristic for an individual. In situations where one or more pieces of information are missing from the set of information associated with a first number of individuals, the confidence levels for a characteristic may be lower than for a second number of individuals where information is not missing from the set of information. In one or more examples, an amount of missing information may be used by the data pipeline system 138 to determine confidence levels of characteristics of individuals. To illustrate, a greater amount of missing information used to determine a characteristic of an individual may cause confidence levels for the characteristic to be lower than in situations where the amount of missing information used to determine the characteristic is lower. Further, different types of information may correspond to various confidence levels for a characteristic. In one or more examples, the presence of a first piece of information used to determine a characteristic of an individual may result in confidence levels for the characteristic being higher than the presence of a second piece of information used to determine the characteristic.

In one or more illustrative examples, the data pipeline system 138 may determine a number of individuals included in a cohort with a primary diagnosis of lung cancer (or other biological condition). The data pipeline system 138 may determine confidence levels for respective individuals with respect to being classified as having a primary diagnosis of lung cancer. The data pipeline system 138 may use information from a number of columns included in the data tables 118, 120, 122 124, 126 to determine a confidence level for the inclusion of individuals within a lung cancer cohort. The number of columns may include health insurance codes related to diagnosis of biological conditions and/or treatments of biological conditions. Additionally, the number of columns may correspond to dates of diagnosis and/or treatment for biological conditions. The data pipeline system 138 may determine that a confidence level of an individual being characterized as being part of the lung cancer cohort is higher in scenarios where information is available for each of the number of columns or at least a threshold number of columns than in instances where information is available for less than a threshold number of columns. Further, the data pipeline system 138 may determine confidence levels for individuals included in a lung cancer cohort based on the type of information and availability of information associated with one or more columns. To illustrate, in situations where one or more diagnosis codes are present in relation to one or more periods of time for a group of individuals and one or more treatment codes are absent, the data pipeline system 138 may determine that the confidence level of including the group of individuals in the lung cancer cohort is greater than in situations where at least one of the diagnosis codes is absent and the treatment codes used to determine whether individuals are included in the lung cancer cohort are present.

The data integration and analysis system 102 may include a data analysis system 140. The data analysis system 148 may receive integrated data repository requests 142 from one or more computing devices, such as an example computing device 144. The one or more integrated data repository requests 142 may cause data to be retrieved from the integrated data repository 104. In various examples, the one or more integrated data repository requests 142 may cause data to be retrieved from one or more datasets generated by the data pipeline system 138. The integrated data repository requests 142 may specify the data to be retrieved from the integrated data repository 104 and/or the one or more datasets generated by the data pipeline system 138. In one or more additional examples, the integrated data repository requests 142 may include one or more prebuilt queries that correspond to computer-executable instructions that retrieve a specified set of data from the integrated data repository 104 and/or one or more datasets generated by the data pipeline system 138.

In response to one or more integrated data repository requests 142, the data analysis system 140 may analyze data retrieved from at least one of the integrated data repository 104 or one or more datasets generated by the data pipeline system 138 to generate data analysis results 146. The data analysis results 146 may be sent to one or more computing devices, such as example computing device 148. Although the illustrative example of FIG. 1 shows that the one or more integrated data repository requests 142 from one computing device 144 and the data analysis results 146 being sent to another computing device 148, in one or more additional implementations, the data analysis results 146 may be received by a same computing device that sent the one or more integrated data repository requests 142. The data analysis results 146 may be displayed by one or more user interfaces rendered by the computing device 144 or the computing device 148.

In one or more examples, the data analysis system 140 may implement at least one of one or more machine learning techniques or one or more statistical techniques to analyze data retrieved in response to one or more integrated data repository requests 142. In one or more examples, the data analysis system 140 may implement one or more artificial neural networks to analyze data retrieved in response to one or more integrated data repository requests 142. To illustrate, the data analysis system 140 may implement at least one of one or more convolutional neural networks or one or more residual neural networks to analyze data retrieved from the integrated data repository 104 in response to one or more integrated data repository requests 142. In at least some examples, the data analysis system 140 may implement one or more random forests techniques, one or more support vector machines, or one or more Hidden Markov models to analyze data retrieved in response to one or more integrated data repository requests 142. One or more statistical models may also be implemented to analyzed data retrieved in response to one or more integrated data repository requests 142 to identify at least one of correlations or measures of significance between characteristics of individuals. For example, log rank tests may be applied to data retrieved in response to one or more integrated data repository requests 142. In addition, Cox proportional hazards models may be implemented with respect to date retrieved in response to one or more integrated data repository requests 142. Further, Wilcoxon singed rank tests may be applied to data retrieved in response to one or more integrated data repository requests 142. In still other examples, a z-score analysis may be performed with respect to data retrieved in response to one or more integrated data repository requests 142. In still additional examples, a Kaplan Meier analysis may be performed with respect to data retrieved in response to one or more integrated data repository requests 142. In at least some examples, one or more machine learning techniques may be implemented in combination with one or more statistical techniques to analyze data retrieved in response to one or more integrated data repository requests 142.

In one or more illustrative examples, the data analysis system 140 may determine a rate of survival of individuals in which lung cancer is present in response to one or more treatments. In one or more additional illustrative examples, the data analysis system 140 may determine a rate of survival of individuals having one or more genomic region mutations in which lung cancer is present in response to one or more treatments. In various examples, the data analysis system 140 may generate the data analysis results 146 in situations where the data retrieved from at least one of the integrated data repository 104 or the one or more datasets generated by the data pipeline system 138 satisfies one or more criteria. For example, the data analysis system 140 may determine whether at least a portion of the data retrieved in response to one or more integrated data repository requests 142 satisfies a threshold confidence level. In situations where the confidence level for at least a portion of the date retrieved in response to one or more integrated data repository requests 142 is less than a threshold confidence level, the data analysis system 140 may refrain from generating at least a portion of data analysis results 146. In scenarios where the confidence level for at least a portion of the data retrieved in response to one or more integrated data repository requests 142 is at least a threshold confidence level, the data analysis system 140 may generate at least a portion of the data analysis results 146. In various examples, the threshold confidence level may be related to the type of data analysis results 146 being generated by the data analysis system 140.

In one or more illustrative examples, the data analysis system 140 may receive an integrated data repository request 142 to generate data analysis results 146 that indicate a rate of survival of one or more individuals. In these instances, the data analysis system 140 may determine whether the data stored by the integrated data repository 104 and/or by one or more datasets generated by the data pipeline system 138 satisfies a threshold confidence level, such as a Gold standard confidence level. In one or more additional examples, the data analysis system 140 may receive an integrated data repository request 142 to generate data analysis results 146 that indicate a treatment received by one or more individuals. In these implementations, the data analysis system 140 may determine whether the data stored by the integrated data repository 104 and/or by one or more datasets generated by the data pipeline system 138 satisfies a lower threshold confidence level, such as a Bronze standard confidence level.

In one or more additional illustrative examples, the data analysis system 140 may receive an integrated data repository request 142 to determine individuals having one or more genomic mutations and that have received one or more treatments for a biological condition. Continuing with this example, the data analysis system 140 can determine a survival rate of individuals with the one or more genomic mutations in relation to the one or more treatments received by the individuals. The data analysis system 140 can then identify based on the survival rate of individuals an effectiveness of treatments for the individuals in relation to genomic mutations that may be present in the individuals. In this way, health outcomes of individuals may be improved by identifying prospective treatments that may be more effective for populations of individuals having one or more genomic mutations than current treatments being provided to the individuals.

Figure 2:
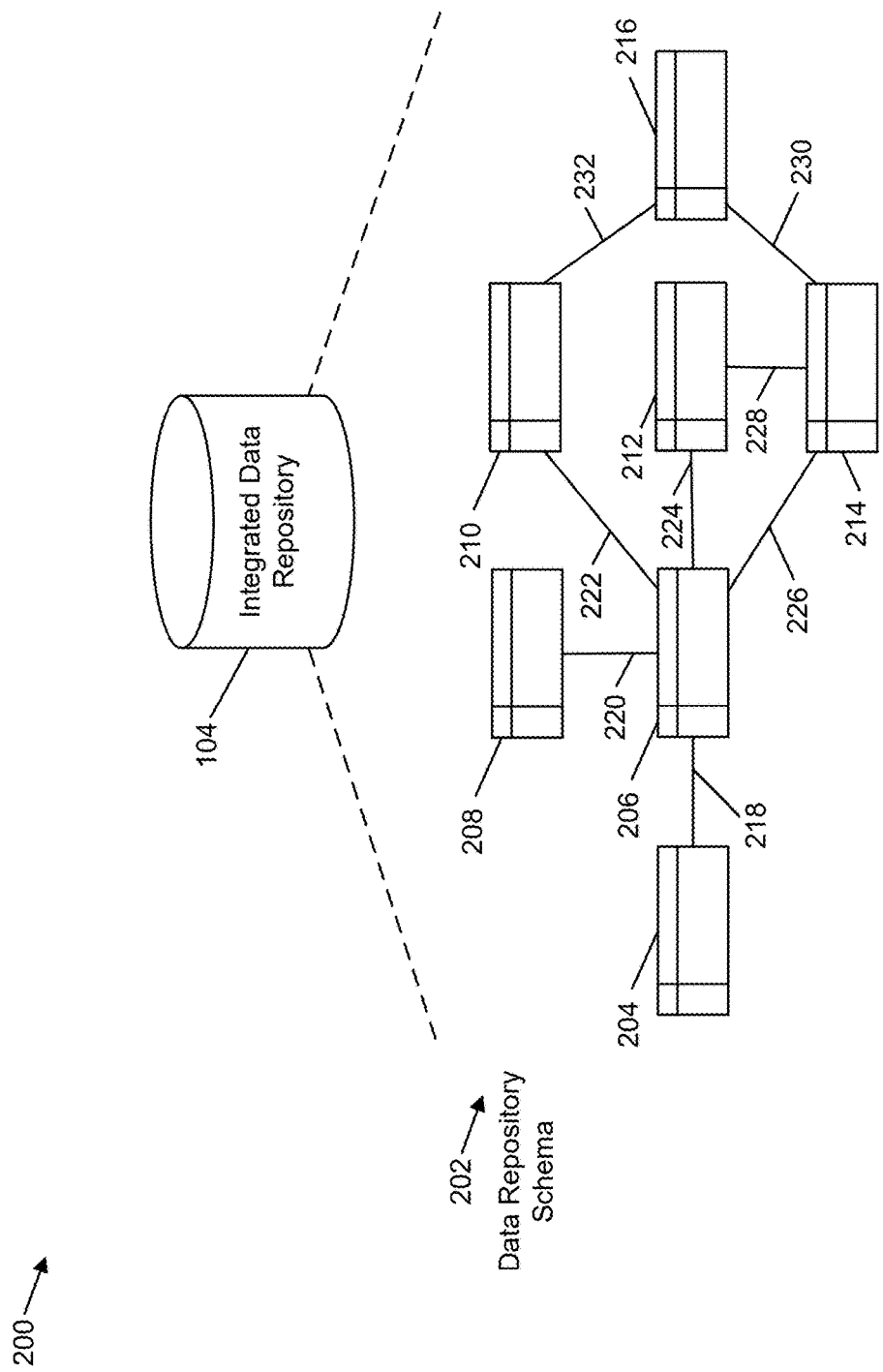
FIG. 2 illustrates an example framework corresponding to an arrangement of data tables in an integrated data repository, according to one or more implementations.

FIG. 2 illustrates an example framework 200 corresponding to an arrangement of data tables in an integrated data repository, according to one or more implementations. In the illustrative example of FIG. 2, the framework 200 includes a data repository schema 202 that includes a first data table 204, a second data table 206, a third data table 208, a fourth data table 210, a fifth data table 212, a sixth data table 214, and a seventh data table 216. Although the illustrative example of FIG. 2 includes seven data tables, in additional implementations, the data repository schema 202 may include more data tables or fewer data tables. The data repository schema 202 may also include links between the data tables 204, 206, 208, 210, 212, 214, 216. The links between the data tables 204, 206, 208, 210, 212, 214, 216 may indicate that information retrieved from one of the data tables 204, 206, 208, 210, 212, 214, 216 results in additional information stored by one or more additional data tables 204, 206, 208, 210, 212, 214, 216 to be retrieved. Additionally, not all the data tables 204, 206, 208, 210, 212, 214, 216 may be linked to each of the other data tables 204, 206, 208, 210, 212, 214, 216. In the illustrative example of FIG. 2, the first data table 204 is logically coupled to the second data table 206 by a first link 218 and the third data table 208 is logically coupled to the second data table 206 by a second link 220. The second data table 206 is also logically coupled to the fourth data table 210 by a third link 222, the second data table 206 is logically coupled to the fifth data table 212 by a fourth link 224, and the second data table 206 is logically coupled to the sixth data table 214 by a fifth link 226. In addition, fifth data table 212 is logically coupled to the sixth data table 214 by a sixth link 228 and the sixth data table 214 is logically coupled to the seventh data table 216 by a seventh link 230. Further, the seventh data table 216 is logically coupled to the fourth data table 210 by an eighth link 232. In various examples, as data tables are added to and/or removed from the data repository schema 202, additional links between data tables may be added to or removed from the data repository schema 202. In one or more illustrative examples, the integrated data repository 104 may store data tables according to the data repository schema 202 for at least a portion of the individuals for which the data integration system 114 obtained information from a combination of at least two of the health insurance claims data repository 106, the molecular data repository 108, and the one or more additional data repositories 110. As a result, the integrated data repository 104 may store respective instances of the data tables 204, 206, 208, 210, 212, 214, 216 according to the data repository schema 204 for thousands, tens of thousands, up to hundreds of thousands or more individuals.

In one or more examples, the first data table 204 may store data corresponding to genomics and genomics testing for individuals. For example, the first data table 204 may include columns that include information corresponding to a panel used to generate genomics data, mutations of genomic regions, types of mutations, copy numbers of genomic regions, coverage data indicating numbers of nucleic acid molecules identified in a sample having one or more mutations, testing dates, and patient information. The first data table 204 may also include one or more columns that include health insurance data codes that may correspond to one or more diagnosis codes. Additionally, the information in first data table 204 may include at least one identifier for an individual that is associated with an instance of the first data table 204.

The second data table 206 may store data related to one or more patient visits by individuals to one or more healthcare providers. The third data table 208 may store information corresponding to respective services provided to individuals with respect to one or more patient visits to one or more healthcare providers indicated by the second data table 206. To illustrate, an individual may visit a healthcare provider and multiple services may be performed with respect to the individual at the visit. A second data table 206 may include columns indicating information for each of the multiple services performed during the patient visit. Multiple third data tables 208 may be generated with respect to the patient visit that include columns indicating information on a more granular level for a respective service provided during the patient visit than the information stored by the second data table 206 related to the patient visit. For example, the second data table 206 may include multiple columns indicating a health insurance code for different services provided to an individual during a patient visit and a third data table 208 related to one of the services may include multiple columns for additional health insurance codes that correspond to additional information related to the respective services. The second data table 206 and the third data table(s) 208 for a patient visit may indicate one or more dates of service corresponding to the patient visit.

The fourth data table 210 may include columns that indicate information about individuals for which information is stored by the integrated data repository 104. For example, the fourth data table 210 may include columns that indicate information related to at least one of a location of an individual, a gender of an individual, a date of birth of an individual, a date of death of an individual (if applicable), or one or more keys associated with the individual. In one or more examples, the fourth data table 210 may include one or more columns related to whether erroneous data has been identified for an individual. In various examples, a single fourth data table 210 may be generated for respective individuals. Thus, the data repository schema 202 may include multiple instances of the fourth data table 210, such as thousands, tens of thousands, up to hundreds of thousands or more.

The fifth data table 212 may include columns that indicate information related to a health insurance company or governmental entity that made payment for one or more services provided to respective individuals. For example, the fifth data table 212 may include one or more payer identifiers. The sixth data table 214 may include columns that include information corresponding to health insurance coverage information for respective individuals. In one or more examples, the sixth data table 214 may include columns indicating the presence of medical coverage for an individual, the presence of pharmacy coverage for an individual, and a type of health insurance plan related to the individual, such as health maintenance organization (HMO), preferred provider organization (PPO), and the like.

The seventh data table 216 may include columns that indicate information related to pharmaceutical treatments obtained by a respective individual. In one or more examples, the seventh data table 216 may include one or more columns indicating health insurance codes corresponding to pharmaceutical treatments that are available via a pharmacy. The health insurance codes may correspond to individual pharmaceutical treatments. Additionally, the health insurance codes may indicate a diagnosis of a biological condition with respect to an individual. The seventh data table 216 may also include additional information, such as at least one of dosage amounts, number of days' supply, quantity dispensed, number of refills authorized, dates of service, or information related to the individual receiving the pharmaceutical treatment.

In various examples, the data repository schema 202 may provide results of analysis of the information stored by the data tables 204, 206, 208, 210, 212, 214, 216 in a more efficient manner than typical data repository schemas. For example, the logical connections between the data tables 204, 206, 208, 210, 212, 214, 216 are arranged to efficiently retrieve data that is related across the different data tables 204, 206, 208, 210, 212, 214, 216. In situations where the data tables 204, 206, 208, 210, 212, 214, 216 are arranged in a serial manner and/or in situations where a greater number of the data tables 204, 206, 208, 210, 212, 214, 216 are logically connected, retrieving data from the integrated data repository 104 from one or more of the data tables 204, 206, 208, 210, 212, 214, 216 to responds to a request for information from the integrated data repository 104 will be less efficient than in situations where the data repository schema 202 is implemented.

Figure 3:
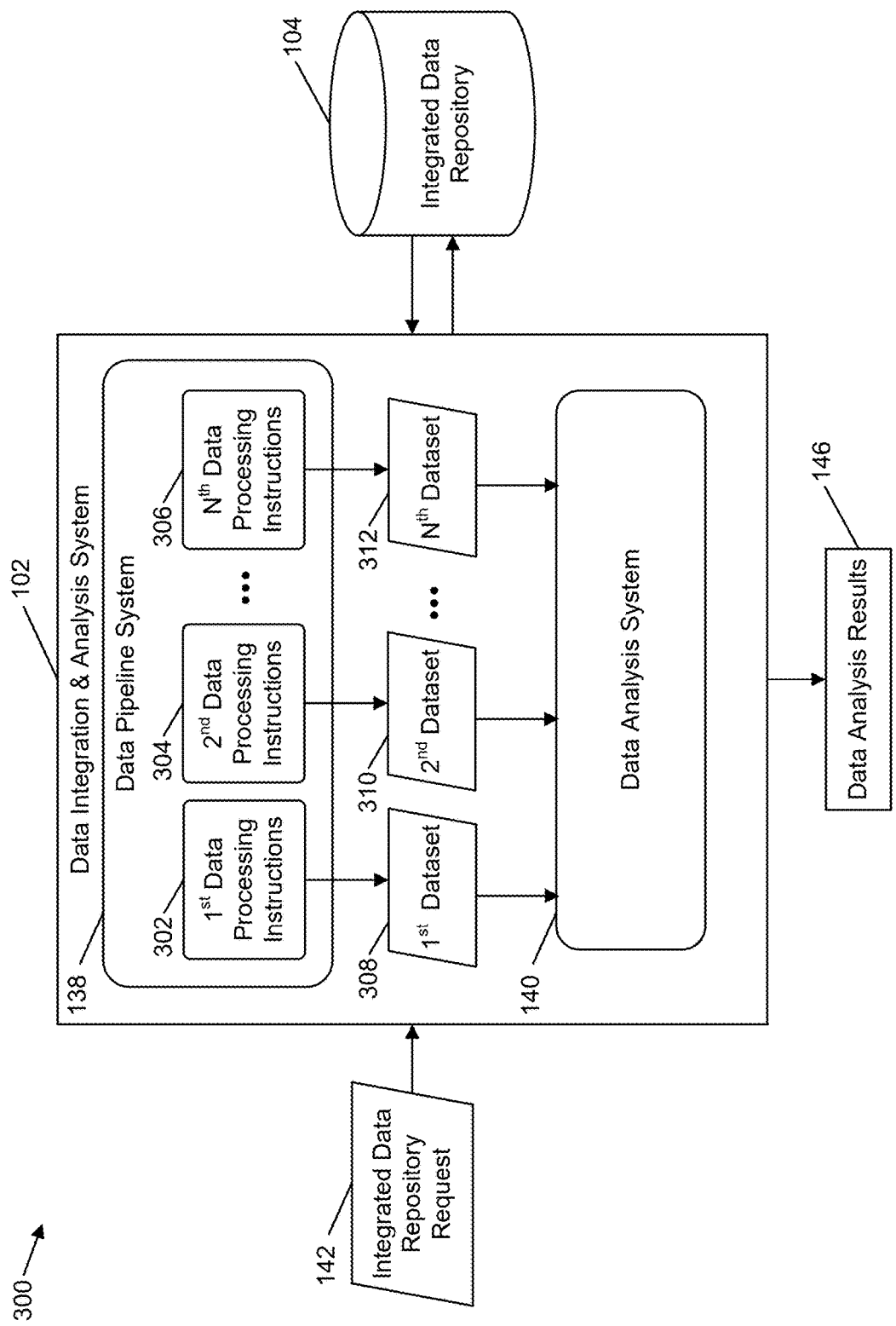
FIG. 3 illustrates an architecture to generate one or more datasets from information retrieved from a data repository that integrates health related data from a number of sources, according to one or more implementations.

FIG. 3 illustrates an architecture 300 to generate one or more datasets from information retrieved from a data repository that integrates health related data from a number of sources, according to one or more implementations. The architecture 300 may include the data integration and analysis system 102 and the integrated data repository 104. Additionally, the data integration and analysis system 102 may include at least the data pipeline system 138 and the data analysis system 140. The data pipeline system 138 may include a number of sets of data processing instructions that are executable to generate respective datasets that may be analyzed by the data analysis system 140 in response to an integrated data repository request 142 to generate data analysis results 146.

The data pipeline system 138 may include first data processing instructions 302, second data processing instructions 304, up to Nth data processing instructions 306. The data processing instructions 302, 304, 306 may be executable by one or more processing units to perform a number of operations to generate respective datasets using information obtained from the integrated data repository 104. In one or more illustrative examples, the data processing instructions 302, 304, 306 may include at least one of software code, scripts, API calls, macros, and so forth. The first data processing instructions 302 may be executable to generate a first dataset 308. In addition, the second data processing instructions 304 may be executable to generate a second dataset 310. Further, the Nth data processing instructions 306 may be executable to generate an Nth dataset 312. In various examples, after the data integration and analysis system 102 generates the integrated data repository 104, the data pipeline system 138 may cause the data processing instructions 302, 304, 306 to be executed to generate the datasets 308, 310, 312. In one or more examples, the datasets 308, 310, 312 may be stored by the integrated data repository 104 or by an additional data repository that is accessible to the data integration and analysis system 102. At least a portion of the data processing instructions 302, 304, 306 may analyze health insurance codes to generate at least a portion of the datasets 308, 310, 312. Additionally, at least a portion of the data processing instructions 302, 304, 306 may analyze genomics data to generate at least a portion of the datasets 308, 310, 312.

In one or more examples, the first data processing instructions 302 may be executable to retrieve data from one or more first data tables stored by the integrated data repository 104. The first data processing instructions 302 may also be executable to retrieve data from one or more specified columns of the one or more first data tables. In various examples, the first data processing instructions 302 may be executable to identify individuals that have a health insurance code stored in one or more column and row combinations that correspond to one or more diagnosis codes. The first data processing instructions 302 may then be executable to analyze the one or more diagnosis codes to determine a biological condition for which the individuals have been diagnosed. In one or more illustrative examples, the first data processing instructions 302 may be executable to analyze the one or more diagnosis codes with respect to a library of diagnosis codes that indicates one or more biological conditions that correspond to respective diagnosis codes. The library of diagnosis codes may include hundreds up to thousands of diagnosis codes. The first data processing instructions 302 may also be executable to determine individuals diagnosed with a biological condition by analyzing timing information of the individuals, such as dates of treatment, dates of diagnosis, dates of death, one or more combinations thereof, and the like.

The second data processing instructions 304 may be executable to retrieve data from one or more second data tables stored by the integrated data repository 104. The second data processing instructions 304 may also be executable to retrieve data from one or more specified columns of the one or more second data tables. In various examples, the second data processing instructions 304 may be executable to identify individuals that have a health insurance code stored in one or more column and row combinations that correspond to one or more treatment codes. The one or more treatment codes may correspond to treatments obtained from a pharmacy. In one or more additional examples, the one or more treatment codes may correspond to treatments received by a medical procedure, such as an injection or intravenously. The second data processing instructions 304 may be executable to determine one or more treatments that correspond to the respective health insurance codes included in the one or more second data tables by analyzing the health insurance code in relation to a predetermined set of information. The predetermined set of information may include a data library that indicates one or more treatments that correspond to one out of hundreds up to thousands of health insurance codes. The second data processing instructions 304 may generate the second dataset 310 to indicate respective treatments received by a group of individuals. In one or more illustrative examples, the group of individuals may correspond to the individuals included in the first dataset 308. The second dataset 310 may be arranged in rows and columns with one or more rows corresponding to a single individual and one or more columns indicating the treatments received by the respective individual.

The Nth processing instructions 306 (where N may be any positive integer) may be executable to generate the Nth dataset 312 by combining information from a number of previously generated datasets, such as the first dataset 308 and the second dataset 310. In addition, the Nth processing instructions 306 may be executable to generate the Nth dataset 312 to retrieve additional information from one or more additional columns of the integrated data repository 104 and incorporate the additional information from the integrated data repository 104 with information obtained from the first dataset 308 and the second dataset 310. For example, the Nth processing instructions 306 may be executable to identify individuals included in the first dataset 308 that are diagnosed with a biological condition and analyze specified columns of one or more additional data tables of the integrated data repository 104 to determine dates of the treatments indicated in the second dataset 210 that correspond to the individuals included in the first dataset 308. In one or more further examples, the Nth processing instructions 306 may be executable to analyze columns of one or more additional data tables of the integrated data repository 104 to determine dosages of treatments indicated in the second dataset 310 received by the individuals included in the first dataset 308. In this way, the Nth processing instructions 306 may be executable to generate an episodes of care dataset based on information included in a cohort dataset and a treatments dataset.

In one or more illustrative examples, in response to receiving an integrated data repository request 142, the data analysis system 140 may determine one or more datasets that correspond to the features of the query related to the integrated data repository request 142. For example, the data analysis system 140 may determine that information included in the first dataset 308 and the second dataset 310 is applicable to responding to the integrated data repository request 142. In these scenarios, the data analysis system 140 may analyze at least a portion of the data included in the first dataset 308 and the second dataset 310 to generate the data analysis results 146. In one or more additional examples, the data analysis system 140 may determine different datasets to respond to different queries included in the integrated data repository request 142 in order to generate the data analysis results 146.

The use of specific sets of data processing instructions to generate respective data sets may reduce the number of inputs from users of the data integration and analysis system 102 as well as reduce the computational load, such as the amount of processing resources and memory, utilized to process integrated data repository requests 142. For example, without the specific architecture of the data pipeline system 138, each time an integrated data repository request 142 is received, the data utilized to respond to the integrated data repository request 142 is assembled from the data repository 104. In contrast, by implementing the data pipeline system 138 to execute the data processing instruction 302, 304, 306 to generate the datasets 308, 310, 312, the data needed to respond to various integrated data repository requests 142 has already been assembled and may be accessed by the data analysis system 140 to respond to the integrated data repository request 142. Thus, the computing resources used to respond to the integrated data repository request 142 by implementing the data pipeline system 138 to generate the datasets 308, 310, 312 are less than typical systems that perform an information parsing and collecting process for each integrated data repository request 142. Further, in situations where the data pipeline system 138 has not been implemented, users of the data integration and analysis system 102 may need to submit multiple integrated data repository request 142 in order to analyze the information that the users are intending to have analyzed either because the ad hoc collection of data to respond to an integrated data repository request 142 in typical systems is inaccurate or because the data analysis system 140 is called upon multiple times to perform an analysis of information in typical systems that may be performed using a single integrated data repository request 142 when the data pipeline system 138 is implemented.

Figure 4:
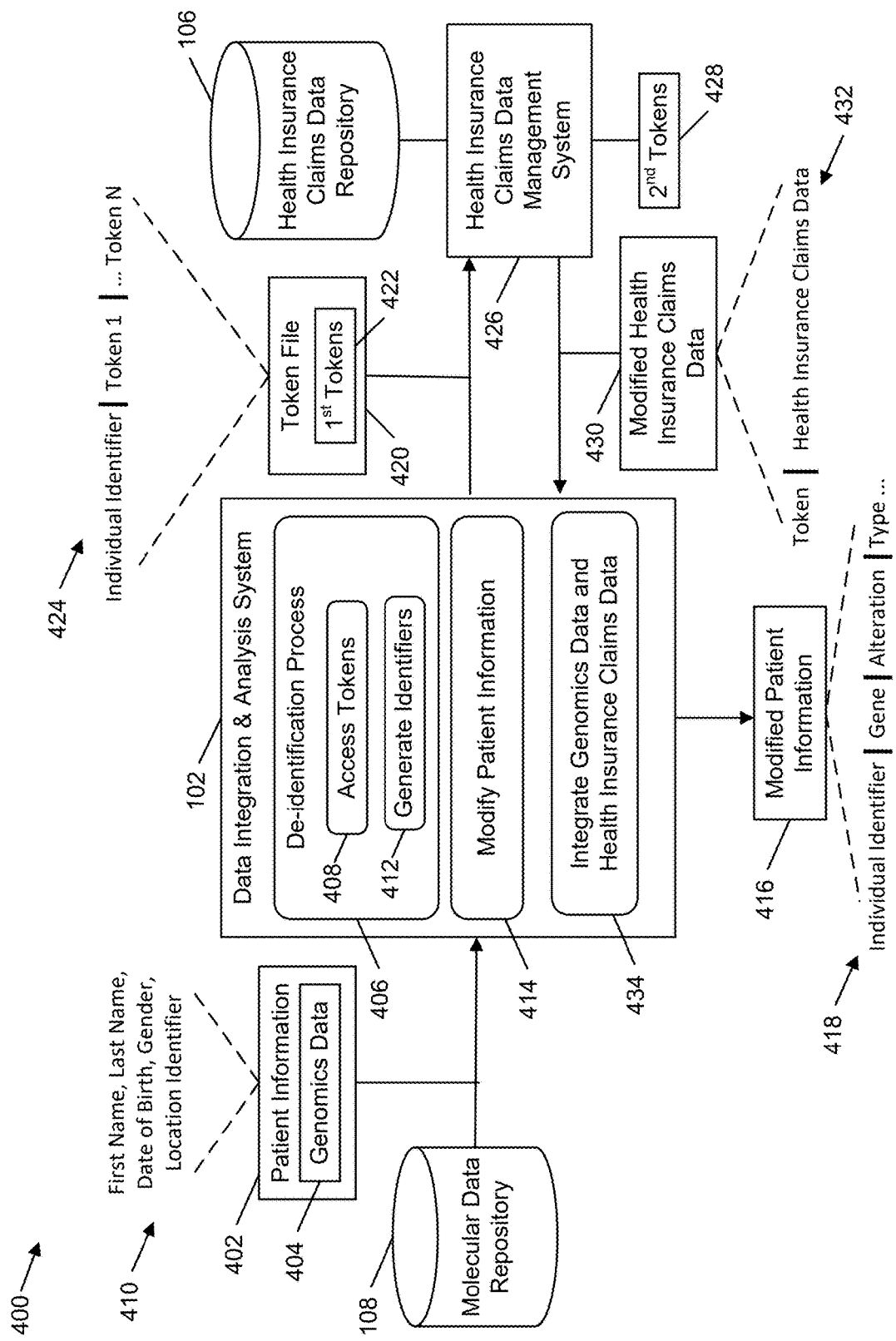
FIG. 4 illustrates an architecture to generate an integrated data repository that includes de-identified health insurance claims data and de-identified genomics data, according to one or more implementations.

FIG. 4 illustrates an architecture 400 to generate an integrated data repository that includes de-identified health insurance claims data and de-identified genomics data it, according to one or more implementations. The architecture 400 may include the data integration and analysis system 102, the health insurance claims data repository 106, and the molecular data repository 108. The data integration and analysis system 102 may obtain patient information 402 from the molecular data repository 108. The patient information 402 may include genomics data 404 for individuals having data stored by the molecular data repository 108. The genomics data 404 may indicate results of one or more nucleic acid sequencing operations that analyze sequences of nucleic acid molecules included in a sample obtained from the individuals with respect to one or more target genomic regions. In one or more examples, the sample may be obtained from tissue of one or more individuals. In one or more additional examples, the sample may be obtained from fluid of one or more individuals, such as blood or plasma. The one or more target genomic regions may correspond to genomic regions that correspond to the presence of one or more biological conditions. For example, the target regions may correspond to genomic regions of a reference genome having mutations that are present in individuals in which a biological condition is present. In one or more illustrative examples, the target regions may correspond to genomic regions of a reference human genome in which one or more mutations are present in individuals in which one or more forms of cancer are present. The patient information 402 may also include information indicating personal information about individuals with data stored by the molecular data repository 108 and information corresponding to the testing and analysis performed on samples provided by individuals.

The data integration and analysis system 102 may perform a de-identification process 406 that anonymizes personal information obtained from the molecular data repository 108. The data integration and analysis system 102 may implement one or more computational techniques as part of the de-identification process to anonymize data related to individuals stored by the molecular data repository 108 such that the de-identified data protects the privacy of the individuals and is in compliance with one or more privacy regulation frameworks. The de-identification process 406 may include, at 408, accessing tokens. In various examples, the tokens may comprise an alphanumeric string of characters. In one or more examples, the tokens may be generated by the data integration and analysis system 102. In one or more additional examples the tokens may be generated by a third-party and obtained by the data integration and analysis system 102.

The tokens may be generated using one or more hash functions in relation to a subset 410 of the patient information 402. To illustrate, for individuals that have information stored by the molecular data repository 108, the tokens may be generated using a combination of at least a portion of a first name of the respective individuals, at least a portion of the last name of the respective individuals, at least a portion of a date of birth of the respective individuals, a gender of the individuals, and at least a portion of a location identifier of the respective individuals. The de-identification process 406 may also include, at 412, generating identifiers for individuals that have data stored by the molecular data repository 108. The identifiers may be generated by the data integration and analysis system 102 using one or more hash functions that are different from the one or more hash functions used to generate the tokens. In one or more illustrative examples, the data integration and analysis system 102 may generate an intermediate version of respective identifiers using one or more hash function and then apply one or more salting techniques to the intermediate versions of the identifiers to generate final versions of the identifiers. A salt function comprises a function configured to add at least one random bit to each intermediate identifier to generate a respective final identifier. In various examples, the data integration and analysis system 102 may generate the identifiers at 412 using at least a portion of the information for respective individuals stored by the molecular data repository 108. In one or more illustrative examples, the identifiers may be generated based on a patient identifier included in the patient information 402. The identifiers generated by the data integration and analysis system 102 may be unique for respective individuals having data stored by the molecular data repository 108.

At operation 414, the data integration and analysis system 102 may generate modified patient information 416 based on the identifiers. The modified patient information 416 may include genomics data 404 related to individuals associated with the molecular data repository 108 and the identifiers of the respective individuals. The modified patient information 416 may have a data structure 418. The data structure 418 may include a column that includes respective identifiers of individuals associated with the molecular data repository 108 and a number of columns that include genomics data 404 related to the individuals, such as identifiers of one or more genes, alterations to the one or more genes, type of alteration to the genes, and so forth.

The data integration and analysis system 102 may generate a token file 420. The token file 420 may include first tokens 422 accessed at operation 408 for respective individuals having data stored by the molecular data repository 108. The token file 420 may have a data structure 424 that includes a number of columns that include information for respective individuals. The data structure 424 may include a column indicating respective identifiers generated by the data integration and analysis system 102 and columns indicating one or more first tokens 422 associated with the respective identifiers. The data integration and analysis system 102 may send the token file 420 to a health insurance claims data management system 426 that is coupled to the health insurance claims data repository 106. The health insurance claims data management system 426 may analyze the first tokens 422 with respect to corresponding second tokens 428. The second tokens 428 may be accessed by or generated by the health insurance claims data management system 426. The second tokens 428 may be generated using a same or similar subset of information for individuals having data stored in the health insurance claims data repository 106 as the subset 410 of the patient information 402. For example, the second tokens 428 may be generated using a combination of at least a portion of a first name of the respective individuals, at least a portion of the last name of the respective individuals, at least a portion of a date of birth of the respective individuals, a gender of the individuals, and at least a portion of a location identifier of the respective individuals.

In various examples, the health insurance claims data management system 426 may retrieve health insurance claims data from the health insurance claims data repository 106 for individuals associated with respective second tokens 428 that match corresponding first tokens 422. A first token 422 may match a second token 428 when the data of the first token 422 has at least a threshold amount of similarity with respect to the data of the second token 428. In one or more examples, a first token 422 may match a second token 428 when the data of the first token 422 is the same as the data of the second token 428.

In response to identifying health insurance claims data for individuals having respective second tokens 428 that correspond to a respective first token 422, the health insurance claims data management system 426 may generate modified health insurance claims data 430. The health insurance claims data management system 426 may send the modified health insurance claims data 430 to the data integration and analysis system 102. In one or more examples, the modified health insurance claims data 430 may be formatted according to a data structure 432. The data structure 432 may include a column that includes a subset of the second tokens 428 that correspond to the first tokens 422 and a number of columns that include the health insurance claims data.

At operation 434, the data integration and analysis system 102 may integrate genomics data and health insurance claims data of individuals that are common to both the molecular data repository 108 and the health insurance claims data repository 106. The data integration and analysis system 102 may determine individuals that are common to both the molecular data repository 108 and the health insurance claims data repository 106 by determining genomics data and health insurance claims data corresponding to common tokens. The data integration and analysis system 102 may determine that a first token 422 related to a portion of the genomics data 404 corresponds to a second token 428 related to a portion of the health insurance claims data by determining a measure of similarity between the first token 422 and the second token 428. In scenarios where the first token 422 has at least a threshold amount of similarity with respect to the second token 428, the data integration and analysis system 102 may store the corresponding portion of the genomics data 404 and the corresponding portion of the health insurance claims data in relation to the identifier of the individual in an integrated data repository, such as the integrated data repository 104 of FIG. 1, FIG. 2, and FIG. 3.

The implementation of the architecture 400 may implement a cryptographic protocol that enables de-identified information from disparate data repositories to be integrated into a single data repository. In this way, the security of the data stored by the integrated data repository 104 is increased. Additionally, the cryptographic protocol implemented by the architecture 400 may enable more efficient retrieval and accurate analysis of information stored by the integrated data repository 104 than in situations where the cryptographic protocol of the architecture 400 is not utilized. For example, by generating a token file 420 that includes first tokens 422 using a cryptographic technique based on a specified set of information stored by the molecular data repository 104 and utilizing second tokens 428 generated using a same or similar cryptographic technique with respect to the similar or same set of information stored by the health insurance claims data repository 106, the data integration and analysis system 102 may match information stored by disparate data repositories that correspond to a same individual. Without implementing the cryptographic protocol of the architecture 400, the probability of incorrectly attributing information from one data repository to one or more individuals increases, which decreases the accuracy of results provided by the data integration and analysis system 102 in response to integrated data repository requests 142 sent to the data integration and analysis system 102.

Figure 5:
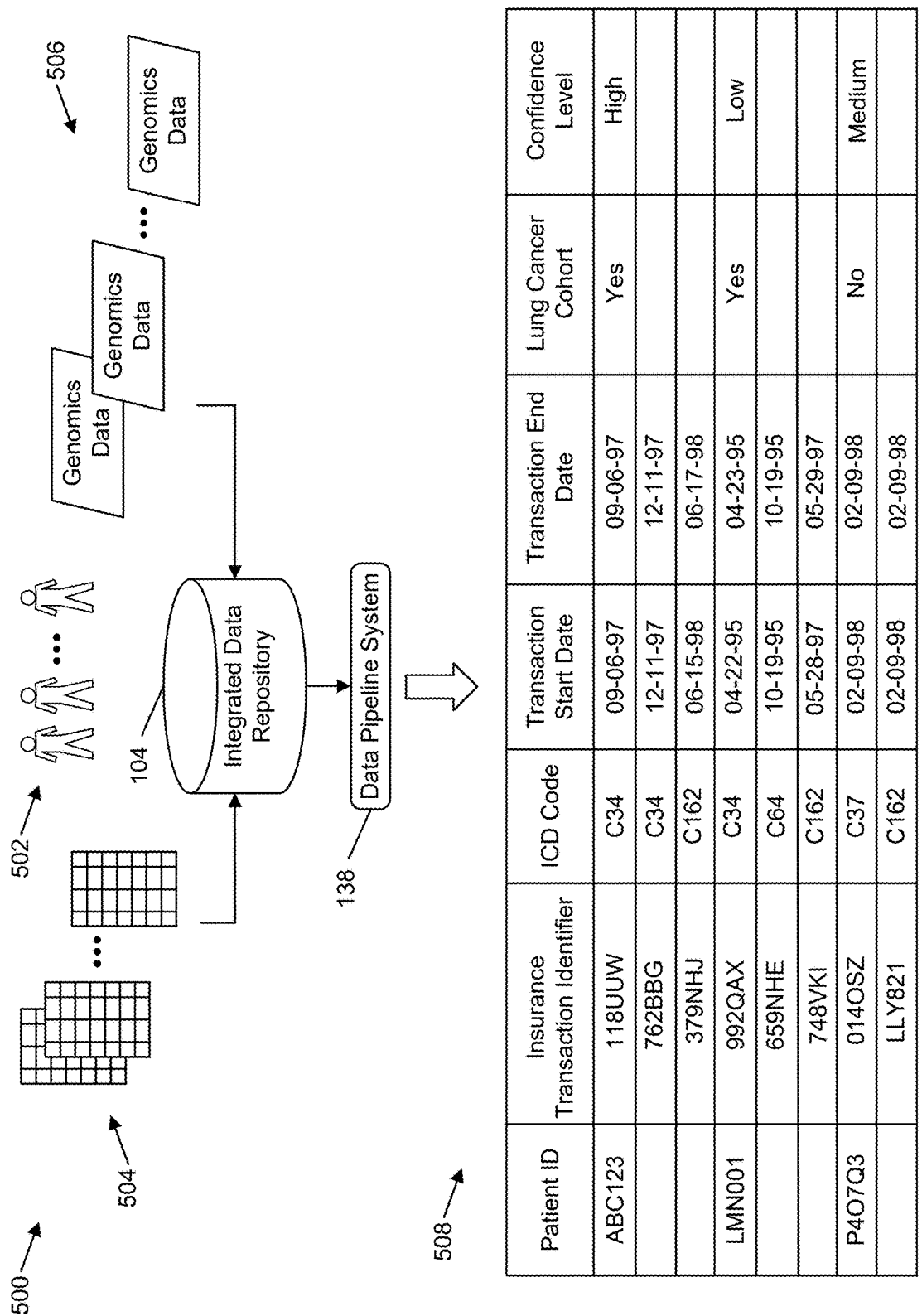
FIG. 5 illustrates a framework to generate a dataset, by a data pipeline system, based on data stored by an integrated data repository, according to one or more implementations.

FIG. 5 illustrates a framework 500 to generate a dataset, by a data pipeline system 138, based on data stored by an integrated data repository 104, according to one or more implementations. The integrated data repository 104 may store health insurance claims data and genomics data for a group of individuals 502. For example, the integrated data repository 104 may store information obtained from health insurance claims records 504 of the group of individuals 502. For each individual included in the group of individuals 502, the integrated data repository 104 may store information obtained from multiple health insurance claim records 504. In various examples, the information stored by the integrated data repository 104 may include and/or be derived from thousands, tens of thousands, hundreds of thousands, up to millions of health insurance claims records 504 for a number of individuals. Additionally, each health insurance claim record may include multiple columns. As a result, the integrated data repository 104 may be generated through the analysis of millions of columns of health insurance claims data.

Further, although the health insurance claims data may be organized according to a structured data format, health insurance claims data is typically arranged to be viewed by health insurance providers, patients, and healthcare providers in order to show financial information and insurance code information related to services provided to individuals by healthcare providers. Thus, health insurance claims data is not easily analyzed to gain insights that may be available in relation to characteristics of individuals in which a biological condition is present and that may aid in the treatment of the individuals with respect to the biological condition. The integrated data repository 104 may be generated and organized by analyzing and modifying raw health insurance claims data in a manner that enables the data stored by the integrated data repository 104 to be further analyzed to determine trends, characteristics, features, and/or insights with respect to individuals in which one or more biological conditions may be present. For example, health insurance codes may be stored in the integrated data repository 104 in such a way that at least one of medical procedures, biological conditions, treatments, dosages, manufacturers of medications, distributors of medications, or diagnoses may be determined for a given individual based on health insurance claims data for the individual. In various examples, the data integration and analysis system 102 may generate and implement one or more tables that indicate correlations between health insurance claims data and various treatments, symptoms, or biological conditions that correspond to the health insurance claims data. Further, the integrated data repository 104 may be generated using genomics data records 506 of the group of individuals 502. In various examples, the large amounts of health insurance claims data may be matched with genomics data for the group of individuals 502 to generate the integrated data repository 104.

By integrating the genomics data records 506 for the group of individuals 502 with the health insurance claims records 504, the data integration and analysis system 102 may determine correlations between the presence of one or more biomarkers that are present in the genomics data records 506 with other characteristics of individuals that are indicated by the health insurance claims data records 506 that existing systems are typically unable to determine. For example, the data integration and analysis system 102 may determine one or more genomic characteristics of individuals that correspond to treatments received by individuals, timing of treatments, dosages of treatments, diagnoses of individuals, smoking status, presence of one or more biological conditions, presence of one or more symptoms of a biological condition, one or more combinations thereof, and the like. Based on the correlations determined by the data integration and analysis system 102 using the integrated data repository 104, cohorts of individuals that may benefit from one or more treatments may be identified that would not have been identified in existing systems. In one or more examples, the processes and techniques implemented to integrate the health insurance claims records 504 and the genomics claims records 506 in order to generate the integrated data repository 104 may be complex and implement efficiency-enhancing techniques, systems, and processes in order to minimize the amount of computing resources used to generate the integrated data repository 104.

In one or more illustrative examples, the data pipeline system 138 may access information stored by the integrated data repository 104 to generate datasets that include a number of additional data records 508 that include information related to at least a portion of the group of individuals 502. In the illustrative example of FIG. 5, the additional data record 508 includes information indicating whether individuals are included in a cohort of individuals in which lung cancer is present. The data pipeline system 138 may execute a plurality of different sets of data processing instructions to determine a cohort of the group of individuals 502 in which lung cancer is present. In various examples, the additional data record 508 may indicate information used to determine a status of an individual 502 with respect to lung cancer, such as one or more transaction insurance identifier, one or more international classification of diseases (ICD) codes, and one or more health insurance transaction dates. In addition to including a column that indicates whether an individual 502 is included in the lung cancer cohort, the additional data record 508 may include a column indicating a confidence level of the status of the individual 502 with respect to the presence of lung cancer.

Figure 6:
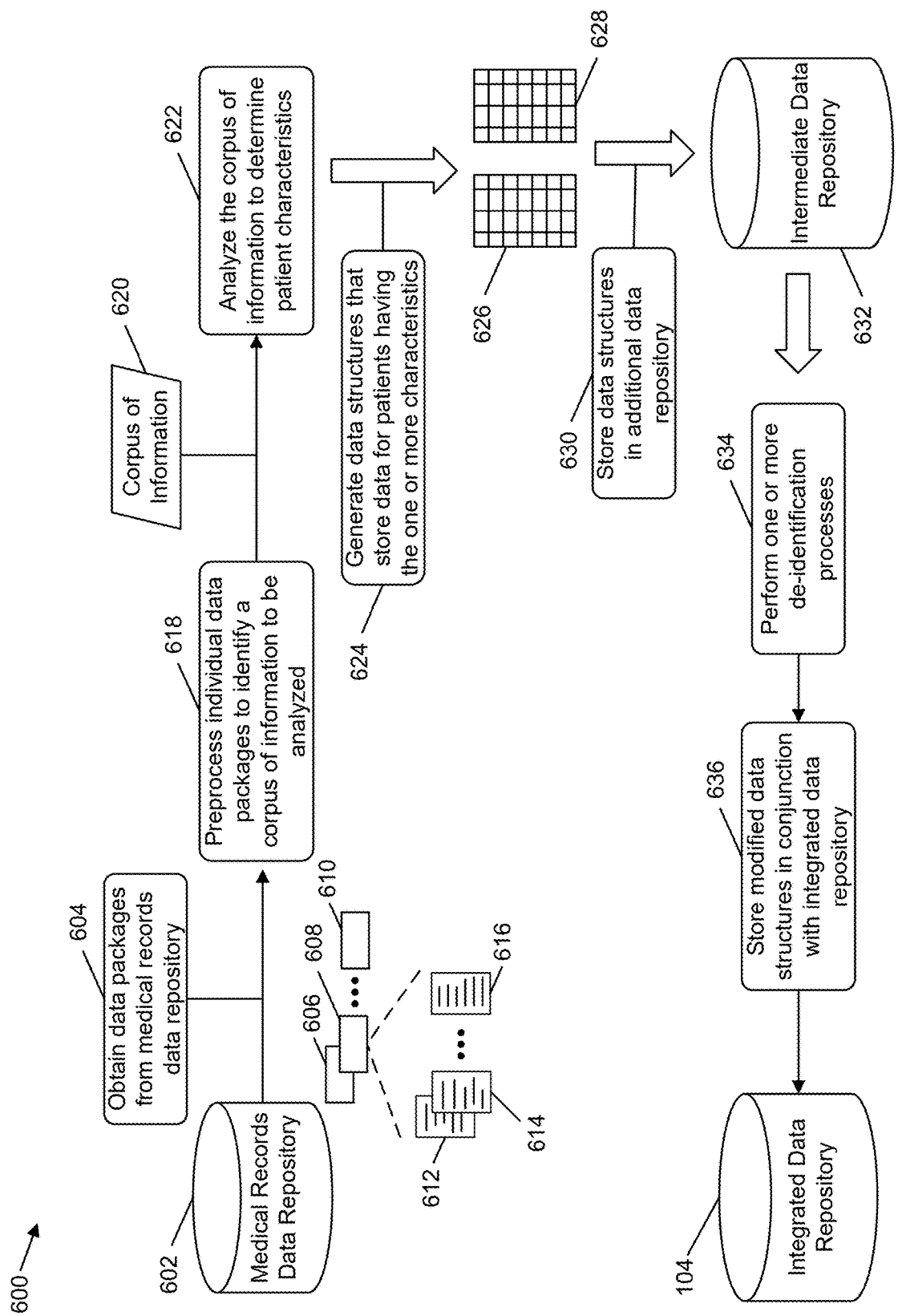
FIG. 6 is a schematic diagram of an architecture to incorporate medical records data into an integrated data repository.

FIG. 6 is a schematic diagram of a computing architecture 600 to incorporate medical records data into an integrated data repository 104. In various examples, at least a portion of the operations of the computing architecture 600 may be performed by the data integration and analysis system 102 of FIGS. 1, 3, and 4. In one or more examples, at least a portion of the operations of the computing architecture 600 may be performed by one or more additional computing systems that are at least one of controlled, maintained, or implemented by a service provider that also at least one of controls, maintains, or implements the data integration and analysis system 102. In one or more additional examples, at least a portion of the operations of the computing architecture 600 may be performed by a number of servers in a distributed computing environment.

The computing architecture 600 may include a medical records data repository 602. The medical records data repository 602 may store medical records data from a number of individuals. The medical records data may include imaging information, laboratory test results, diagnostic test information, clinical observations, dental health information, notes of healthcare practitioners, medical history forms, diagnostic request forms, medical procedure order forms, medical information charts, one or more combinations thereof, and so forth. In various examples, for a given individual, the medical records data repository 602 may store information obtained from one or more healthcare practitioners that is related to the individual.

The computing architecture 600 may perform operation 604 that includes obtaining data packages from the medical records data repository 602. In one or more examples, the data packages may be obtained in response to one or more requests sent to the medical records data repository 602 for medical records that correspond to one or more individuals. In one or more additional examples, the data packages may be obtained by the computing architecture 600 using one or more application programming interface (API) calls. In one or more illustrative examples, a first data package 606, a second data package 608, up to an Nth data package 610 may be obtained using the computing architecture 600. The individual data packages 606, 608, 610 may correspond medical records of a respective individual. For example, the first data package 606 may include medical records of a first individual, the second data package 608 may include medical records of a second individual, and the Nth data package 610 may include medical records of a third individual.

Individual data packages 606, 608, 610 may include a number of components. In one or more examples, individual data packages 606, 608, 610 may include individual components that correspond to medical records from different healthcare providers. In one or more additional examples, the individual data packages 606, 608, 610 may include individual components that correspond to different parts of medical records that correspond to one or more healthcare providers. In the illustrative example of FIG. 6, the second data package 608 may include a first component 612, a second component 614, up to an Nth component 616. In one or more illustrative examples, the first component 612 may include a first portion of medical records of an individual, the second component 614 may include a second portion of medical records of an individual, and the Nth component 616 may include a third portion of medical records of an individual. In various examples, the first component 612 may correspond to medical records of a first healthcare provider for the individual, the second component 614 may correspond to medical records of a second healthcare provider for the individual, and the third component may correspond to medical records of a third healthcare provider for the individual. In one or more additional illustrative examples, the first component 612 may include a first section of medical records of the individual, such as one or more forms related to a diagnostic test or procedure, and the second component 614 may include a second section of medical records of the individual, such as a pathology report of the individual.

At operation 618, the computing architecture 600 may preprocess individual data packages to identify a corpus of information 620 to be analyzed. In one or more examples, the preprocessing of data packages obtained from the medical records data repository 602, may include transforming the data included in the data packages. For example, preprocessing the data packages may include transforming at least a portion of the data obtained from the medical records data repository 602 to machine encoded information. To illustrate, preprocessing the data packages may include performing one or more optical character recognition (OCR) operations with respect to at least a portion of the data packages obtained from the medical records data repository 602. By converting at least a portion of the data packages obtained from the medical records data repository 602 to machine encoded information, the data packages may be subjected to a number of operations, such as one or more parsing operations to identify one or more characters or strings of characters or one or more editing operations that are unable to be performed with respect to at least a portion of the data packages obtained from the medical records data repository 602.

In one or more examples, the preprocessing of individual data packages may include determining information included in individual data packages that is to be excluded from further analysis by the computing architecture 600. In various examples, one or more components of individual data packages may be excluded from a corpus of information 620 to be analyzed. For example, with respect to the second data package 608, the computing architecture 600 may determine that the first component 612 is to be excluded from further analysis by the computing architecture 600. In one or more examples, the computing architecture 600 may analyze the components 612, 614, and/or 616 with respect to one or more keywords to identify at least one of the components 612, 614, and/or 616 to exclude from further analysis by the computing architecture 600. In one or more illustrative examples, the computing architecture 600 may parse the components 612, 614, and/or 616 to identify one or more keywords and in response to identifying the one or more keywords in a component 612, 614, and/or 616, the computing architecture 600 may determine to exclude the respective component 612, 614, and/or 616 from further analysis by the computing architecture 600. For example, the computing architecture 600 may determine that the first component 612 of the second data package 608 is a test requisition form for one or more diagnostic procedures or tests. In these scenarios, the computing architecture 600 may determine that the first component 612 is to be excluded from further analysis by the computing architecture 600. Additionally, the computing architecture 600 may determine that at least one of the second component 614 and/or 616 correspond to one or more pathology reports for an individual based on one or more keywords included in at least one of the second component 614 or the Nth component 616. In these instances, the computing architecture 600 may determine that at least a portion of the second component 614 and/or at least a portion of the Nth component 616 is to be included in the corpus of information 620 to be further analyzed by the computing architecture 600.

In addition, a subset of the components of individual data packages obtained from the medical records data repository 602 may be included in the corpus of information 620. In various examples, one or more additional operations may be performed to narrow the corpus of information 620. For example, one or more queries may be applied to a subset of information obtained from the medical records data repository 602. The one or more queries may extract information from the one or more data packages that satisfy the one or more queries. In at least some examples, the one or more queries may be a group of queries that are applied to individual components of a data package. In one or more illustrative examples, the group of queries may determine information to be included in the corpus of information 620 and additional information that is to be excluded from the corpus of information 620. In one or more additional examples, one or more sections of at least one component of a data package may be excluded from the corpus of information 620.

In one or more additional illustrative examples, after determining that the first component 612 is to be excluded from further analysis by the computing architecture 600, the computing architecture 600 may then cause one or more queries to be implemented with respect to at least one the second component 614 or the Nth component 616. In these scenarios, the one or more queries may determine that a section of the second component 614, such as a section that indicates family history for one or more biological conditions, is to be excluded from the corpus of information 620. In various examples, the one or more queries may be directed to identifying a number of keywords and/or combinations of keywords included in at least one of the second component 614 or the Nth component 616. In these instances, the computing architecture 600 may exclude from the corpus of information 620 one or more portions of the individual components of the data packages that include one or more keywords or combinations of keywords. In one or more additional examples, the computing architecture 600 may exclude from the corpus of information 620 a number of words, a number of characters, and/or a number of symbols following one or more keywords that are included in one or more portions of the individual components of the data packages.

Further, at operation 622, the computing architecture 600 may analyze the corpus of information to determine characteristics of individuals. In one or more examples, the computing architecture 600 may analyze the corpus of information 620 to determine individuals that have one or more phenotypes. In various examples, the computing architecture 600 may analyze the corpus of information 620 to determine one or more biomarkers that are indicative of a biological condition. For example, the computing architecture 600 may analyze the corpus of information 620 to determine individuals having one or more genetic characteristics. The one or more genetic characteristics may include at least one of one or more variants of a genomic region that correspond to a biological condition. In one or more illustrative examples, the one or more genetic characteristics may correspond to one or more variants of a genomic region that correspond to a type of cancer. In one or more additional illustrative examples, the one or more biomarkers may correspond to levels of an analyte being outside of a specified range. To illustrate, the computing architecture 600 may analyze the corpus of information 620 to determine individuals having levels of one or more proteins and/or levels of one or more small molecules present that are indicative of a biological condition. In these scenarios, the computing architecture 600 may analyze results of laboratory tests to determine levels of analytes of individuals. In one or more additional examples, the computing architecture 600 may analyze the corpus of information 620 to determine individuals in which one or more symptoms are present that are indicative of a biological condition. In one or more further examples, the computing architecture 600 may analyze imaging information included in the corpus of information 620 to determine individuals in which one or more biomarkers are present.

In one or more examples, the computing architecture 600 may implement one or more machine learning techniques to analyze the corpus of information 620. For example, the computing architecture 600 may implement one or more artificial neural networks, such as at least one of one or more convolutional neural networks or one or more residual neural networks to analyze the corpus of information 620. The computing architecture 600 may also implement at least one of one or more random forests techniques, one or more hidden Markov models, or one or more support vector machines to analyze the corpus of information 620.

In at least some implementations, the computing architecture 600 may analyze the corpus of information 620 by performing one or more queries with respect to the corpus of information 620. The one or more queries may correspond to one or more keywords and/or combinations of keywords. The one or more keywords and/or combinations of keywords may correspond to at least one of characters or symbols that correspond to one or more biological conditions. To illustrate, a keyword may correspond to characters related to a mutation of a genomic region, such as HER2. In one or more additional illustrative examples, one or more criteria may be associated with combinations of keyworks. To illustrate, a criterion that corresponds to a combination of keywords may include a number of words being present within a specified distance of one another in a portion of the corpus of information 620 for an individual, such as the words fatigue, blood pressure, and swelling occurring within 100 characters of one another. In these instances, the computing architecture 600 may parse the corpus of information 620 for the one or more keywords and/or combinations of keywords. In various examples, in response to determining that the one or more keywords and/or combinations of keywords are present in accordance with one or more criteria, the computing architecture 600 may determine that a biological condition is present with respect to a given individual.

In one or more additional examples, the one or more queries may be image-based and the computing architecture 600 may analyze images included in the corpus of information 620 with respect to template images. The template images may be generated based on analyzing a number of images in which a biological condition is present and aggregating the number of images into a template image. In these scenarios, the computing architecture 600 may analyze images included in the corpus of information 620 with respect to one or more template images to determine a measure of similarity between the images included in the corpus of information 620 and the template images. In situations where the measure of similarity for an individual is at least a threshold value, the computing architecture 600 may determine that a characteristic of a biological condition is present in the individual.

After determining individuals having one or more characteristics, the computing architecture 600 may, at operation 624, generate data structures that store data for individuals having the one or more characteristics. In one or more examples, the computing architecture 600 may generate data tables that indicate individuals having an individual characteristics and/or individuals having a group of characteristics. For example, the computing architecture 600 may generate a first data table 626 and a second data table 628. The first data table 626 may indicate individuals having one or more first characteristics and the second data table 628 may indicate individuals having one or more second characteristics. In one or more illustrative examples, the first data table 626 may indicate individuals having one or more first biomarkers for a biological condition and the second data table 628 may indicate individual having one or more second biomarkers for the biological condition. The one or more first biomarkers may correspond to one or more first genomic variants that are associated with the biological condition and the one or more second biomarkers may correspond to one or more second genomic variants that are associated with the biological condition. In various examples, the data tables 626, 628 may indicate whether or not the one or more characteristics associated with the individual data tables 626, 628 are present with respect to individual individuals. To illustrate, the first data table 626 may include a first indication for individuals in which one or more first genomic variants are present and a second indication for individuals in which the one or more first genomic variants are not present. In one or more additional examples, the first data table 626 may indicate smoking status of individuals and the second data table 628 may indicate whether or not individual individuals have received one or more treatments for a biological condition.

In one or more illustrative examples, the first data table 626 and the second data table 628 may have rows that correspond to individual individuals. In at least some examples, an individual identifier may be present in individual rows. The individual identifier may include at least one of alphanumeric characters or symbols that correspond to an individual. In various examples, the individual identifier may be present in a data package that corresponds to an individual. Columns of the first data table 626 and the second data table 628 may indicate a status of individual individuals with respect to one or more characteristics. For example, the columns of the data tables 626, 628 may include an identifier that includes at least one of alphanumeric characters or symbols that indicate the presence or absence of one or more characteristics for a given individual. Further, although the illustrative example of FIG. 6 includes a first data table 626 and a second data table 628, the computing architecture 600 may generate more data tables or fewer data tables.

At operation 630, the computing architecture 600 may store the data structures in an additional data repository. For example, the computing architecture 600 may store at least the first data tale 626 and/or the second data table 628 in an intermediate data repository 632. In various examples, the first data table 626 and the second data table 628 may be temporarily stored in the intermediate data repository 632. In one or more illustrative examples, the first data table 626 and the second data table 628 may be stored in the intermediate data repository 632 before being added to the integrated data repository 104. In one or more examples, the integrated data repository 104 may be periodically generated and/or updated. In these scenarios, data structures generated by the computing architecture 600 based on analyzing the corpus of information 620 may be stored in the intermediate data repository 632 until a time when the integrated data repository 104 is to be at least one of generated or updated.

Prior to adding data structures stored by the intermediate data repository 632 to the integrated data repository 104, the computing architecture 600 may perform one or more de-identification processes at operation 634. The data structures stored by the intermediate data repository 632 may be de-identified in order to preserve the privacy of individuals. The one or more de-identification processes may include applying one or more electronically implemented cryptographic techniques to information of individuals included in the data structures stored by the intermediate data repository 632. In one or more examples, the computing architecture 600 may generate tokens that correspond to individual individuals that have information stored in data structures of the intermediate data repository 632. The tokens may be generated by applying one or more hash functions to information related to individual individuals. In one or more examples, the one or more de-identification processes may include applying a salt function to information corresponding to individual individuals to generate tokens for the individual individuals. In various examples, the one or more cryptographic techniques applied to de-identify the data structures stored by the intermediate data repository 632 may be the same or similar to those applied to information obtained from the health insurance claims data repository 106 of FIGS. 1 and 4.

At operation 636, the computing architecture 600 may store the de-identified data structures in conjunction with the integrated data repository 104. For example, the information stored in the intermediate data repository 632 for a given individual may be stored in conjunction with additional information about the given individual in the integrated data repository 104. To illustrate, the integrated data repository 104 may store information for a given individual obtained from at least two of the molecular data repository 108, obtained from the health insurance claims data repository 106, and obtained from the intermediate data repository 632. In this way, information about a given individual obtained from a number of disparate data repositories may be stored in the integrated data repository 104. As a result, information about individuals that is obtained from the different data repositories may be analyzed together rather than analyzed separately as with many existing systems.

In various examples, the information stored by the intermediate data repository 632 may be used to validate one or more determinations made by the data integration and analysis system 102. For example, the data integration and analysis system 102 may analyze information obtained from the health insurance claims data repository 106 and the molecular data repository 108 to determine characteristics of individuals. The data integration and analysis system 102 may then analyze information obtained from the intermediate data repository 632 to determine whether the predicted characteristics identified from the information obtained from the health insurance claims data repository 106 and from the molecular data repository 108 correspond to the characteristics for the same individuals with respect to information stored by the intermediate data repository 632.

Figure 7:
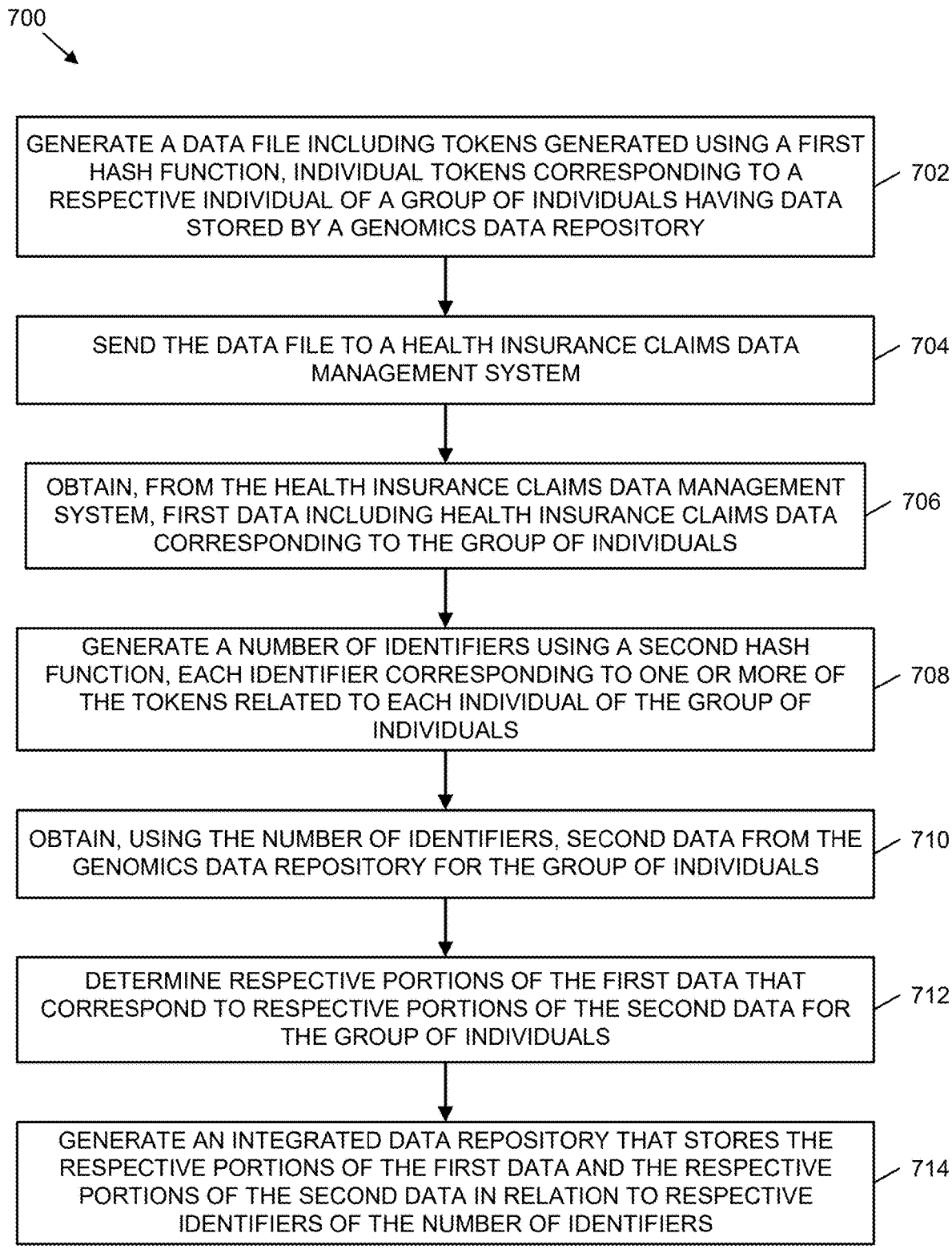
FIG. 7 is a data flow diagram of an example process to generate an integrated data repository that stores health insurance claims data and genomics data, according to one or more implementations.
Figure 8:
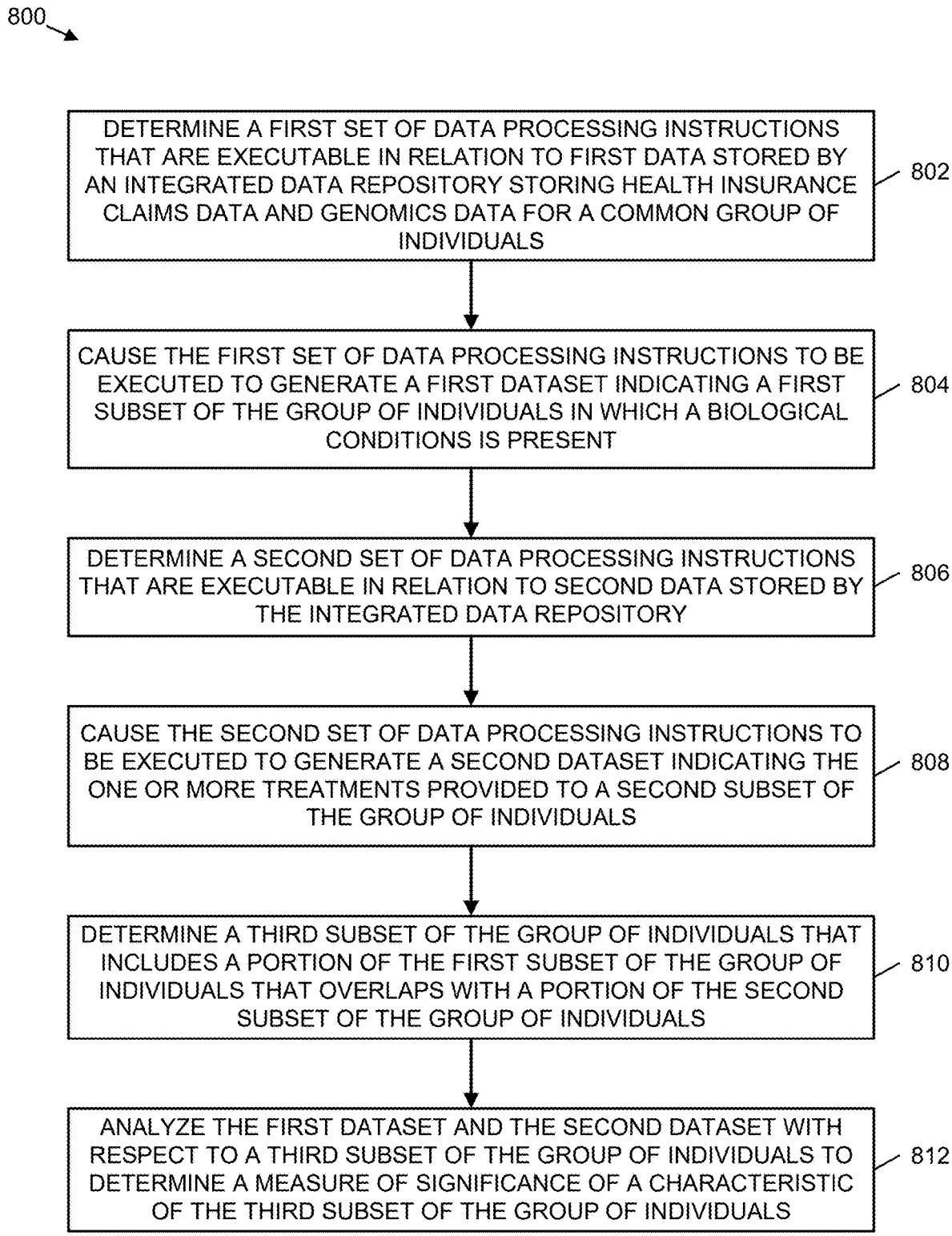
FIG. 8 is a data flow diagram of an example process to generate a number of datasets used to analyze information stored by an integrated data repository that stores health insurance claims data and genomics data, according to one or more implementations.

The one or more cryptographic techniques applied to de-identify the data structures stored by the intermediate data repository 632 may utilize the same or similar information that was used to generate at least one of the first tokens 422 or the second tokens 428 of FIG. 4. For example, the operation 634 may implement one or more cryptographic techniques using a combination of at least a portion of a first name of the respective individuals, at least a portion of the last name of the respective individuals, at least a portion of a date of birth of the respective individuals, a gender of the individuals, and at least a portion of a location identifier of the respective individuals to de-identify the data structures of the intermediate data repository. By utilizing the same or similar cryptographic techniques and the same or similar subset of information to de-identify the data structures stored by the intermediate data repository 632 as were used to generate at least one of the first tokens 422 or the second tokens 428, the information stored by the intermediate data repository 632 may be synchronized with information for the same individuals that have information stored in the integrated data repository 104. Both the integrated data repository 104 and the intermediate data repository 632 may store information for thousands, tens of thousands, up to millions of individuals. Thus, without the ability to synchronize the individuals having records stored by the integrated data repository 104 and the intermediate data repository 632 through the use of a specified cryptographic protocol as described herein, the data structures of the integrated data repository 104 and the data structures of the intermediate data repository 632 that are associated with a same individual may not be stored in a manner such that the information stored by the integrated data repository 104 and the information stored by the intermediate data repository 632 may be retrieved together for a given individual, which may lead to inaccurate information being provided by the data integration and analysis system 102. The absence of a specified cryptographic protocol as described herein may also lead to the use of more computing resources to determine the information stored in the integrated data repository 104 from other data sources and the information stored by the intermediate data repository 632 that correspond to a given individual. FIGS. 7 and 8 illustrate example processes to generate an integrated data repository and generate datasets used in the analysis of information stored by the integrated data repository. The example processes are illustrated as collections of blocks in logical flow graphs, which represent sequences of operations that may be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular data types. The order in which the operations are described is not intended to be construed as a limitation, and any number of the described blocks may be combined in any order and/or in parallel to implement the process.

FIG. 7 is a data flow diagram of an example process 700 to generate an integrated data repository that stores health insurance claims data and genomics data, according to one or more implementations. At operation 702, the process 700 may include generating a data file that includes tokens generated using a first hash function. Individual tokens may correspond to a respective individual of a group of individuals having data stored by a molecular data repository. In one or more examples, an individual having data stored by the molecular data repository may be associated with one or more tokens. The tokens may be generated by applying one or more first hash functions to a subset of information corresponding to the group of individuals stored by the genomics data repository. In various examples, individual tokens may be generated by applying one or more first hash functions to one or more combinations of at least a portion of a first name of a respective individual of the group of individuals, at least a portion of a second name of a respective individual of the group of individuals, a location identifier of a respective individual of the group of individuals, a gender of a respective individual of the group of individuals, and a date of birth of a respective individual of the group of individuals. In one or more illustrative examples, the tokens may be generated by a data integration and analysis system that is coupled to the genomics data repository. In one or more additional illustrative examples, the tokens may be generated by a third-party system and accessed by a data integration and analysis system coupled to the molecular data repository. The process 700 may also include, at operation 704, sending the data file to a health insurance claims data management system. The health insurance claims data management system may match the tokens included in the data file with second tokens accessed by the health insurance data management system and generated based on information stored by a health insurance claims data repository.

In addition, at operation 706, the process 700 may include obtaining, from the health insurance claims data management system, in response to the data file, first data corresponding to the group of individuals, where the first data includes health insurance claims data. In some implementations, affirmative consent is obtained from the members of the group of individuals for their data to be transferred from the health insurance claims data management system. In one or more examples, the data is transferred in an anonymized format, such that the data may not be traced back to an individual member. The health insurance claims data management system may be coupled to a health insurance claims data repository that stores health insurance claims information for a number of individuals. In one or more examples, the health insurance claims data management system may analyze the tokens of the data file with respect to additional tokens generated by the health insurance claims data management system. The additional tokens may be generated based on a same set of information used to generate the tokens included in the data file. However, an individual's identity may not be determined based on a token. In various examples, the health insurance claims data management system may match tokens included in the data file with additional tokens generated based on information stored by the health insurance claims data repository to determine individuals having information stored by the health insurance claims data repository that also have information stored by the genomics data repository. The technology disclosed herein complies with legal and best practice privacy standards, such as HIPAA and GDPR.

At operation 708, the process 700 may include generating a number of identifiers using a second hash function that is different from the first hash function. In one or more examples, individual identifiers may correspond to one or more tokens related to a respective individual of the group of individuals. The identifiers may be unique with respect to a given individual of the group of individuals and are de-identified. Additionally, the identifiers may be generated using information stored by the genomics data repository for the group of individuals that is different from the information stored by the genomics data repository used to generate the tokens. In various examples, intermediate identifiers may be generated by applying the second hash function to information of the respective groups of individuals and final versions of the identifiers may be generated by applying one or more salting techniques to the intermediate identifiers. Information stored by the genomics data repository for respective individuals may be stored in association with the identifiers such that at least a portion of the information for given individuals stored by the genomics data repository may be accessed using respective identifiers of the given individuals.

Further, the process 700 may include, at operation 710, obtaining, using the number of identifiers, second data from the molecular data repository for the group of individuals, and, at operation 712, the process 700 may include determining respective portions of the first data that correspond to respective portions of the second data for the group of individuals. For example, for a given individual, first data corresponding to health insurance claims data for the given individual may be identified in addition to second data corresponding to molecular data of the given individual, such as genomics data. In this way, for a given individual, both health insurance claims data and molecular data may be identified.

The process 700 may include, at operation 714, generating an integrated data repository that stores the respective portions of the first data and the respective portions of the second data in relation to respective identifiers of the number of identifiers. For example, the integrated data repository may store health insurance claims data and genomics claims data for a given individual in association with an identifier that may be used to access the health insurance claims data and the genomics claims data for the given individual. The information stored by the integrated data repository may be organized according to a data repository schema. For example, the integrated data repository may store health insurance claims data and genomics data for the group of individuals in a number of data tables. In one or more examples, information stored by the number of data tables may be linked. To illustrate, information related to a given individual stored by a first data table of the data repository schema may be linked to additional information related to the given individual stored by a second data table of the data repository schema. In this way, information accessed in one data table of the data repository schema may result in accessing additional information stored in another data table of the data repository schema.

In one or more illustrative examples, the data repository schema may include a first data table that stores genomics data of the group of individuals. For example, the first data table may store information corresponding to a panel used to generate genomics data, mutations of genomic regions, types of mutations, copy numbers of genomic regions, coverage data indicating numbers of nucleic acid molecules identified in a sample having one or more mutations, testing dates, and patient information. The data repository schema may also include a second data that stores data related to one or more patient visits by individuals to one or more healthcare providers and a third data table that stores information corresponding to respective services provided to individuals with respect to one or more patient visits to one or more healthcare providers indicated by the second data table. Additionally, the data repository schema may include a fourth data table that stores personal information of the group of individuals and a fifth data table that stores information related to a health insurance company or governmental entity that made payment for services provided to the group of individuals. Further, the data repository schema may include a sixth data table storing information corresponding to health insurance coverage information for the group of individuals, such as a type of health insurance plan related to the group of individuals. The data repository schema may also include a seventh data table that stores information related to pharmaceutical treatments obtained by the group of individuals.

In one or more examples, the integrated data repository may also store medical records that correspond to at least a portion of the group of individuals. In these examples, the medical records may be obtained from one or more data repositories storing the medical records. One or more optical character recognition (OCR) operations may be performed with respect to the medical records. Additionally, the medical records may be analyzed to determine one or more portions of the additional information to remove to produce a corpus of information. In various examples, the corpus of information may be analyzed to determine a portion of the subset of the additional group of individuals that correspond to one or more biomarkers.

One or more data structures may be generated from the corpus of information that store identifiers of the portion of the subset of the additional group of individuals and that store an indication that the portion of the subset of the additional group of individuals corresponds to the one or more biomarkers. The one or more data structures may be stored by an intermediate data repository. One or more de-identification operations may be performed with respect to the identifiers of the portion of the subset of the additional group of individuals before modifying the integrated data repository to store at least a portion of the additional information of the medical records of the portion of the subset of the additional group of individuals in relation to the number of identifiers. After de-identification of the information stored by the one or more data structures, the information stored by the integrated data repository may be added to the integrated data repository. In at least some examples, the de-identified medical records information may be added to the integrated data repository in addition to or in lieu of the health insurance claims data. In various examples, the one or more data structures storing the de-identified medical records information with respect to the biomarker data may have one or more logical connections with other data structures stored in the integrated data repository. To illustrate, the one or more data structures storing the de-identified medical records information with respect to the biomarker data may have one or more logical connections with at least one of the first data table may store information corresponding to a panel used to generate genomics data, mutations of genomic regions, types of mutations, copy numbers of genomic regions, coverage data indicating numbers of nucleic acid molecules identified in a sample having one or more mutations, testing dates, and patient information, the second data that stores data related to one or more patient visits by individuals to one or more healthcare providers, the a third data table that stores information corresponding to respective services provided to individuals with respect to one or more patient visits to one or more healthcare providers indicated by the second data table, the fourth data table that stores personal information of the group of individuals, the fifth data table that stores information related to a health insurance company or governmental entity that made payment for services provided to the group of individuals, the sixth data table storing information corresponding to health insurance coverage information for the group of individuals, such as a type of health insurance plan related to the group of individuals, or the seventh data table that stores information related to pharmaceutical treatments obtained by the group of individuals.

In various examples, the medical records data may be added to the integrated data repository by generating a data file including first tokens generated using a first hash function. Individual first tokens may correspond to a respective individual of a group of individuals having data stored by a molecular data repository. Additionally, the data file may be sent to a medical records data management system and medical records data corresponding to the group of individuals may be obtained from the medical records data management system in response to the data file. Further, a number of identifiers may be generated using a second hash function that is different from the first hash function. Each identifier may correspond to one or more tokens related to each individual of the group of individuals. Using the number of identifiers second data may be obtained from the molecular data repository for the group of individuals. In various examples, respective portions of the first data may be determined that correspond to respective portions of the second data for the group of individuals. In this way, the integrated data repository may be generated that stores the respective portions of the first data and the respective portions of the second data in relation to respective identifiers of the number of identifiers.

After the integrated data repository storing medical records data is generated, a request may be received to determine data with respect to a number of individuals having data stored in the integrated data repository. The request includes may one or more search criteria. In one or more examples, a subset of the number of individuals having one or more characteristics that correspond to the one or more search criteria may be determined and information of the subset of the number of individuals may be analyzed to determine a measure of significance of a characteristic of the one or more characteristics with respect to a biological condition.

In one or more illustrative examples, one or more genomic mutations may be determined to be present in the subset of the number of individuals and a plurality of treatments provided to the subset of the number of individuals may also be determined. In various examples, respective survival rates for the subset of the number of individuals may be determined, such as real world survival rates. In at least some examples, the measure of significance may correspond to survival rate with respect to a treatment of the plurality of treatments and a genomic mutation of the one or more genomic mutations. Based on measure of significance, an effectiveness of the treatment for the subset of the number of individuals may be determined. In one or more examples, individuals in subset of the number of individuals that have not received the treatment may be determined. One or more therapeutically effective amounts of the treatment may be administered to the individuals in the subset of the number of individuals that have not received the treatment.

FIG. 8 is a data flow diagram of an example process 800 to generate a number of datasets used to analyze information stored by an integrated data repository that stores health insurance claims data and genomics data, according to one or more implementations. The process 800 may include, at operation 802, determining a first set of data processing instructions that are executable in relation to first data stored by an integrated data repository. The integrated data repository may store health insurance claims data and molecular data for a common group of individuals. In one or more examples, the first set of data processing instructions may be included in a plurality of sets of data processing instructions that are part of a data processing pipeline. Each of the sets of data processing instructions of the data processing pipeline may be executed to generate a respective analytics ready dataset. For example, individual sets of data processing instructions of the data processing pipeline may be executable to generate datasets that include specified portions of information and/or combinations of information stored by the integrated data repository. In one or more additional examples, individual sets of data processing instructions of the data processing pipeline may be executable to analyze and modify portions of information stored by the integrated data repository to generate respective datasets. Additionally, individual sets of data processing instructions may be executable with respect to individual subsets of information stored by the integrated data repository.

The process 800 may also include, at operation 804, causing the first set of data processing instructions to be executed to generate a first dataset. The first dataset may indicate a subset of the group of individuals in which a biological condition is present. The first set of data processing instructions may be executed to analyze data stored by the integrated data repository to identify a cohort of individuals in which the biological condition is present. In one or more illustrative examples, the biological condition may include a cancer. To illustrate, the first set of data processing instructions may be executed to analyze data stored by the integrated data repository to identify a cohort of individuals in which lung cancer is present. In various examples, the data processing pipeline may include multiple sets of data processing instructions to identify cohorts of individuals in which different biological conditions are present.

In one or more examples, the first set of data processing instructions may be executed to analyze at least one of health insurance claims data or molecular data to determine a cohort of individuals in which the biological condition is present. For example, the first set of data processing instructions may be executed to identify individuals having one or more health insurance codes present in health insurance claims data to determine a group of individuals in which the biological condition is present. Additionally, the first set of data processing instructions may be executed to identify individuals in which one or more mutations are present in a genomic region of nucleic acid molecules derived from samples obtained from the individuals to determine a group of individuals in which the biological condition is present.

In addition, the process 800 may include, at operation 806, determining a second set of data processing instructions that are executable in relation to second data stored by the integrated data repository. The second set of data stored by the integrated data repository may be different from the first set of data stored by the integrated data repository and analyzed in relation to the first set of data processing instructions. For example, the first data may correspond to first columns of one or more first data tables stored by the integrated data repository and the second data may correspond to second columns of one or more second data tables stored by the integrated data repository.

At operation 808, the process 800 may include causing the second set of data processing instructions to be executed to generate a second dataset indicating one or more treatments provided to a second subset of the group of individuals. The second dataset may indicate a subset of the group of individuals that have received one or more treatments. The one or more treatments may be provided to individuals in which one or more biological conditions are present. In one or more examples, the second set of data processing instructions may be executed to analyze data stored by the integrated data repository to identify a cohort of individuals that received the one or more treatments. To illustrate, the second set of data processing instructions may be executed to analyze at least one of health insurance claims data or genomics data to determine a cohort of individuals that received the one or more treatments. In one or more illustrative examples, the second set of data processing instructions may be executed to identify individuals having one or more health insurance codes present in health insurance claims data to determine a group of individuals that received the one or more treatments.

Further, the process 800 may include, at operation 810, determining a third subset of the group of individuals that includes a portion of the first subset of the group of individuals that overlaps with a portion of the second subset of the group of individuals. As a result, the third subset of the group of individuals corresponds to individuals in which both the biological condition is present and the one or more treatments are provided. At 812, the process 800, may include analyzing the first dataset and the second dataset with respect to the third subset of the group of individuals to determine a measure of significance of a characteristic of the third subset of the group of individuals. In one or more examples, one or more machine learning techniques or statistical techniques may be applied to information included in at least one of the first dataset and the second dataset with respect to the third subset of the group of individuals. The measure of significance may correspond to a statistical measure of significance with respect to the characteristic. In one or more additional examples, the measure of significance may correspond to a probability of the characteristic being present in individuals in which the biological condition is present.

In one or more illustrative examples, the characteristic may include one or more treatments provided to the individuals in which the biological condition is present. In one or more additional illustrative examples, the characteristic may include the presence of a mutation of a genomic region of nucleic acid molecules derived from samples obtained from individuals in which the biological condition is present. In various examples, information included in at least one of the first dataset or the second dataset may be analyzed to determine an impact of the characteristic with respect to one or more metrics. In one or more examples, information included in at least one of the first dataset or the second dataset may be analyzed to determine an amount of influence of a treatment on a survival rate of individuals in which the biological condition is present. In one or more further examples, information included in at least one of the first dataset or the second dataset may be analyzed to determine an amount of influence of a mutation of a genomic region on a survival rate of individuals in which the biological condition is present. Additionally, information included in the first dataset and the second dataset may be analyzed to determine an amount of impact of one or more treatments with respect to individuals in which the biological condition is present and in which one or more genomic mutations are also present.

Figure 9:
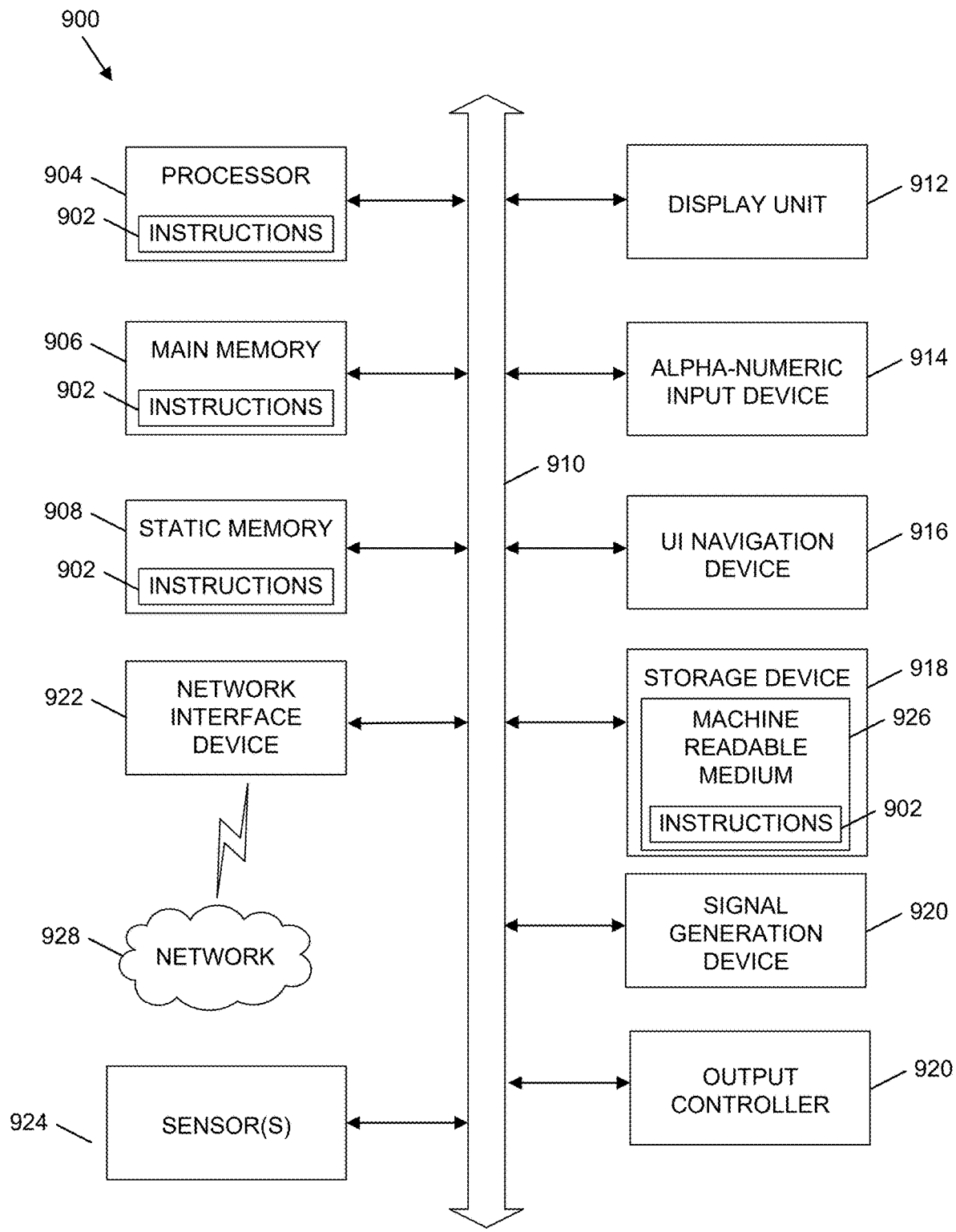
FIG. 9 illustrates a diagrammatic representation of a machine in the form of a computer system within which a set of instructions may be executed for causing the machine to perform any one or more of the methodologies discussed herein, according to one or more implementations.

FIG. 9 illustrates a diagrammatic representation of a machine 9900 in the form of a computer system within which a set of instructions may be executed for causing the machine 900 to perform any one or more of the methodologies discussed herein, according to an example, according to an example implementation. Specifically, FIG. 8 shows a diagrammatic representation of the machine 900 in the example form of a computer system, within which instructions 902 (e.g., software, a program, an application, an applet, an app, or other executable code) for causing the machine 900 to perform any one or more of the methodologies discussed herein may be executed. For example, the instructions 902 may cause the machine 900 to implement the architectures and frameworks 100, 200, 300, 400, 500, 600 described with respect to FIGS. 1, 2, 3, 4, 5, and 6, respectively, and to execute the methods 700, 800 described with respect to FIGS. 7 and 8, respectively.

The instructions 902 transform the general, non-programmed machine 900 into a particular machine 900 programmed to carry out the described and illustrated functions in the manner described. In alternative implementations, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while only a single machine 900 is illustrated, the term "machine" shall also be taken to include a collection of machines 900 that individually or jointly execute the instructions 902 to perform any one or more of the methodologies discussed herein.

Examples of computing device 900 may include logic, one or more components, circuits (e.g., modules), or mechanisms. Circuits are tangible entities configured to perform certain operations. In an example, circuits may be arranged (e.g., internally or with respect to external entities such as other circuits) in a specified manner. In an example, one or more computer systems (e.g., a standalone, client or server computer system) or one or more hardware processors (processors) may be configured by software (e.g., instructions, an application portion, or an application) as a circuit that operates to perform certain operations as described herein. In an example, the software may reside (1) on a non-transitory machine readable medium or (2) in a transmission signal. In an example, the software, when executed by the underlying hardware of the circuit, causes the circuit to perform the certain operations.

In an example, a circuit may be implemented mechanically or electronically. For example, a circuit may comprise dedicated circuitry or logic that is specifically configured to perform one or more techniques such as discussed above, such as including a special-purpose processor, a field programmable gate array (FPGA) or an application-specific integrated circuit (ASIC). In an example, a circuit may comprise programmable logic (e.g., circuitry, as encompassed within a general-purpose processor or other programmable processor) that may be temporarily configured (e.g., by software) to perform the certain operations. It will be appreciated that the decision to implement a circuit mechanically (e.g., in dedicated and permanently configured circuitry), or in temporarily configured circuitry (e.g., configured by software) may be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor may be configured as respective different circuits at different times. Software may accordingly configure a processor, for example, to constitute a particular circuit at one instance of time and to constitute a different circuit at a different instance of time.

In an example, circuits may provide information to, and receive information from, other circuits. In this example, the circuits may be regarded as being communicatively coupled to one or more other circuits. Where multiple of such circuits exist contemporaneously, communications may be achieved through signal transmission (e.g., over appropriate circuits and buses) that connect the circuits. In implementations in which multiple circuits are configured or instantiated at different times, communications between such circuits may be achieved, for example, through the storage and retrieval of information in memory structures to which the multiple circuits have access. For example, one circuit may perform an operation and store the output of that operation in a memory device to which it is communicatively coupled. A further circuit may then, at a later time, access the memory device to retrieve and process the stored output. In an example, circuits may be configured to initiate or receive communications with input or output devices and may operate on a resource (e.g., a collection of information).

The various operations of method examples described herein may be performed, at least partially, by one or more processors that are temporarily configured (e.g., by software) or permanently configured to perform the relevant operations. Whether temporarily or permanently configured, such processors may constitute processor-implemented circuits that operate to perform one or more operations or functions. In an example, the circuits referred to herein may comprise processor-implemented circuits.

Similarly, the methods described herein may be at least partially processor implemented. For example, at least some or all of the operations of a method may be performed by one or processors or processor-implemented circuits. The performance of certain of the operations may be distributed among the one or more processors, not only residing within a single machine, but deployed across a number of machines. In an example, the processor or processors may be located in a single location (e.g., within a home environment, an office environment or as a server farm), while in other examples the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Example implementations (e.g., apparatus, systems, or methods) may be implemented in digital electronic circuitry, in computer hardware, in firmware, in software, or in any combination thereof. Example implementations may be implemented using a computer program product (e.g., a computer program, tangibly embodied in an information carrier or in a machine readable medium, for execution by, or to control the operation of, data processing apparatus such as a programmable processor, a computer, or multiple computers).

A computer program may be written in any form of programming language, including compiled or interpreted languages, and it may be deployed in any form, including as a stand-alone program or as a software module, subroutine, or other unit suitable for use in a computing environment. A computer program may be deployed to be executed on one computer or on multiple computers at one site or distributed across multiple sites and interconnected by a communication network.

In an example, operations may be performed by one or more programmable processors executing a computer program to perform functions by operating on input data and generating output. Examples of method operations may also be performed by, and example apparatus may be implemented as, special purpose logic circuitry (e.g., a field programmable gate array (FPGA) or an application-specific integrated circuit (ASIC)).

The computing system may include clients and servers. A client and server are generally remote from each other and generally interact through a communication network. The relationship of client and server arises by virtue of computer programs running on the respective computers and having a client-server relationship to each other. In implementations deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., computing device 900) and software architectures that may be deployed in example implementations.

In an example, the computing device 900 may operate as a standalone device or the computing device 900 may be connected (e.g., networked) to other machines.

In a networked deployment, the computing device 900 may operate in the capacity of either a server or a client machine in server-client network environments. In an example, computing device 900 may act as a peer machine in peer-to-peer (or other distributed) network environments. The computing device 900 may be a personal computer (PC), a tablet PC, a set-top box (STB), a mobile telephone, a web appliance, a network router, switch or bridge, or any machine capable of executing instructions (sequential or otherwise) specifying actions to be taken (e.g., performed) by the computing device 900. Further, while only a single computing device 900 is illustrated, the term "computing device" shall also be taken to include any collection of machines that individually or jointly execute a set (or multiple sets) of instructions to perform any one or more of the methodologies discussed herein.

Example computing device 900 may include a processor 904 (e.g., a central processing unit CPU), a graphics processing unit (GPU) or both), a main memory 906 and a static memory 908, some or all of which may communicate with each other via a bus 910. The computing device 900 may further include a display unit 912, an alphanumeric input device 914 (e.g., a keyboard), and a user interface (UI) navigation device 916 (e.g., a mouse). In an example, the display unit 912, input device 914 and UI navigation device 916 may be a touch screen display. The computing device 900 may additionally include a storage device (e.g., drive unit) 918, a signal generation device 920 (e.g., a speaker), a network interface device 922, and one or more sensors 924, such as a global positioning system (GPS) sensor, compass, accelerometer, or another sensor.

The storage device 918 may include a machine readable medium 926 on which is stored one or more sets of data structures or instructions 902 (e.g., software) embodying or utilized by any one or more of the methodologies or functions described herein. The instructions 902 may also reside, completely or at least partially, within the main memory 906, within static memory 908, or within the processor 904 during execution thereof by the computing device 900. In an example, one or any combination of the processor 904, the main memory 906, the static memory 908, or the storage device 918 may constitute machine readable media.

While the machine readable medium 926 is illustrated as a single medium, the term "machine readable medium" may include a single medium or multiple media (e.g., a centralized or distributed database, and/or associated caches and servers) that configured to store the one or more instructions 902. The term "machine readable medium" may also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" may accordingly be taken to include, but not be limited to, solid-state memories, and optical and magnetic media. Specific examples of machine-readable media may include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 902 may further be transmitted or received over a communications network 828 using a transmission medium via the network interface device 822 utilizing any one of a number of transfer protocols (e.g., frame relay, IP, TCP, UDP, HTTP, etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

As used herein, a component, may refer to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A numbered non-limiting list of aspects of the present subject matter is presented below.

Aspect 1. A method comprising: generating, by a computing system including processing circuitry and memory, a data file including first tokens generated using a first hash function, individual first tokens corresponding to a respective individual of a group of individuals having data stored by a molecular data repository; sending, by the computing system, the data file to a health insurance claims data management system; obtaining, by the computing system and from the health insurance claims data management system, in response to the data file, health data corresponding to the group of individuals; generating, by the computing system, a number of identifiers using a second hash function that is different from the first hash function, each identifier corresponds to one or more tokens related to each individual of the group of individuals; obtaining, by the computing system and using the number of identifiers, second data from the molecular data repository for the group of individuals; determining, by the computing system, respective portions of the first data that correspond to respective portions of the second data for the group of individuals; and generating, by the computing system, an integrated data repository that stores the respective portions of the first data and the respective portions of the second data in relation to respective identifiers of the number of identifiers.

Aspect 2. The method of aspect 1, comprising: determining, by the computing system, a first set of data processing instructions that are executable in relation to first data stored by the integrated data repository; causing, by the computing system, the first set of data processing instructions to be executed to analyze first health insurance claims codes included in the first data to determine a first subset of the group of individuals in which a biological condition is present; and generating, by the computing system, a first dataset indicating the subset of the group of individuals in which the biological condition is present.

Aspect 3. The method of aspect 2, comprising: determining, by the computing system, a second set of data processing instructions that are executable in relation to second data stored by the integrated data repository; causing, by the computing system, the second set of data processing instructions to be executed to analyze the second health insurance claims codes included in the second data to determine one or more treatments provided to a second subset of the group of individuals; and generating, by the computing system, a second dataset indicating the one or more treatments provided to the second subset of the group of individuals.

Aspect 4. The method of aspect 3, comprising: determining, by the computing system, a third subset of the group of individuals that includes a portion of the first subset of the group of individuals that overlaps with a portion of the second subset of the group of individuals; receiving, by the computing system, a request to perform an analysis of the first dataset and the second dataset in relation to the third subset of the group of individuals; and analyzing, by the computing system and in response to the request, the first dataset and the second dataset with respect to the third subset of the group of individuals to determine a measure of significance of a characteristic of the third subset of the group of individuals with respect to the biological condition.

Aspect 5. The method of aspect 4, comprising: determining, by the computing system, one or more genomic mutations present in the third subset of the group of individuals; determining, by the computing system, a plurality of treatments provided to the third subset of the group of individuals; and determining, by the computing system, respective survival rates for the third subset of the group of individuals.

Aspect 6. The method of aspect 5, wherein the measure of significance corresponds to survival rate with respect to a treatment of the plurality of treatments and a genomic mutation of the one or more genomic mutations.

Aspect 7. The method of aspect 6, comprising determining, by the computing system and based on measure of significance, an effectiveness of the treatment for the third subset of the group of individuals.

Aspect 8. The method of aspect 7, comprising determining, by the computing system, individuals in third subset of the group of individuals that have not received the treatment.

Aspect 9. The method of aspect 8, comprising administering one or more therapeutically effective amounts of the treatment to the individuals in the third subset that have not received the treatment.

Aspect 10. The method of any one of aspects 1-9, wherein: the integrated data repository is arranged according to a data repository schema that includes a plurality of data tables and a plurality of logical links between the plurality of data tables; individual logical links of the plurality of logical links indicating one or more rows of a data table of the plurality of data tables that correspond to one or more additional rows of an additional data table of the plurality of data tables.

Aspect 11. The method of aspect 10, wherein the plurality of data tables include: a first data table that stores genomics data of the group of individuals; a second data that stores data related to one or more patient visits by individuals to one or more healthcare providers; a third data table that stores information corresponding to respective services provided to individuals with respect to one or more patient visits to one or more healthcare providers indicated by the second data table; a fourth data table that stores personal information of the group of individuals; a fifth data table that stores information related to a health insurance company or governmental entity that made payment for services provided to the group of individuals; a sixth data table storing information corresponding to health insurance coverage information for the group of individuals; and a seventh data table that stores information related to pharmaceutical treatments obtained by the group of individuals.

Aspect 12. The method of any one of aspects 1-11, wherein the number of identifiers generated using the second hash function comprise intermediate identifiers; and the method comprises: applying, by the computing system, a salt function to the intermediate identifiers to generate a final set of identifiers.

Aspect 13. The method of any one of aspects 1-12, comprising: obtaining, by the computing system, information from an additional data repository that includes electronic medical records of an additional group of individuals; determining, by the computing system, a subset of the additional group of individuals that corresponds to the group of individuals having data stored by the genomics data repository; and modifying, by the computing system, the integrated data repository to store at least a portion of the information of the medical records of the subset of the additional group of individuals in relation to the number of identifiers.

Aspect 14. The method of aspect 13, comprising: performing, by the computing system, one or more optical character recognition operations with respect to the additional information; analyzing, by the computing system, the additional information obtained from the additional data repository to determine one or more portions of the additional information to remove to produce a corpus of information.

Aspect 15. The method of aspect 14, comprising: analyzing, by the computing system, the corpus of information to determine a portion of the subset of the additional group of individuals that correspond to one or more biomarkers; and generating, by the computing system, one or more data structures that store identifiers of the portion of the subset of the additional group of individuals and that store an indication that the portion of the subset of the additional group of individuals corresponds to the one or more biomarkers.

Aspect 16. The method of aspect 15, comprising: storing, by the computing system, the one or more data structures in an intermediate data repository; performing, by the computing system, one or more de-identification operations with respect to the identifiers of the portion of the subset of the additional group of individuals before modifying the integrated data repository to store at least a portion of the additional information of the medical records of the portion of the subset of the additional group of individuals in relation to the number of identifiers.

Aspect 17. The method of any one of aspects 1-16, wherein the molecular data repository stores at least one or more of genomic information, genetic information, metabolomic information, transcriptomic information, fragmentomic information, immune receptor information, methylation information, epigenomic information, or proteomic information.

Aspect 18. A system comprising: one or more hardware processing units; one or more computer-readable storage media storing computer-executable instructions that, when executed by the one or more hardware processing units, cause the system to perform operations comprising: generating a data file including first tokens generated using a first hash function, individual first tokens corresponding to a respective individual of a group of individuals having data stored by a molecular data repository; sending the data file to a health insurance claims data management system; obtaining, from the health insurance claims data management system, in response to the data file, health insurance claims data corresponding to the group of individuals; generating a number of identifiers using a second hash function that is different from the first hash function, each identifier corresponds to one or more tokens related to each individual of the group of individuals; obtaining, using the number of identifiers, second data from the molecular data repository for the group of individuals; determining respective portions of the first data that correspond to respective portions of the second data for the group of individuals; and generating an integrated data repository that stores the respective portions of the first data and the respective portions of the second data in relation to respective identifiers of the number of identifiers.

Aspect 19. The system of aspect 18, wherein the one or more computer-readable storage media store additional computer-executable instructions that, when executed by the one or more hardware processing units, cause the system to perform additional operations comprising: determining a first set of data processing instructions that are executable in relation to first data stored by the integrated data repository; causing the first set of data processing instructions to be executed to analyze first health insurance claims codes included in the first data to determine a first subset of the group of individuals in which a biological condition is present; and generating a first dataset indicating the subset of the group of individuals in which the biological condition is present.

Aspect 20. The system of aspect 19, wherein the one or more computer-readable storage media store additional computer-executable instructions that, when executed by the one or more hardware processing units, cause the system to perform additional operations comprising: determining, by the computing system, a second set of data processing instructions that are executable in relation to second data stored by the integrated data repository; causing, by the computing system, the second set of data processing instructions to be executed to analyze the second health insurance claims codes included in the second data to determine one or more treatments provided to a second subset of the group of individuals; and generating, by the computing system, a second dataset indicating the one or more treatments provided to the second subset of the group of individuals.

Aspect 21. The system of aspect 20, wherein the one or more computer-readable storage media store additional computer-executable instructions that, when executed by the one or more hardware processing units, cause the system to perform additional operations comprising: determining, by the computing system, a third subset of the group of individuals that includes a portion of the first subset of the group of individuals that overlaps with a portion of the second subset of the group of individuals; receiving, by the computing system, a request to perform an analysis of the first dataset and the second dataset in relation to the third subset of the group of individuals; and analyzing, by the computing system and in response to the request, the first dataset and the second dataset with respect to the third subset of the group of individuals to determine a measure of significance of a characteristic of the third subset of the group of individuals with respect to the biological condition.

Aspect 22. The system of aspect 21, wherein the one or more computer-readable storage media store additional computer-executable instructions that, when executed by the one or more hardware processing units, cause the system to perform additional operations comprising: determining one or more genomic mutations present in the third subset of the group of individuals; determining a plurality of treatments provided to the third subset of the group of individuals; and determining respective survival rates for the third subset of the group of individuals.

Aspect 23. The system of aspect 22, wherein the measure of significance corresponds to survival rate with respect to a treatment of the plurality of treatments and a genomic mutation of the one or more genomic mutations.

Aspect 24. The system of aspect 23, wherein the one or more computer-readable storage media store additional computer-executable instructions that, when executed by the one or more hardware processing units, cause the system to perform additional operations comprising determining, based on measure of significance, an effectiveness of the treatment for the third subset of the group of individuals.

Aspect 25. The system of aspect 24, wherein the one or more computer-readable storage media store additional computer-executable instructions that, when executed by the one or more hardware processing units, cause the system to perform additional operations comprising determining individuals in third subset of the group of individuals that have not received the treatment.

Aspect 26. The system of any one of aspects 18-25, wherein: the integrated data repository is arranged according to a data repository schema that includes a plurality of data tables and a plurality of logical links between the plurality of data tables; and individual logical links of the plurality of logical links indicating one or more rows of a data table of the plurality of data tables that correspond to one or more additional rows of an additional data table of the plurality of data tables.

Aspect 27. The system of aspect 26, wherein the plurality of data tables include: a first data table that stores genomics data of the group of individuals; a second data that stores data related to one or more patient visits by individuals to one or more healthcare providers; a third data table that stores information corresponding to respective services provided to individuals with respect to one or more patient visits to one or more healthcare providers indicated by the second data table; a fourth data table that stores personal information of the group of individuals; a fifth data table that stores information related to a health insurance company or governmental entity that made payment for services provided to the group of individuals; a sixth data table storing information corresponding to health insurance coverage information for the group of individuals; and a seventh data table that stores information related to pharmaceutical treatments obtained by the group of individuals.

Aspect 28. The system of any one of aspects 18-27, wherein: the number of identifiers generated using the second hash function comprise intermediate identifiers; and the one or more computer-readable storage media store additional computer-executable instructions that, when executed by the one or more hardware processing units, cause the system to perform additional operations comprising applying a salt function to the intermediate identifiers to generate a final set of identifiers.

Aspect 29. The system of any one of aspects 18-28, wherein the one or more computer-readable storage media store additional computer-executable instructions that, when executed by the one or more hardware processing units, cause the system to perform additional operations comprising: obtaining information from an additional data repository that includes electronic medical records of an additional group of individuals; determining a subset of the additional group of individuals that corresponds to the group of individuals having data stored by the genomics data repository; and modifying the integrated data repository to store at least a portion of the information of the medical records of the subset of the additional group of individuals in relation to the number of identifiers.

Aspect 30. The system of aspect 29, wherein the one or more computer-readable storage media store additional computer-executable instructions that, when executed by the one or more hardware processing units, cause the system to perform additional operations comprising: performing one or more optical character recognition operations with respect to the additional information; analyzing the additional information obtained from the additional data repository to determine one or more portions of the additional information to remove to produce a corpus of information.

Aspect 31. The system of aspect 30, wherein the one or more computer-readable storage media store additional computer-executable instructions that, when executed by the one or more hardware processing units, cause the system to perform additional operations comprising: analyzing the corpus of information to determine a portion of the subset of the additional group of individuals that correspond to one or more biomarkers; and generating one or more data structures that store identifiers of the portion of the subset of the additional group of individuals and that store an indication that the portion of the subset of the additional group of individuals corresponds to the one or more biomarkers.

Aspect 32. The system of claim 31, wherein the one or more computer-readable storage media store additional computer-executable instructions that, when executed by the one or more hardware processing units, cause the system to perform additional operations comprising: storing the one or more data structures in an intermediate data repository; performing one or more de-identification operations with respect to the identifiers of the portion of the subset of the additional group of individuals before modifying the integrated data repository to store at least a portion of the additional information of the medical records of the portion of the subset of the additional group of individuals in relation to the number of identifiers.

Aspect 33. The system of any one of aspects 18-32, wherein the molecular data repository stores at least one or more of genomic information, genetic information, metabolomic information, transcriptomic information, fragmentomic information, immune receptor information, methylation information, epigenomic information, or proteomic information.

Aspect 34. One or more non-transitory computer-readable storage media storing computer-executable instructions that, when executed by one or more hardware processing units, cause the system to perform operations comprising: generating a data file including first tokens generated using a first hash function, individual first tokens corresponding to a respective individual of a group of individuals having data stored by a molecular data repository; sending the data file to a health insurance claims data management system; obtaining, from the health insurance claims data management system, in response to the data file, health insurance claims data corresponding to the group of individuals; generating a number of identifiers using a second hash function that is different from the first hash function, each identifier corresponds to one or more tokens related to each individual of the group of individuals; obtaining, using the number of identifiers, second data from the molecular data repository for the group of individuals; determining respective portions of the first data that correspond to respective portions of the second data for the group of individuals; and generating an integrated data repository that stores the respective portions of the first data and the respective portions of the second data in relation to respective identifiers of the number of identifiers.

Aspect 35. The one or more non-transitory computer-readable media of aspect 34, comprising additional computer-executable instructions that, when executed by the one or more hardware processing units, cause the system to perform additional operations comprising: determining a first set of data processing instructions that are executable in relation to first data stored by the integrated data repository; causing the first set of data processing instructions to be executed to analyze first health insurance claims codes included in the first data to determine a first subset of the group of individuals in which a biological condition is present; and generating a first dataset indicating the subset of the group of individuals in which the biological condition is present.

Aspect 36. The one or more non-transitory computer-readable media of aspect 35, comprising additional computer-executable instructions that, when executed by the one or more hardware processing units, cause the system to perform additional operations comprising: determining, by the computing system, a second set of data processing instructions that are executable in relation to second data stored by the integrated data repository; causing, by the computing system, the second set of data processing instructions to be executed to analyze the second health insurance claims codes included in the second data to determine one or more treatments provided to a second subset of the group of individuals; and generating, by the computing system, a second dataset indicating the one or more treatments provided to the second subset of the group of individuals.

Aspect 37. The one or more non-transitory computer-readable media of aspect 36, comprising additional computer-executable instructions that, when executed by the one or more hardware processing units, cause the system to perform additional operations comprising: determining, by the computing system, a third subset of the group of individuals that includes a portion of the first subset of the group of individuals that overlaps with a portion of the second subset of the group of individuals; receiving, by the computing system, a request to perform an analysis of the first dataset and the second dataset in relation to the third subset of the group of individuals; and analyzing, by the computing system and in response to the request, the first dataset and the second dataset with respect to the third subset of the group of individuals to determine a measure of significance of a characteristic of the third subset of the group of individuals with respect to the biological condition.

Aspect 38. The one or more non-transitory computer-readable media of aspect 37, comprising additional computer-executable instructions that, when executed by the one or more hardware processing units, cause the system to perform additional operations comprising: determining one or more genomic mutations present in the third subset of the group of individuals; determining a plurality of treatments provided to the third subset of the group of individuals; and determining respective survival rates for the third subset of the group of individuals.

Aspect 39. The one or more non-transitory computer-readable media of aspect 38, wherein the measure of significance corresponds to survival rate with respect to a treatment of the plurality of treatments and a genomic mutation of the one or more genomic mutations.

Aspect 40. The one or more non-transitory computer-readable media of claim 39, comprising additional computer-executable instructions that, when executed by the one or more hardware processing units, cause the system to perform additional operations comprising determining, based on measure of significance, an effectiveness of the treatment for the third subset of the group of individuals.

Aspect 41. The one or more non-transitory computer-readable media of aspect 40, comprising additional computer-executable instructions that, when executed by the one or more hardware processing units, cause the system to perform additional operations comprising determining individuals in third subset of the group of individuals that have not received the treatment.

Aspect 42. The one or more non-transitory computer-readable media of aspect 34, wherein: the integrated data repository is arranged according to a data repository schema that includes a plurality of data tables and a plurality of logical links between the plurality of data tables; and individual logical links of the plurality of logical links indicating one or more rows of a data table of the plurality of data tables that correspond to one or more additional rows of an additional data table of the plurality of data tables.

Aspect 43. The one or more non-transitory computer-readable media of aspect 42, wherein the plurality of data tables include: a first data table that stores genomics data of the group of individuals; a second data that stores data related to one or more patient visits by individuals to one or more healthcare providers; a third data table that stores information corresponding to respective services provided to individuals with respect to one or more patient visits to one or more healthcare providers indicated by the second data table; a fourth data table that stores personal information of the group of individuals; a fifth data table that stores information related to a health insurance company or governmental entity that made payment for services provided to the group of individuals; a sixth data table storing information corresponding to health insurance coverage information for the group of individuals; and a seventh data table that stores information related to pharmaceutical treatments obtained by the group of individuals.

Aspect 44. The one or more non-transitory computer-readable media of any one of aspects 34-43, wherein: the number of identifiers generated using the second hash function comprise intermediate identifiers; and wherein the one or more non-transitory computer-readable storage media store additional computer-executable instructions that, when executed by the one or more hardware processing units, cause the system to perform additional operations comprising applying a salt function to the intermediate identifiers to generate a final set of identifiers.

Aspect 45. The one or more non-transitory computer-readable media of aspect 44, comprising additional computer-executable instructions that, when executed by the one or more hardware processing units, cause the system to perform additional operations comprising: obtaining information from an additional data repository that includes electronic medical records of an additional group of individuals; determining a subset of the additional group of individuals that corresponds to the group of individuals having data stored by the genomics data repository; and modifying the integrated data repository to store at least a portion of the information of the medical records of the subset of the additional group of individuals in relation to the number of identifiers.

Aspect 46. The one or more non-transitory computer-readable media of aspect 45, comprising additional computer-executable instructions that, when executed by the one or more hardware processing units, cause the system to perform additional operations comprising: performing one or more optical character recognition operations with respect to the additional information; analyzing the additional information obtained from the additional data repository to determine one or more portions of the additional information to remove to produce a corpus of information.

Aspect 47. The one or more non-transitory computer-readable media of aspect 46, comprising additional computer-executable instructions that, when executed by the one or more hardware processing units, cause the system to perform additional operations comprising: analyzing the corpus of information to determine a portion of the subset of the additional group of individuals that correspond to one or more biomarkers; and generating one or more data structures that store identifiers of the portion of the subset of the additional group of individuals and that store an indication that the portion of the subset of the additional group of individuals corresponds to the one or more biomarkers.

Aspect 48. The one or more non-transitory computer-readable media of aspect 47, comprising additional computer-executable instructions that, when executed by the one or more hardware processing units, cause the system to perform additional operations comprising: storing the one or more data structures in an intermediate data repository; performing one or more de-identification operations with respect to the identifiers of the portion of the subset of the additional group of individuals before modifying the integrated data repository to store at least a portion of the additional information of the medical records of the portion of the subset of the additional group of individuals in relation to the number of identifiers.

Aspect 49. The one or more non-transitory computer-readable media of any one of aspects 34-48, wherein the molecular data repository stores at least one or more of genomic information, genetic information, metabolomic information, transcriptomic information, fragmentomic information, immune receptor information, methylation information, epigenomic information, or proteomic information.

Aspect 50. A method comprising: generating, by a computing system including processing circuitry and memory, a data file including first tokens generated using a first hash function, individual first tokens corresponding to a respective individual of a group of individuals having data stored by a molecular data repository; sending, by the computing system, the data file to a medical records data management system; obtaining, by the computing system and from the medical records data management system, in response to the data file, medical records data corresponding to the group of individuals; generating, by the computing system, a number of identifiers using a second hash function that is different from the first hash function, each identifier corresponds to one or more tokens related to each individual of the group of individuals; obtaining, by the computing system and using the number of identifiers, second data from the molecular data repository for the group of individuals; determining, by the computing system, respective portions of the first data that correspond to respective portions of the second data for the group of individuals; generating, by the computing system, an integrated data repository that stores the respective portions of the first data and the respective portions of the second data in relation to respective identifiers of the number of identifiers; receiving, by the computing system, a request to determine data with respect to a number of individuals having data stored in the integrated data repository, wherein the request includes one or more search criteria; determining, by the computing system, a subset of the number of individuals having one or more characteristics that correspond to the one or more search criteria; and analyzing, by the computing system, information of the subset of the number of individuals to determine a measure of significance of a characteristic of the one or more characteristics with respect to a biological condition.

Aspect 51. The method of aspect 50, comprising: determining, by the computing system, one or more genomic mutations present in the subset of the number of individuals; determining, by the computing system, a plurality of treatments provided to the subset of the number of individuals; and determining, by the computing system, respective survival rates for the subset of the number of individuals.

Aspect 52. The method of aspect 51, wherein the measure of significance corresponds to survival rate with respect to a treatment of the plurality of treatments and a genomic mutation of the one or more genomic mutations.

Aspect 53. The method of aspect 52, comprising determining, by the computing system and based on measure of significance, an effectiveness of the treatment for the subset of the number of individuals.

Aspect 54. The method of aspect 53, comprising determining, by the computing system, individuals in subset of the number of individuals that have not received the treatment.

Aspect 55. The method of aspect 54, comprising administering one or more therapeutically effective amounts of the treatment to the individuals in the subset of the number of individuals that have not received the treatment.

Aspect 56. The method of any one of aspects 50-55, wherein: the integrated data repository is arranged according to a data repository schema that includes a plurality of data tables and a plurality of logical links between the plurality of data tables; individual logical links of the plurality of logical links indicating one or more rows of a data table of the plurality of data tables that correspond to one or more additional rows of an additional data table of the plurality of data tables.

Aspect 57. The method of aspect 56, wherein the plurality of data tables include: a first data table that stores genomics data of the group of individuals; a second data that stores data related to one or more patient visits by individuals to one or more healthcare providers; a third data table that stores information corresponding to respective services provided to individuals with respect to one or more patient visits to one or more healthcare providers indicated by the second data table; a fourth data table that stores personal information of the group of individuals; a fifth data table that stores information related to a health insurance company or governmental entity that made payment for services provided to the group of individuals; a sixth data table storing information corresponding to health insurance coverage information for the group of individuals; and a seventh data table that stores information related to pharmaceutical treatments obtained by the group of individuals.

Aspect 58. The method of any one of aspects 50-57, wherein the number of identifiers generated using the second hash function comprise intermediate identifiers; and the method comprises: applying, by the computing system, a salt function to the intermediate identifiers to generate a final set of identifiers.

Aspect 59. The method of any one of aspects 50-58, comprising: obtaining, by the computing system, additional information from an additional data repository that includes health insurance claims data of an additional group of individuals; determining, by the computing system, at least a subset of the additional group of individuals that corresponds to the group of individuals having data stored by the genomics data repository; and modifying, by the computing system, the integrated data repository to store at least a portion of the additional information of the health insurance claims data of the at least a subset of the additional group of individuals in relation to the number of identifiers.

Aspect 60. The method of any one of aspects 50-59, comprising: performing, by the computing system, one or more optical character recognition operations with respect to the medical records data; analyzing, by the computing system, the medical records data to determine one or more portions of the medical records data to remove to produce a corpus of information.

Aspect 61. The method of aspect 60, comprising: analyzing, by the computing system, the corpus of information to determine a portion of the subset of the group of individuals that correspond to one or more biomarkers; and generating, by the computing system, one or more data structures that store identifiers of the portion of the subset of the group of individuals and that store an indication that the portion of the subset of the group of individuals corresponds to the one or more biomarkers.

Aspect 62. The method of aspect 61, comprising: storing, by the computing system, the one or more data structures in an intermediate data repository; performing, by the computing system, one or more de-identification operations with respect to the identifiers of the portion of the subset of the group of individuals before modifying the integrated data repository to store at least a portion of the medical records data of the portion of the subset of the group of individuals in relation to the number of identifiers.

Aspect 63. The method of any one of aspects 50-62, wherein the molecular data repository stores at least one or more of genomic information, genetic information, metabolomic information, transcriptomic information, fragmentomic information, immune receptor information, methylation information, epigenomic information, or proteomic information.

Aspect 64. A system comprising: one or more hardware processing units; one or more computer-readable storage media storing computer-executable instructions that, when executed by the one or more hardware processing units, cause the system to perform operations comprising: generating a data file including first tokens generated using a first hash function, individual first tokens corresponding to a respective individual of a group of individuals having data stored by a molecular data repository; sending the data file to a medical records data management system; obtaining, from the medical records data management system, in response to the data file, medical records data corresponding to the group of individuals; generating a number of identifiers using a second hash function that is different from the first hash function, each identifier corresponds to one or more tokens related to each individual of the group of individuals; obtaining, using the number of identifiers, second data from the molecular data repository for the group of individuals; determining respective portions of the first data that correspond to respective portions of the second data for the group of individuals; generating an integrated data repository that stores the respective portions of the first data and the respective portions of the second data in relation to respective identifiers of the number of identifiers; receiving a request to determine data with respect to a number of individuals having data stored in the integrated data repository, wherein the request includes one or more search criteria; determining a subset of the number of individuals having one or more characteristics that correspond to the one or more search criteria; and analyzing information of the subset of the number of individuals to determine a measure of significance of a characteristic of the one or more characteristics with respect to a biological condition.

Aspect 65. The system of aspect 64, wherein the one or more computer-readable storage media store additional computer-executable instructions that, when executed by the one or more hardware processing units, cause the system to perform additional operations comprising: determining one or more genomic mutations present in the subset of the number of individuals; determining a plurality of treatments provided to the subset of the number of individuals; and determining respective survival rates for the subset of the number of individuals.

Aspect 66. The system of aspect 65, wherein the measure of significance corresponds to survival rate with respect to a treatment of the plurality of treatments and a genomic mutation of the one or more genomic mutations.

Aspect 67. The system of aspect 66, wherein the one or more computer-readable storage media store additional computer-executable instructions that, when executed by the one or more hardware processing units, cause the system to perform additional operations comprising determining, based on measure of significance, an effectiveness of the treatment for the subset of the number of individuals.

Aspect 68. The system of aspect 67, wherein the one or more computer-readable storage media store additional computer-executable instructions that, when executed by the one or more hardware processing units, cause the system to perform additional operations comprising determining individuals in subset of the number of individuals that have not received the treatment.

Aspect 69. The system of any one of aspects 64-68, wherein: the integrated data repository is arranged according to a data repository schema that includes a plurality of data tables and a plurality of logical links between the plurality of data tables; and individual logical links of the plurality of logical links indicating one or more rows of a data table of the plurality of data tables that correspond to one or more additional rows of an additional data table of the plurality of data tables.

Aspect 70. The system of aspect 69, wherein the plurality of data tables include: first data table that genomics data of the group of individuals; a second data that stores data related to one or more patient visits by individuals to one or more healthcare providers; a third data table that stores information corresponding to respective services provided to individuals with respect to one or more patient visits to one or more healthcare providers indicated by the second data table; a fourth data table that stores personal information of the group of individuals; a fifth data table that stores information related to a health insurance company or governmental entity that made payment for services provided to the group of individuals; a sixth data table storing information corresponding to health insurance coverage information for the group of individuals; and a seventh data table that stores information related to pharmaceutical treatments obtained by the group of individuals.

Aspect 71. The system of any one of aspects 64-70, wherein the number of identifiers generated using the second hash function comprise intermediate identifiers; and wherein the one or more computer-readable storage media store additional computer-executable instructions that, when executed by the one or more hardware processing units, cause the system to perform additional operations comprising applying a salt function to the intermediate identifiers to generate a final set of identifiers.

Aspect 72. The system of any one of aspects 64-71, wherein the one or more computer-readable storage media store additional computer-executable instructions that, when executed by the one or more hardware processing units, cause the system to perform additional operations comprising obtaining additional information from an additional data repository that includes health insurance claims data of an additional group of individuals; determining at least a subset of the additional group of individuals that corresponds to the group of individuals having data stored by the genomics data repository; and modifying the integrated data repository to store at least a portion of the additional information of the health insurance claims data of the at least a subset of the additional group of individuals in relation to the number of identifiers.

Aspect 73. The system of any one of aspects 64-72, wherein the one or more computer-readable storage media store additional computer-executable instructions that, when executed by the one or more hardware processing units, cause the system to perform additional operations comprising: performing one or more optical character recognition operations with respect to the medical records data; analyzing the medical records data to determine one or more portions of the medical records data to remove to produce a corpus of information.

Aspect 74. The system of aspect 73, wherein the one or more computer-readable storage media store additional computer-executable instructions that, when executed by the one or more hardware processing units, cause the system to perform additional operations comprising: analyzing the corpus of information to determine a portion of the subset of the group of individuals that correspond to one or more biomarkers; and generating one or more data structures that store identifiers of the portion of the subset of the group of individuals and that store an indication that the portion of the subset of the group of individuals corresponds to the one or more biomarkers.

Aspect 75. The system of aspect 74, wherein the one or more computer-readable storage media store additional computer-executable instructions that, when executed by the one or more hardware processing units, cause the system to perform additional operations comprising: storing the one or more data structures in an intermediate data repository; and performing one or more de-identification operations with respect to the identifiers of the portion of the subset of the group of individuals before modifying the integrated data repository to store at least a portion of the medical records data of the portion of the subset of the group of individuals in relation to the number of identifiers.

Aspect 76. The system of any one of aspects 64-75, wherein the molecular data repository stores at least one or more of genomic information, genetic information, metabolomic information, transcriptomic information, fragmentomic information, immune receptor information, methylation information, epigenomic information, or proteomic information.

Aspect 77. One or more non-transitory computer-readable storage media storing computer-executable instructions that, when executed by one or more hardware processing units, cause the system to perform operations comprising: generating a data file including first tokens generated using a first hash function, individual first tokens corresponding to a respective individual of a group of individuals having data stored by a molecular data repository; sending the data file to a medical records data management system; obtaining, from the medical records data management system, in response to the data file, medical records data corresponding to the group of individuals; generating a number of identifiers using a second hash function that is different from the first hash function, each identifier corresponds to one or more tokens related to each individual of the group of individuals; obtaining, using the number of identifiers, second data from the molecular data repository for the group of individuals; determining respective portions of the first data that correspond to respective portions of the second data for the group of individuals; generating an integrated data repository that stores the respective portions of the first data and the respective portions of the second data in relation to respective identifiers of the number of identifiers; receiving a request to determine data with respect to a number of individuals having data stored in the integrated data repository, wherein the request includes one or more search criteria; determining a subset of the number of individuals having one or more characteristics that correspond to the one or more search criteria; and analyzing information of the subset of the number of individuals to determine a measure of significance of a characteristic of the one or more characteristics with respect to a biological condition.

Aspect 78. The one or more non-transitory computer-readable media of aspect 77, wherein the one or more computer-readable storage media store additional computer-executable instructions that, when executed by the one or more hardware processing units, cause the system to perform additional operations comprising: determining one or more genomic mutations present in the subset of the number of individuals; determining a plurality of treatments provided to the subset of the number of individuals; and determining respective survival rates for the subset of the number of individuals.

Aspect 79. The one or more non-transitory computer-readable media of aspect 78, wherein the measure of significance corresponds to survival rate with respect to a treatment of the plurality of treatments and a genomic mutation of the one or more genomic mutations.

Aspect 80. The one or more non-transitory computer-readable media of aspect 79, comprising additional computer-executable instructions that, when executed by the one or more hardware processing units, cause the system to perform additional operations comprising: determining, based on measure of significance, an effectiveness of the treatment for the subset of the number of individuals.

Aspect 81. The one or more non-transitory computer-readable media of aspect 80, comprising additional computer-executable instructions that, when executed by the one or more hardware processing units, cause the system to perform additional operations comprising determining individuals in subset of the number of individuals that have not received the treatment.

Aspect 82. The one or more non-transitory computer-readable media of any one of aspects 77-81, wherein: the integrated data repository is arranged according to a data repository schema that includes a plurality of data tables and a plurality of logical links between the plurality of data tables; and individual logical links of the plurality of logical links indicating one or more rows of a data table of the plurality of data tables that correspond to one or more additional rows of an additional data table of the plurality of data tables.

Aspect 83. The one or more non-transitory computer-readable media of aspect 82, wherein the plurality of data tables include: a first data table that stores genomics data of the group of individuals; a second data that stores data related to one or more patient visits by individuals to one or more healthcare providers; a third data table that stores information corresponding to respective services provided to individuals with respect to one or more patient visits to one or more healthcare providers indicated by the second data table; a fourth data table that stores personal information of the group of individuals; a fifth data table that stores information related to a health insurance company or governmental entity that made payment for services provided to the group of individuals; a sixth data table storing information corresponding to health insurance coverage information for the group of individuals; and a seventh data table that stores information related to pharmaceutical treatments obtained by the group of individuals.

Aspect 84. The one or more non-transitory computer-readable media of any one of aspects 77-83, wherein the number of identifiers generated using the second hash function comprise intermediate identifiers; and comprising additional computer-executable instructions that, when executed by the one or more hardware processing units, cause the system to perform additional operations comprising applying a salt function to the intermediate identifiers to generate a final set of identifiers.

Aspect 85. The one or more non-transitory computer-readable media of any one of aspects 77-84, comprising additional computer-executable instructions that, when executed by the one or more hardware processing units, cause the system to perform additional operations comprising: obtaining additional information from an additional data repository that includes health insurance claims data of an additional group of individuals; determining at least a subset of the additional group of individuals that corresponds to the group of individuals having data stored by the genomics data repository; and modifying the integrated data repository to store at least a portion of the additional information of the health insurance claims data of the at least a subset of the additional group of individuals in relation to the number of identifiers.

Aspect 86. The one or more non-transitory computer-readable media of any one of aspects 77-85, comprising additional computer-executable instructions that, when executed by the one or more hardware processing units, cause the system to perform additional operations comprising: performing one or more optical character recognition operations with respect to the medical records data; and analyzing the medical records data to determine one or more portions of the medical records data to remove to produce a corpus of information.

Aspect 87. The one or more non-transitory computer-readable media of aspect 86, comprising additional computer-executable instructions that, when executed by the one or more hardware processing units, cause the system to perform additional operations comprising: analyzing the corpus of information to determine a portion of the subset of the group of individuals that correspond to one or more biomarkers; and generating one or more data structures that store identifiers of the portion of the subset of the group of individuals and that store an indication that the portion of the subset of the group of individuals corresponds to the one or more biomarkers.

Aspect 88. The one or more non-transitory computer-readable media of aspect 87, comprising additional computer-executable instructions that, when executed by the one or more hardware processing units, cause the system to perform additional operations comprising: storing the one or more data structures in an intermediate data repository; and performing one or more de-identification operations with respect to the identifiers of the portion of the subset of the group of individuals before modifying the integrated data repository to store at least a portion of the medical record data of the portion of the subset of the group of individuals in relation to the number of identifiers.

Aspect 89. The one or more non-transitory computer-readable media of any one of aspects 77-88, wherein the molecular data repository stores at least one or more of genomic information, genetic information, metabolomic information, transcriptomic information, fragmentomic information, immune receptor information, methylation information, epigenomic information, or proteomic information.

EXAMPLES

Example 1

Liquid biopsy provides a less invasive alternative to tissue biopsy for comprehensive genomic profiling (CGP) and also contains additional information in the form of circulating tumor DNA (ctDNA) level. Qualitative and quantitative ctDNA level has been shown to be indicative of tumor volume. Less is known about how ctDNA level, as estimated from a single blood collection, correlates with outcome of late stage metastatic non-small cell lung cancer (NSCLC) patients undergoing different treatment regimens.

Patients (pts) with NSCLC were identified via an integrated database and grouped by whether they had a liquid biopsy test within 190 days prior to start of metastatic first line (1 L) therapy ("Pre 1 L"), within 90 days after start of 1 L ("Early 1 L"), or between 90-190 days after start of 1 L ("Late 1 L"). Kaplan meier and Cox proportional hazards modeling (CPH) were used to assess differences in real world overall survival (rwOS). Gender and age were included as covariates in CPH. ctDNA level was defined as the highest variant allele fraction when used as a quantitative measure and a threshold value of 4% was used to define ctDNA high/low groups when used as a categorical variable in NSCLC.

Pts with higher levels of ctDNA had worse rwOS regardless of therapy or timing of blood collection relative to start of 1 L treatment, however, comparisons within 90 days post 1 L Osimertinib and Chemotherapy groups did not pass our cutoff for significance (<0.05), likely due to the small number pts in these groups. Pts without any tumor derived alteration detected had the longest rwOS and lowest hazard ratios relative to ctDNA high (range: 0.16 to 0.46).

Figure 10:
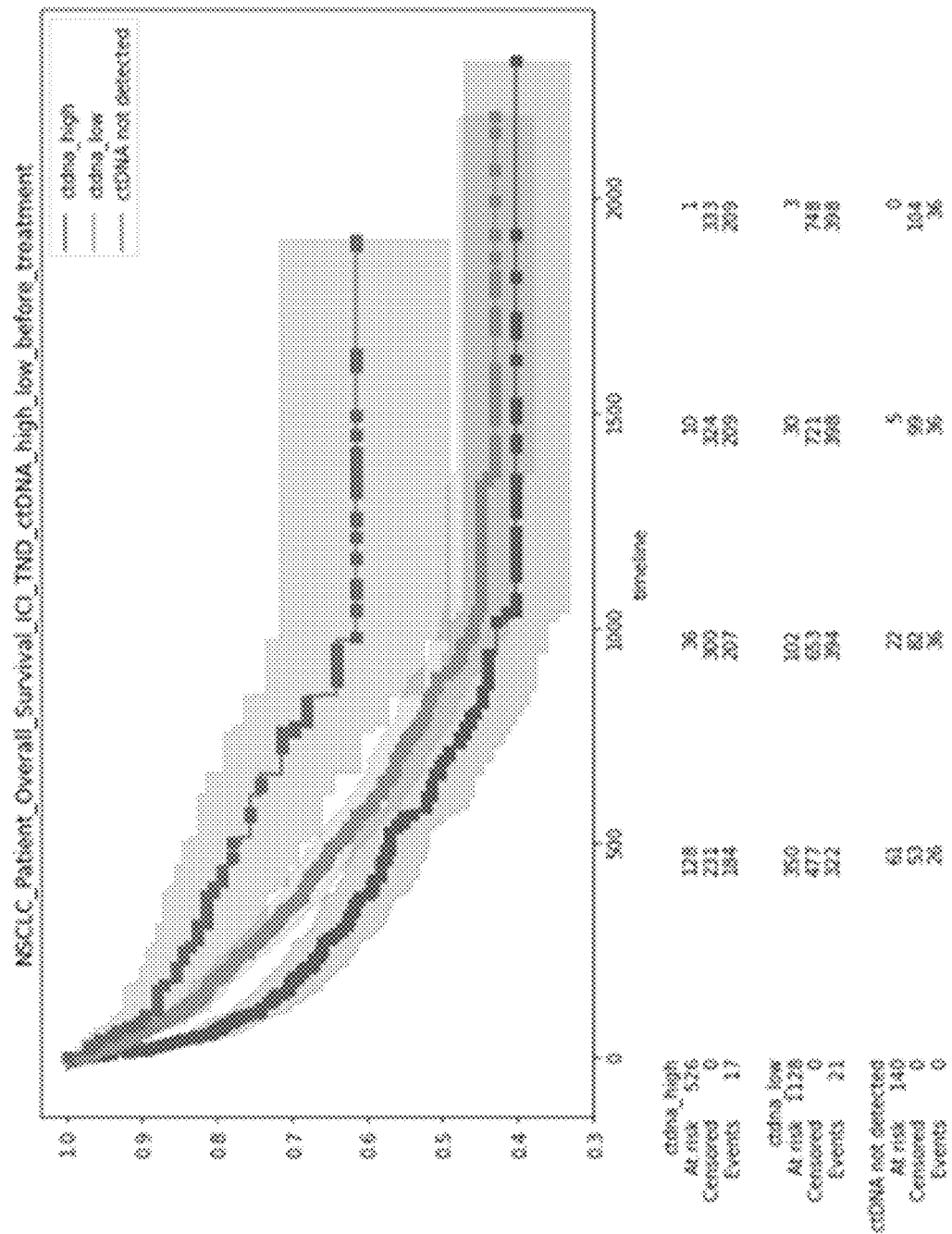
FIG. 10 is a diagram indicating Kaplan-Meier curves indicating real world overall survival values for patients that received 1 L therapy to treat non-small cell lung cancer before receiving their treatment with respect to high ctDNA counts, low ctDNA counts, and ctDNA not detected.

FIG. 10 is a diagram indicating Kaplan-Meier curves indicating real world overall survival values for patients that received 1 L therapy to treat non-small cell lung cancer before receiving their treatment with respect to high ctDNA counts, low ctDNA counts, and ctDNA not detected.

Figure 11:
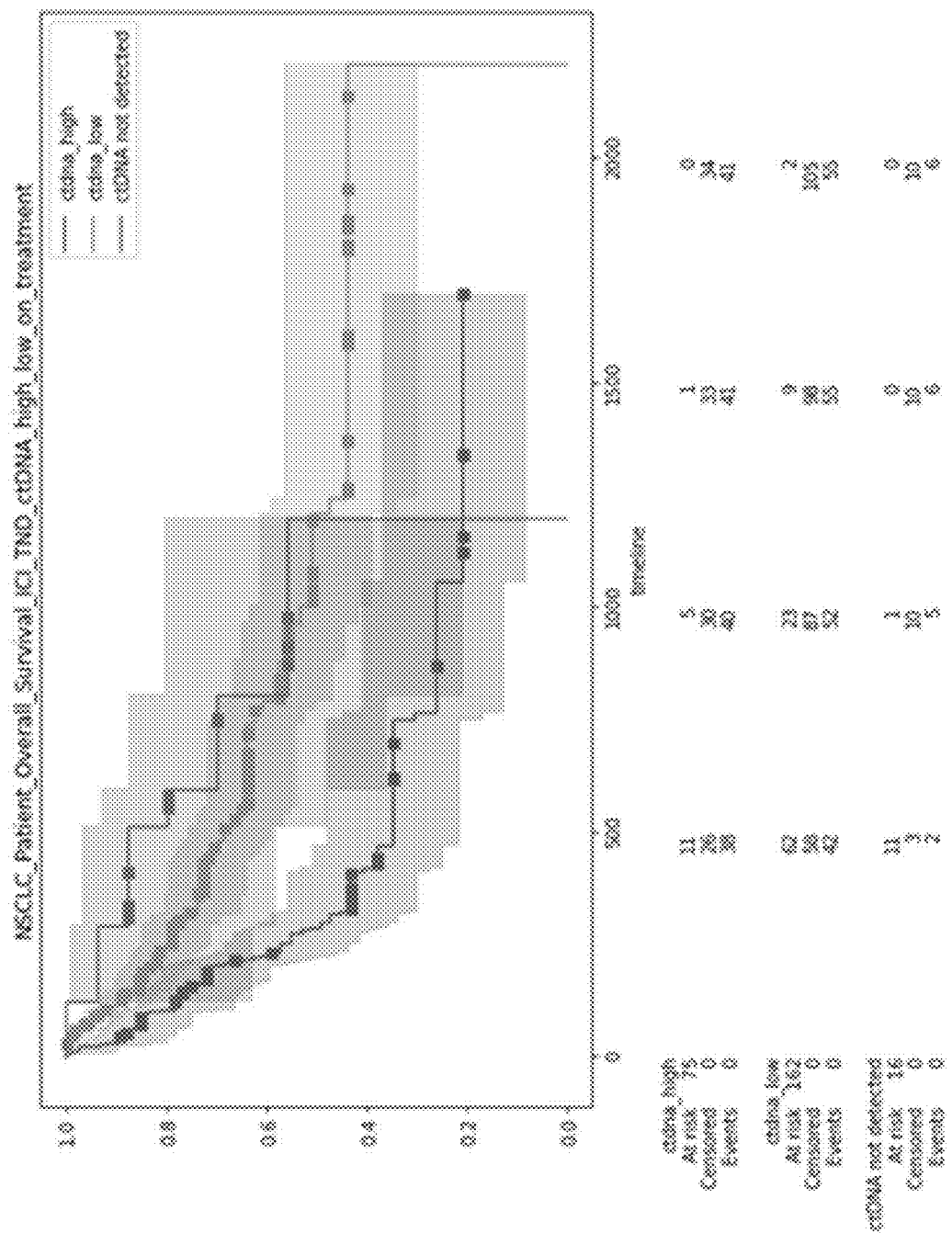
FIG. 11 is a diagram indicating Kaplan-Meier curves indicating real world overall survival values for patients that received 1 L therapy to treat non-small cell lung cancer during treatment with respect to high ctDNA counts, low ctDNA counts, and ctDNA not detected.

FIG. 11 is a diagram indicating Kaplan-Meier curves indicating real world overall survival values for patients that received 1 L therapy to treat non-small cell lung cancer during treatment with respect to high ctDNA counts, low ctDNA counts, and ctDNA not detected.

Figure 12:
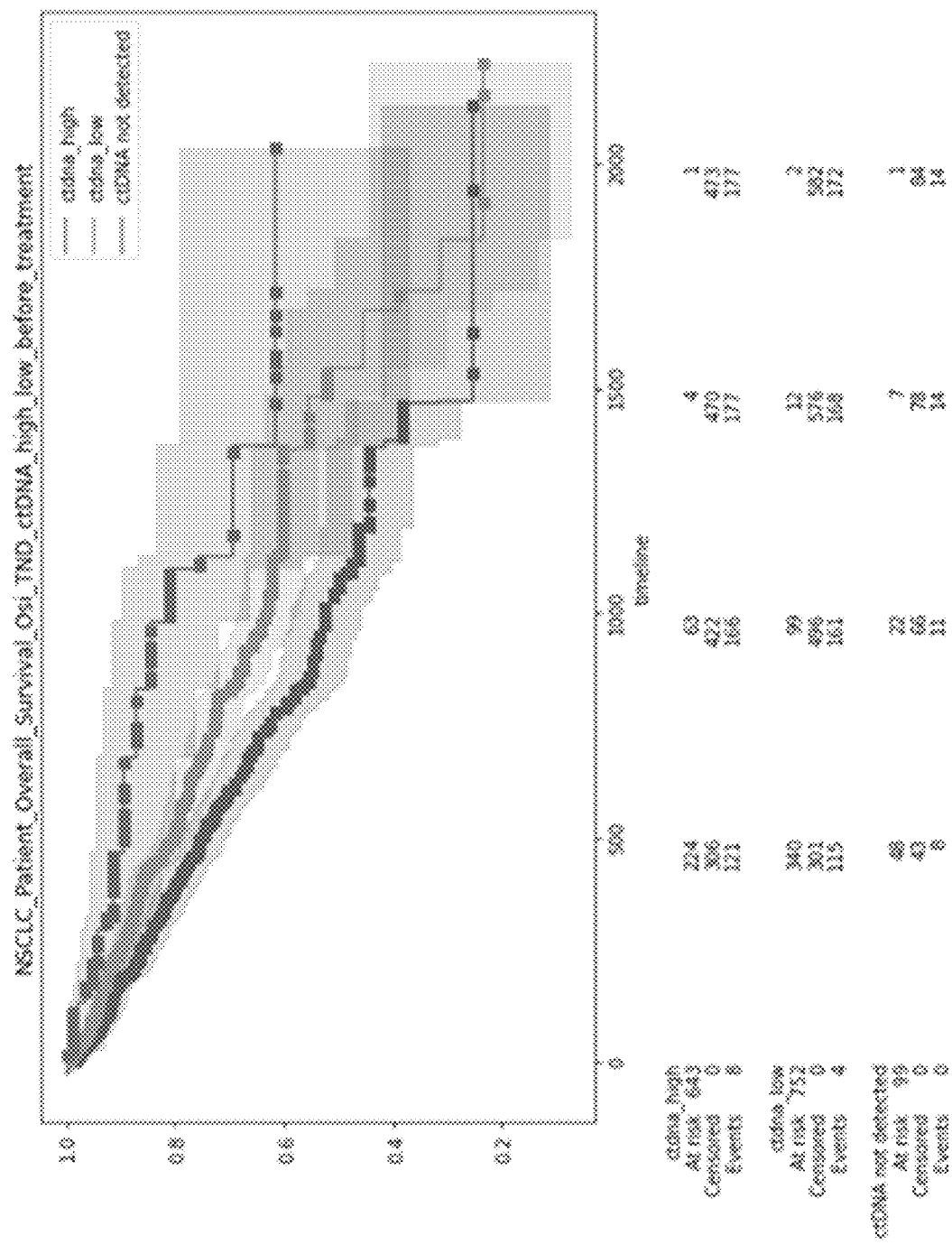
FIG. 12 is a diagram indicating Kaplan-Meier curves indicating real world overall survival values for patients that received Osimertinib to treat non-small cell lung cancer before their treatment with respect to high ctDNA counts, low ctDNA counts, and ctDNA not detected.

FIG. 12 is a diagram indicating Kaplan-Meier curves indicating real world overall survival values for patients that received Osimertinib to treat non-small cell lung cancer before their treatment with respect to high ctDNA counts, low ctDNA counts, and ctDNA not detected.

Figure 13:
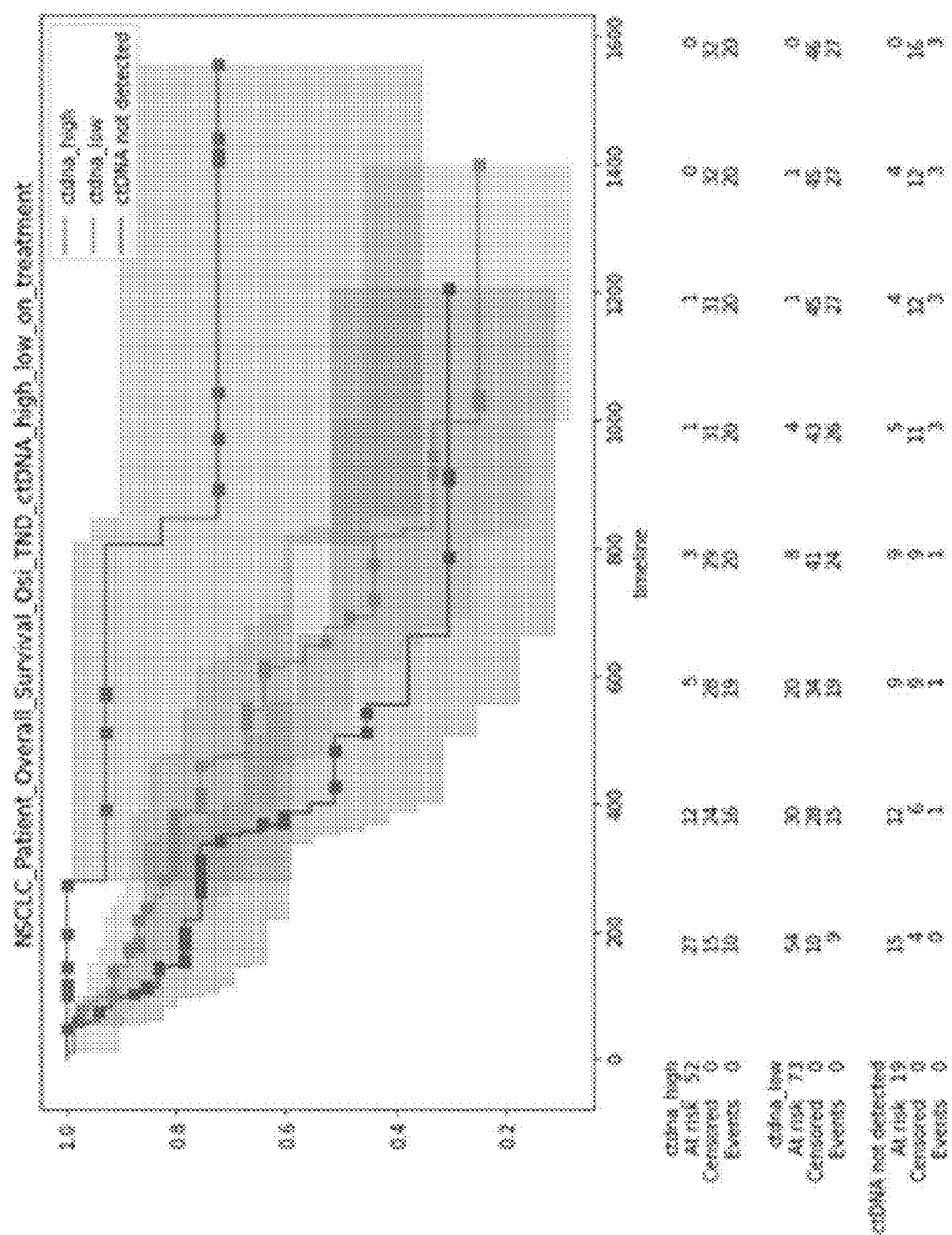
FIG. 13 is a diagram indicating Kaplan-Meier curves indicating real world overall survival values for patients that received Osimertinib to treat non-small cell lung cancer during treatment with respect to high ctDNA counts, low ctDNA counts, and ctDNA not detected.

FIG. 13 is a diagram indicating Kaplan-Meier curves indicating real world overall survival values for patients that received Osimertinib to treat non-small cell lung cancer during treatment with respect to high ctDNA counts, low ctDNA counts, and ctDNA not detected.

Figure 14:
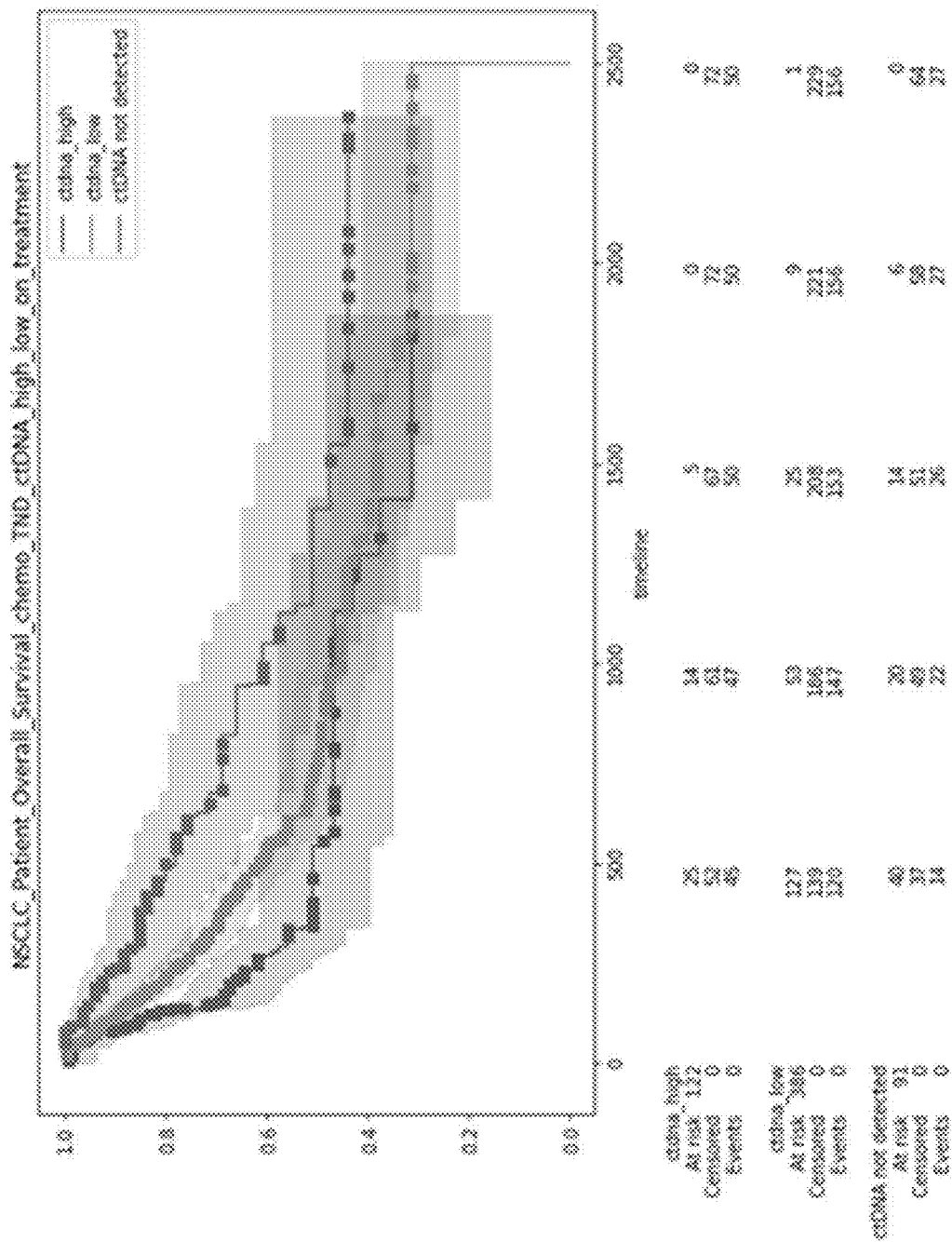
FIG. 14 is a diagram indicating Kaplan-Meier curves indicating real world overall survival values for patients that received chemotherapy to treat non-small cell lung cancer during treatment with respect to high ctDNA counts, low ctDNA counts, and ctDNA not detected.

FIG. 14 is a diagram indicating Kaplan-Meier curves indicating real world overall survival values for patients that received chemotherapy to treat non-small cell lung cancer during treatment with respect to high ctDNA counts, low ctDNA counts, and ctDNA not detected.

Figure 15:
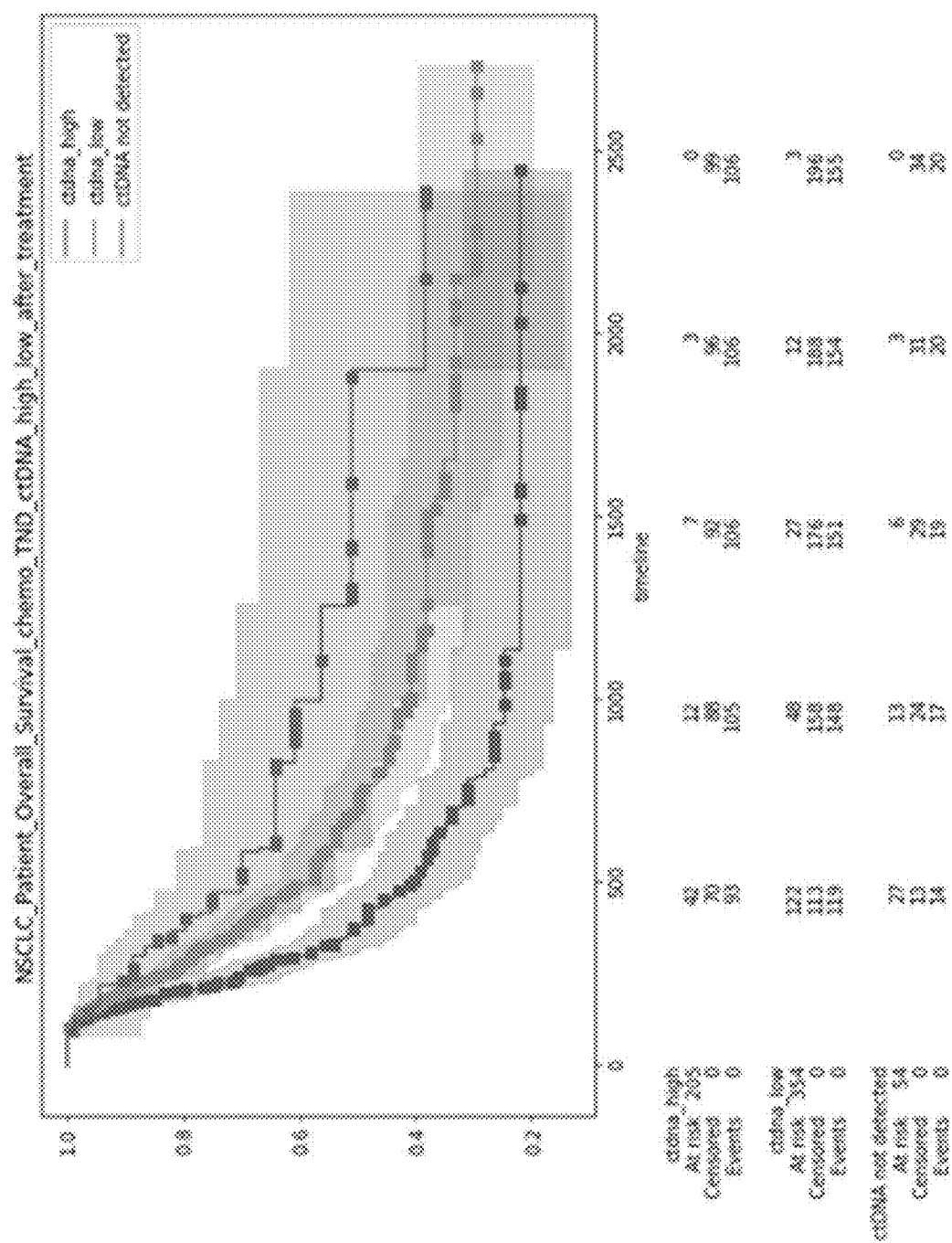
FIG. 15 is a diagram indicating Kaplan-Meier curves indicating real world overall survival values for patients that received chemotherapy to treat non-small cell lung cancer after treatment with respect to high ctDNA counts, low ctDNA counts, and ctDNA not detected.

FIG. 15 is a diagram indicating Kaplan-Meier curves indicating real world overall survival values for patients that received chemotherapy to treat non-small cell lung cancer after treatment with respect to high ctDNA counts, low ctDNA counts, and ctDNA not detected.

Figure 16:
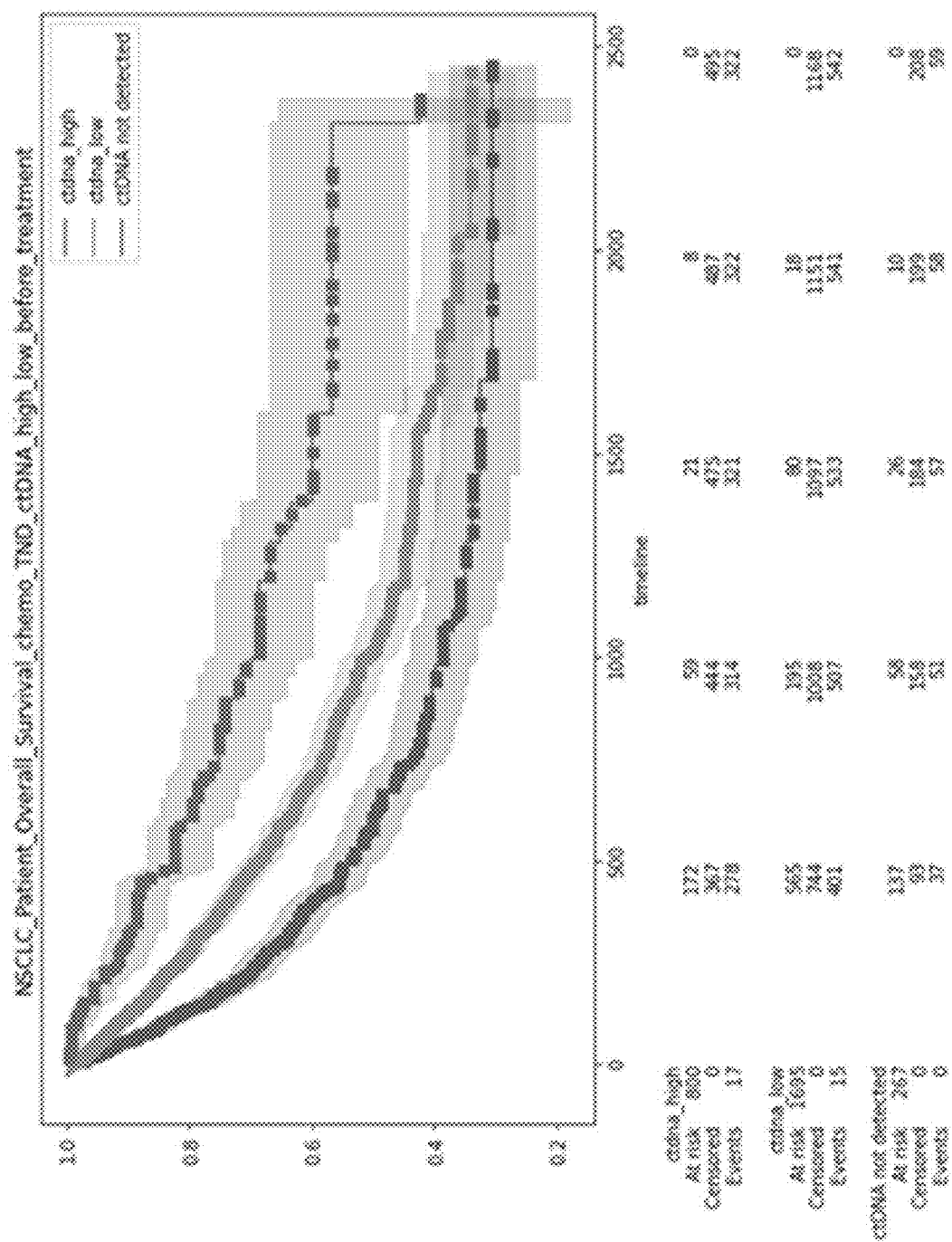
FIG. 16 is a diagram indicating Kaplan-Meier curves indicating real world overall survival values for patients that received chemotherapy to treat non-small cell lung cancer before receiving their treatment with respect to high ctDNA counts, low ctDNA counts, and ctDNA not detected.

FIG. 16 is a diagram indicating Kaplan-Meier curves indicating real world overall survival values for patients that received chemotherapy to treat non-small cell lung cancer before receiving their treatment with respect to high ctDNA counts, low ctDNA counts, and ctDNA not detected.

In addition to providing a less invasive alternative to tissue biopsy for CPG, highest variant allele fraction as reported on the liquid biopsy test, and particularly the lack of detected ctDNA, provides prognostic information for patients and may be useful to identify high risk patients that would benefit from more aggressive treatment regimens.

TABLE 1

1L Osimertinib patient outcomes by timing of blood collection.

| G360 timing | Logrank p-value | CPH p-value | CPH HR |
|---|---|---|---|
| pre-1L (ctDNA low vs high) | <0.005 | <0.005 | ctDNA low HR = 0.66 (1.52) |
| pre-1L (TND vs high) | <0.005 | <0.005 | TND HR = 0.37 (2.7) |
| Early 1L (ctDNA low vs high) | 0.13 | 0.12 | ctDNA low HR = 0.62 (1.61) |
| Early 1L (TND vs high) | <0.005 | <0.005 | TND HR = 0.16 (6.3) |
| Late 1L (ctDNA low vs high) | 0.01 | 0.02 | ctDNA low HR = 0.54 (1.85) |
| Late 1L (TND vs high) | 0.02 | 0.03 | TND HR = 0.35 (2.86) |

TABLE 2

1L ICI patient outcomes by timing of blood collection.

| G360 timing | Logrank p-value | CPH p-value | CPH HR |
|---|---|---|---|
| pre-1L (ctDNA low vs high) | <0.005 | <0.005 | ctDNA low HR = 0.73 (1.37) |
| pre-1L (TND vs high) | <0.005 | <0.005 | TND HR = 0.46 (2.17) |
| Early 1L (ctDNA low vs high) | 0.13 | <0.005 | ctDNA low HR = 0.41 (2.44) |
| Early 1L (TND vs high) | <0.005 | <0.01 | TND HR = 0.34 (2.94) |
| Late 1L (ctDNA low vs high) | 0.01 | 0.01 | ctDNA low HR = 0.55 (1.82) |
| Late 1L (TND vs high) | 0.02 | 0.06 | TND HR = 0.43 (2.33) |

TABLE 3

1L chemotherapy patient outcomes by timing of blood collection.

| G360 timing | Logrank p-value | CPH p-value | CPH HR |
|---|---|---|---|
| pre-1L (ctDNA low vs high) | <0.005 | <0.005 | ctDNA low HR = 0.64 (1.56) |
| pre-1L (TND vs high) | <0.005 | <0.005 | TND HR = 0.32 (3.13) |
| Early 1L (ctDNA low vs high) | <0.005 | 0.06 | ctDNA low HR = 0.73 (1.37) |
| Early 1L (TND vs high) | <0.005 | <0.005 | TND HR = 0.42 (2.38) |
| Late 1L (ctDNA low vs high) | <0.005 | <0.005 | ctDNA low HR = 0.60 (1.67) |
| Late 1L (TND vs high) | <0.005 | <0.005 | TND HR = 0.38 (2.63) |

Example 2

Results from a CLIA certified, CAP accredited, NYSDOH approved circulating tumor DNA (ctDNA) test indicated for patients with advanced solid tumors that was performed for approximately 103,000 patients were anonymized and tokenized using irreversible one-way hashing. Using a secure and HIPAA-compliant and certified methodology, these results were linked to a de-identified patient episode encounters database containing medical and pharmacy claims to provide a longitudinal view of patients' journeys, including diagnosis, treatments and real-world time-to-event data points in the integrated database. These de-identified, integrated data can then be used to explore disease, biomarker and therapy-specific models of tumor evolution, and drug resistance.

Figure 17:
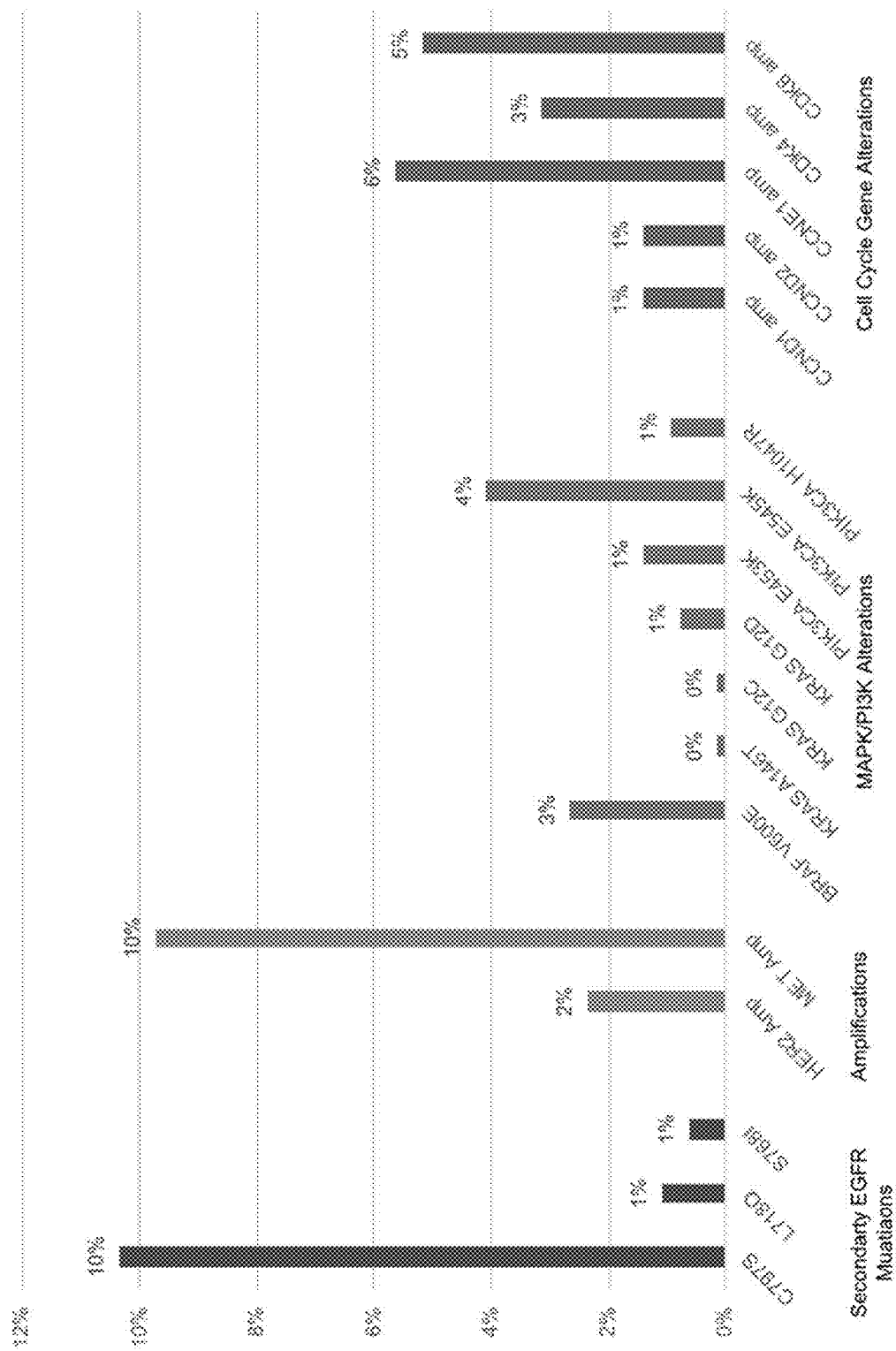
FIG. 17 is a diagram showing frequency of selected alterations in a cohort of patients diagnosed with advanced non-small cell lung cancer (NSCLC) (n=637) who received a liquid biopsy following initiation of treatment with first-line Osimertinib.

FIG. 17 is a diagram showing frequency of selected alterations in a cohort of patients diagnosed with advanced non-small cell lung cancer (NSCLC) (n=637) who received the liquid biopsy test following initiation of treatment with first-line Osimertinib. Approximately 12% exhibited secondary EGFR mutation. Approximately 12% exhibited gene amplifications, namely HER2 and MET. Approximately 10% exhibited mutations in MAPK/PIK3CA genes. And approximately 17% exhibited alterations in cell cycle genes. These results were directionally concordant with those published in Ramalingam et al. Mean duration of treatment for these patients was approximately 8 months, which is in line with published studies of Osimertinib.

Figure 18:
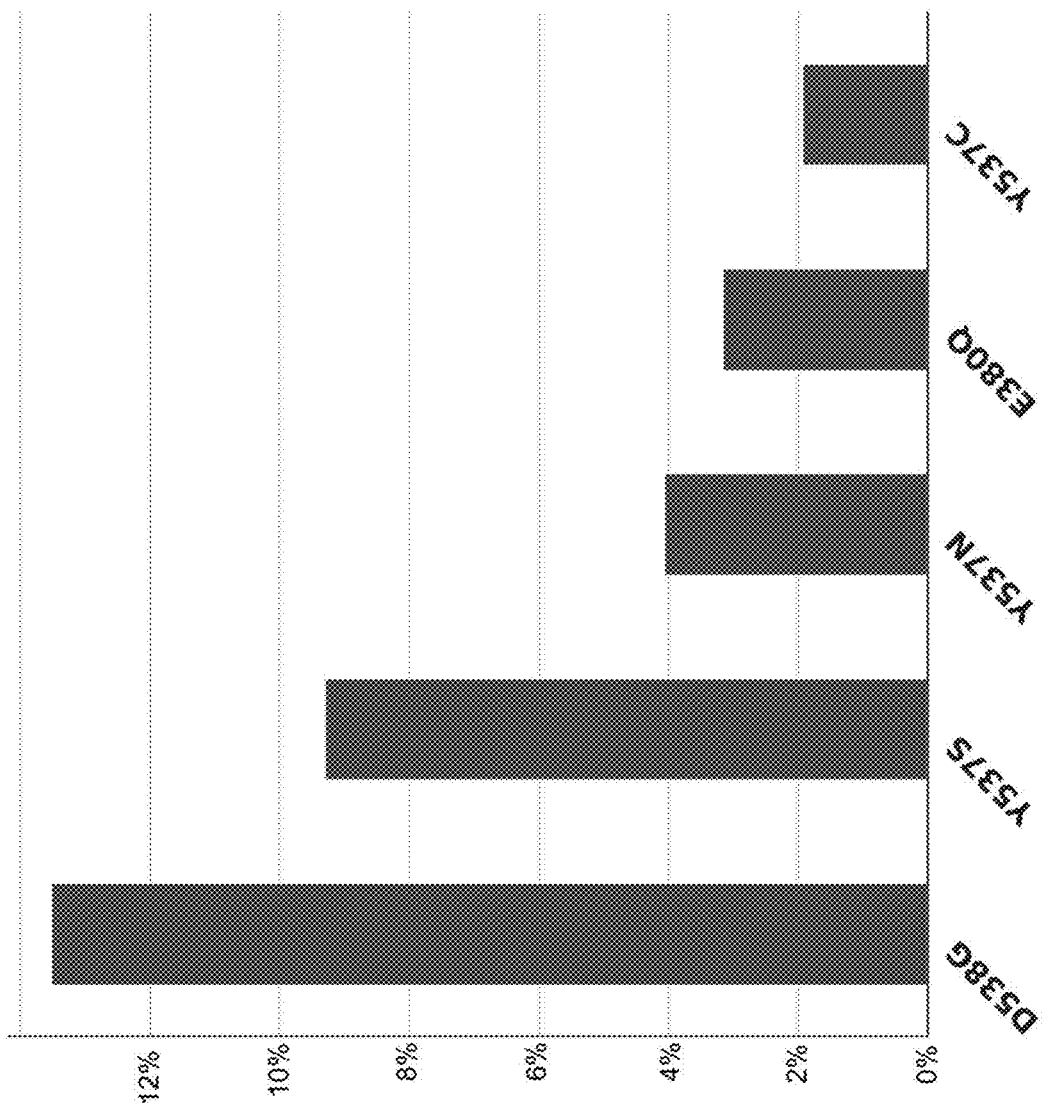
FIG. 18 is a diagram showing frequency of selected mutations in ligand binding domain for a cohort of patients diagnosed with breast cancer (n=4448) who received a liquid biopsy following record of treatment with aromatase inhibitor (AI).

FIG. 18 is a diagram showing frequency of selected mutations in ligand binding domain for a cohort of patients diagnosed with breast cancer (n=4448) who received the liquid biopsy test following record of treatment with aromatase inhibitor (AI). In the case of metastatic breast cancer, we examined data from 4,448 patients with a diagnosis of metastatic breast cancer prescribed an aromatase inhibitor who subsequently received the liquid biopsy test. Mutations occurring in the ligand-binding domain of ESR1 are commonly observed resistance mechanisms associated with progression on aromatase inhibitors, and data suggests that these mutations are highly heterogenous. Accordingly, we observed such heterogeneity in liquid biopsy test results, with the D538G and Y537S mutations being observed most often, as one might expect based on Toy et al.

Figure 19:
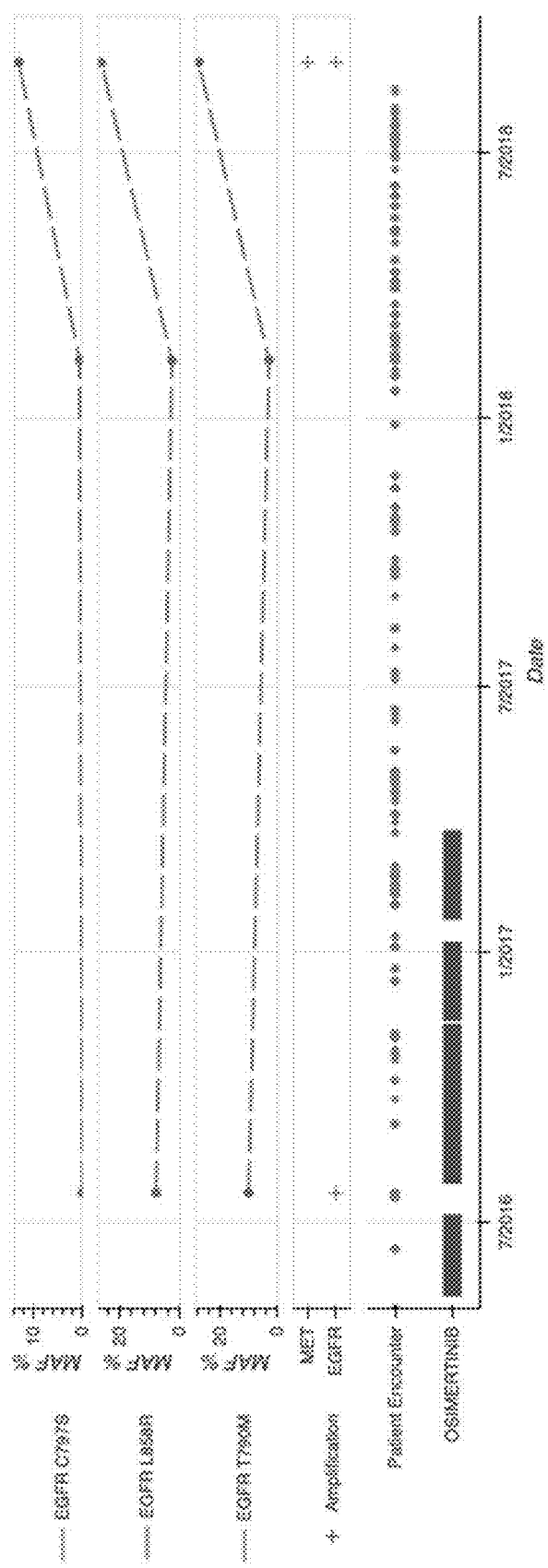
FIG. 19 is a diagram indicating alterations associated with Osimertinib resistance detected by a liquid biopsy following treatment provided to a female diagnosed with NSCLC.
Figure 20:
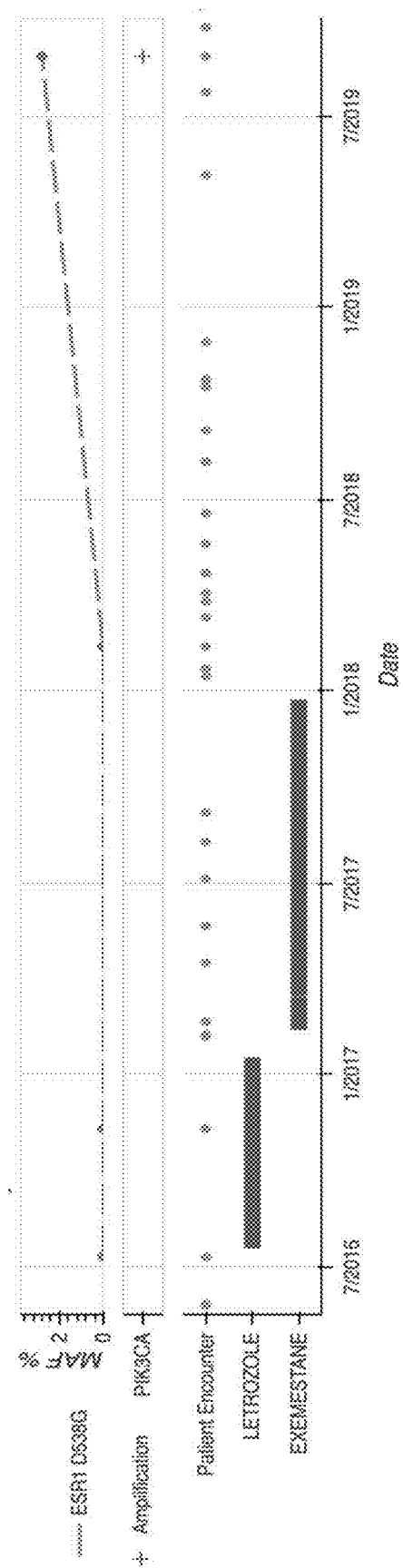
FIG. 20 is a diagram indicating ESR1 resistance mutation detected following second course of treatment with respect to a female diagnosed with metastatic breast cancer, treated with aromatase inhibitors.

To further elucidate the utility of the database in exploring genomic changes within the context of treatment, we examined two patient cases. In the first, as shown in FIG. 19, we see that the patient presents with T790M mutation as detected by the liquid biopsy test, is treated with Osimertinib, and subsequently develops a secondary C797S mutation as well as MET amplification. In the second case, as shown in FIG. 20, we see a patient with a record of treatment with the aromatase inhibitors letrozole and exemestane who then goes on to exhibit the D538G mutation of the ESR1 gene. FIG. 19 is a diagram indicating alterations associated with Osimertinib resistance detected by the liquid biopsy test following treatment provided to a female diagnosed with NSCLC. FIG. 20 is a diagram indicating ESR1 resistance mutation detected following second course of treatment with respect to a female diagnosed with metastatic breast cancer, treated with aromatase inhibitors.

The integrated database contains integrated and de-identified clinical and genomic information from more than 103,000 patients with advanced cancers, making it one the largest databases of its kind. It continues to grow and mature with the continued use of the liquid biopsy test and due to the unique and comprehensive capture of integrated clinical data (avoiding loss to follow-up and patient mobility).

The integrated database can be used to identify and study clinical outcomes based on genomic tumor characteristics using liquid biopsy test data. Specific agents and classes of therapies (TKIs, CDK 4/6is, etc.) can be reliably identified, placed into appropriate cohorts, and studied. This unique resource can interrogate biological mechanisms of drug response and resistance associated with treatments for advanced cancer in the real-world setting. Researchers can speed the development of novel therapies through identification and characterization of unmet medical need, trial design optimization, perform outcomes research in the post-market setting, and identify novel potential combination or therapeutic strategies (sequencing) amongst other applications. Future directions include further validation of data and addition of supplementary source data to support deeper analyses.

It should be understood that the individual steps used in the methods of the present teachings may be performed in any order and/or simultaneously, as long as the teaching remains operable. Furthermore, it should be understood that the apparatus and methods of the present teachings may include any number, or all, of the described implementations, as long as the teaching remains operable.

Various implementations of systems, devices, and methods have been described herein. These implementations are given only by way of example and are not intended to limit the scope of the claimed inventions. It should be appreciated, moreover, that the various features of the implementations that have been described may be combined in various ways to produce numerous additional implementations. Moreover, while various materials, dimensions, shapes, configurations and locations, etc. have been described for use with disclosed implementations, others besides those disclosed may be utilized without exceeding the scope of the claimed inventions.

Persons of ordinary skill in the relevant arts will recognize that implementations may comprise fewer features than illustrated in any individual implementation described above. The implementations described herein are not meant to be an exhaustive presentation of the ways in which the various features may be combined. Accordingly, the implementations are not mutually exclusive combinations of features; rather, implementations may comprise a combination of different individual features selected from different individual implementations, as understood by persons of ordinary skill in the art. Moreover, elements described with respect to one implementation may be implemented in other implementations even when not described in such implementations unless otherwise noted. Although a dependent claim may refer in the claims to a specific combination with one or more other claims, other implementations may also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one implementation," "an implementation," or "some implementations" means that a particular feature, structure, or characteristic, described in connection with the implementation, is included in at least one implementation of the teaching. The appearances of the phrase "in one implementation" in various places in the specification are not necessarily all referring to the same implementation.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Although an implementation has been described with reference to specific example implementations, it will be evident that various modifications and changes may be made to these implementations without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific implementations in which the subject matter may be practiced. The implementations illustrated are described in sufficient detail to enable those skilled in the art to practice the teachings disclosed herein. Other implementations may be utilized and derived therefrom, such that structural and logical substitutions and changes may be made without departing from the scope of this disclosure. This Detailed Description, therefore, is not to be taken in a limiting sense, and the scope of various implementations is defined only by the appended claims, along with the full range of equivalents to which such claims are entitled.

Although specific implementations have been illustrated and described herein, it should be appreciated that any arrangement calculated to achieve the same purpose may be substituted for the specific implementations shown. This disclosure is intended to cover any and all adaptations or variations of various implementations. Combinations of the above implementations, and other implementations not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method comprising:
   generating, by a computing system including processing circuitry and memory, a data file including first tokens generated using a first hash function, individual first tokens corresponding to a respective individual of a group of individuals having data stored by a molecular data repository;
   sending, by the computing system, the data file to a health insurance claims data management system;
   obtaining, by the computing system and from the health insurance claims data management system, in response to the data file, health data corresponding to the group of individuals;
   generating, by the computing system, a plurality of identifiers using a second hash function that is different from the first hash function, each identifier corresponding to one or more tokens related to each individual of the group of individuals;
   obtaining, by the computing system and using the plurality of identifiers, molecular data from the molecular data repository for the group of individuals;
   determining, by the computing system, respective portions of the health data that correspond to respective portions of the molecular data for the group of individuals;
   generating, by the computing system, an integrated data repository configured to store the respective portions of the first health data and the respective portions of the molecular data in relation to respective identifiers of the plurality of identifiers; and
   generating, by the computing system, de-identified data that relates the respective portions of the health data and the respective portions of the molecular data to the respective identifiers, the de-identified data transmittable to a device in response to a request to the integrated data repository.

2. The method of claim 1, comprising:
   determining, by the computing system, a first set of data processing instructions that are executable in relation to health data stored by the integrated data repository;
   causing, by the computing system, the first set of data processing instructions to be executed to analyze first health insurance claims codes included in the health data to determine a first subset of the group of individuals in which a biological condition is present; and
   generating, by the computing system, a first dataset indicating the subset of the group of individuals in which the biological condition is present.

3. The method of claim 2, comprising:
   determining, by the computing system, a second set of data processing instructions that are executable in relation to second data stored by the integrated data repository;
   causing, by the computing system, the second set of data processing instructions to be executed to analyze the second health insurance claims codes included in the second data to determine one or more treatments provided to a second subset of the group of individuals; and
   generating, by the computing system, a second dataset indicating the one or more treatments provided to the second subset of the group of individuals.

4. The method of claim 3, comprising:
   determining, by the computing system, a third subset of the group of individuals that includes a portion of the first subset of the group of individuals that overlaps with a portion of the second subset of the group of individuals;
   receiving, by the computing system, a request to perform an analysis of the first dataset and the second dataset in relation to the third subset of the group of individuals; and
   analyzing, by the computing system and in response to the request, the first dataset and the second dataset with respect to the third subset of the group of individuals to determine a measure of significance of a characteristic of the third subset of the group of individuals with respect to the biological condition.

5. The method of claim 4, comprising:
  determining, by the computing system, one or more genomic mutations present in the third subset of the group of individuals;
  determining, by the computing system, a plurality of treatments provided to the third subset of the group of individuals; and
  determining, by the computing system, respective survival rates for the third subset of the group of individuals.

6. The method of claim 5, wherein the measure of significance corresponds to survival rate with respect to a treatment of the plurality of treatments and a genomic mutation of the one or more genomic mutations.

7. The method of claim 6, comprising determining, by the computing system and based on measure of significance, an effectiveness of the treatment for the third subset of the group of individuals.

8. The method of claim 7, comprising determining, by the computing system, individuals in third subset of the group of individuals that have not received the treatment.

9. The method of claim 8, comprising administering one or more therapeutically effective amounts of the treatment to the individuals in the third subset that have not received the treatment.

10. The method of claim 1, wherein:
  the integrated data repository is arranged according to a data repository schema that includes a plurality of data tables and a plurality of logical links between the plurality of data tables;
  individual logical links of the plurality of logical links indicating one or more rows of a data table of the plurality of data tables that correspond to one or more additional rows of an additional data table of the plurality of data tables.

11. The method of claim 10, wherein the plurality of data tables include:
  a first data table that stores genomics data of the group of individuals;
  a second data that stores data related to one or more patient visits by individuals to one or more healthcare providers;
  a third data table that stores information corresponding to respective services provided to individuals with respect to one or more patient visits to one or more healthcare providers indicated by the second data table;
  a fourth data table that stores personal information of the group of individuals;
  a fifth data table that stores information related to a health insurance company or governmental entity that made payment for services provided to the group of individuals;
  a sixth data table storing information corresponding to health insurance coverage information for the group of individuals; and
  a seventh data table that stores information related to pharmaceutical treatments obtained by the group of individuals.

12. The method of claim 1, wherein the plurality of identifiers generated using the second hash function comprise intermediate identifiers; and the method comprises:
  applying, by the computing system, a salt function to the intermediate identifiers to generate a final set of identifiers.

13. The method of claim 1, comprising:
  obtaining, by the computing system, information from an additional data repository that includes electronic medical records of an additional group of individuals;
  determining, by the computing system, a subset of the additional group of individuals that corresponds to the group of individuals having data stored by the genomics data repository; and modifying, by the computing system, the integrated data repository to store at least a portion of the information of the medical records of the subset of the additional group of individuals in relation to the plurality of identifiers.

14. The method of claim 13, comprising:
  performing, by the computing system, one or more optical character recognition operations with respect to the additional information;
  analyzing, by the computing system, the additional information obtained from the additional data repository to determine one or more portions of the additional information to remove to produce a corpus of information.

15. The method of claim 14, comprising:
  analyzing, by the computing system, the corpus of information to determine a portion of the subset of the additional group of individuals that correspond to one or more biomarkers; and
  generating, by the computing system, one or more data structures that store identifiers of the portion of the subset of the additional group of individuals and that store an indication that the portion of the subset of the additional group of individuals corresponds to the one or more biomarkers.

16. The method of claim 15, comprising:
  storing, by the computing system, the one or more data structures in an intermediate data repository;
  performing, by the computing system, one or more de-identification operations with respect to the identifiers of the portion of the subset of the additional group of individuals before modifying the integrated data repository to store at least a portion of the additional information of the medical records of the portion of the subset of the additional group of individuals in relation to the plurality of identifiers.

17. The method of claim 1, wherein the molecular data repository is configured to store the molecular data, the molecular data comprising at least one or more of genomic information, genetic information, metabolomic information, transcriptomic information, fragmentomic information, immune receptor information, methylation information, epigenomic information, or proteomic information.

18. A system comprising:
  one or more hardware processing units; and
  one or more computer-readable storage media storing computer-executable instructions that are configured to, when executed by the one or more hardware processing units, cause the system to perform operations comprising:
    generating a data file including first tokens generated using a first hash function, individual first tokens corresponding to a respective individual of a group of individuals having data stored by a molecular data repository;
    sending the data file to a health insurance claims data management system;
    obtaining, from the health insurance claims data management system, in response to the data file, health insurance claims data corresponding to the group of individuals;

generating a plurality of identifiers using a second hash function that is different from the first hash function, each identifier corresponds to one or more tokens related to each individual of the group of individuals;

obtaining, using the plurality of identifiers, second data from the molecular data repository for the group of individuals;

determining respective portions of the health insurance claims data that correspond to respective portions of the second data for the group of individuals;

generating an integrated data repository configured to store the respective portions of the health insurance claims data and the respective portions of the second data in relation to respective identifiers of the plurality of identifiers; and generating a data structure comprising de-identified information that relates the respective portions of the health insurance claims data and the respective portions of the second data to the respective identifiers, the de-identified data retrievable by a device in response to a request to the integrated data repository.

19. A method comprising:

generating, by a computing system including processing circuitry and memory, a data file including first tokens generated using a first hash function, individual first tokens corresponding to a respective individual of a group of individuals having data stored by a molecular data repository;

sending, by the computing system, the data file to a medical records data management system;

obtaining, by the computing system and from the medical records data management system, in response to the data file, medical records data corresponding to the group of individuals;

generating, by the computing system, a plurality of identifiers using a second hash function that is different from the first hash function, each identifier corresponds to one or more tokens related to each individual of the group of individuals;

obtaining, by the computing system and using the plurality of identifiers, second data from the molecular data repository for the group of individuals;

determining, by the computing system, respective portions of the medical records data that correspond to respective portions of the second data for the group of individuals;

generating, by the computing system, an integrated data repository that stores the respective portions of the medical records data and the respective portions of the second data in relation to respective identifiers of the plurality of identifiers;

receiving, by the computing system, a request to determine data with respect to a plurality of individuals having data stored in the integrated data repository, wherein the request includes one or more search criteria;

determining, by the computing system, a subset of the plurality of individuals having one or more characteristics that correspond to the one or more search criteria;

analyzing, by the computing system, information of the subset of the plurality of individuals to determine a measure of significance of a characteristic of the one or more characteristics with respect to a biological condition; and generating, by the computing system, de-identified data that relates the respective portions of the medical records data and the respective portions of the second data to the respective identifiers, the de-identified data retrievable by to a device in response to a request to the integrated data repository.

20. The method of claim 19, comprising:

determining, by the computing system, one or more genomic mutations present in the subset of the plurality of individuals;

determining, by the computing system, a plurality of treatments provided to the subset of the plurality of individuals; and determining, by the computing system, respective survival rates for the subset of the plurality of individuals.

21. The method of claim 20, wherein the measure of significance corresponds to survival rate with respect to a treatment of the plurality of treatments and a genomic mutation of the one or more genomic mutations.

22. The method of claim 21, comprising determining, by the computing system and based on measure of significance, an effectiveness of the treatment for the subset of the plurality of individuals.

23. The method of claim 22, comprising determining, by the computing system, individuals in subset of the plurality of individuals that have not received the treatment.

24. The method of claim 23, comprising administering one or more therapeutically effective amounts of the treatment to the individuals in the subset of the plurality of individuals that have not received the treatment.

* * * * *